US012710641B2

(12) United States Patent
Lee et al.

(10) Patent No.: US 12,710,641 B2
(45) Date of Patent: Aug. 18, 2026

(54) METHODS AND SYSTEMS FOR MEASURING AND ADJUSTING VISUAL DISTORTIONS CAUSED BY ASTIGMATISM USING VR-BASED SCENARIOS

(71) Applicant: Zenni Optical, Inc., Novato, CA (US)

(72) Inventors: Steven Lee, Barrington, IL (US); Julia Zhen, Novato, CA (US); Chyrsong Ting, Novato, CA (US); Matthew James Golino, Brookhaven, GA (US); Justin Paul Dempsey, Ottawa (CA); Jeffrey Joseph Fillingham, Dartmouth (CA)

(73) Assignee: Zenni Optical, Inc., Novato, CA (US)

( * ) Notice: Subject to any disclaimer, the term of this patent is extended or adjusted under 35 U.S.C. 154(b) by 0 days.

(21) Appl. No.: 18/819,706

(22) Filed: Aug. 29, 2024

(65) Prior Publication Data

US 2026/0063893 A1 Mar. 5, 2026

(51) Int. Cl.

| | |
|---|---|
| ***G02B 27/00*** | (2006.01) |
| ***G02B 27/01*** | (2006.01) |
| ***G06V 40/20*** | (2022.01) |

(52) U.S. Cl.

CPC ....... *G02B 27/0025* (2013.01); *G02B 27/017* (2013.01); *G06V 40/20* (2022.01)

(58) Field of Classification Search

CPC .. G02B 27/0025; G02B 27/017; G06V 40/20; H04N 13/324; H04N 5/58

USPC .......................................................... 348/335

See application file for complete search history.

(56) References Cited

U.S. PATENT DOCUMENTS

| | | | |
|---|---|---|---|
| 2,352,500 | A | 6/1944 | Shepard |
| 4,861,156 | A | 8/1989 | Terry |
| 5,530,492 | A | 6/1996 | Ron |
| 5,737,060 | A | 4/1998 | Kasha, Jr. |
| 5,767,940 | A | 6/1998 | Hayashi et al. |
| 6,592,222 | B2 | 7/2003 | Massengill et al. |
| 7,784,948 | B2 | 8/2010 | Nozawa et al. |
| 10,022,045 | B1 | 7/2018 | Evans |
| 10,238,280 | B2 | 3/2019 | Maeda et al. |
| 10,610,093 | B2 | 4/2020 | Green |

(Continued)

FOREIGN PATENT DOCUMENTS

| | | | |
|---|---|---|---|
| CN | 2904944 | Y | 5/2007 |
| CN | 109431445 | A | 3/2019 |

(Continued)

*Primary Examiner* — Joel W Fosselman

(74) *Attorney, Agent, or Firm* — Morgan, Lewis & Bockius LLP

(57) ABSTRACT

A virtual eye test for measuring and adjusting visual distortions caused by astigmatism can be conducted in a virtual reality (VR) environment. The test employs an electronic device featuring a head-mounted display (HMD) and a camera. The device generates a VR user interface corresponding to a three-dimensional virtual environment and renders it on the HMD. A plurality of visual scenarios is simulated within the VR interface. Using the camera, the device tracks user interactions and responses to visual stimuli presented in these scenarios. Visual distortions are measured and adjusted for based on the tracked user interactions and responses, providing a comprehensive assessment and correction of astigmatism-related visual distortions in a controlled, immersive environment.

17 Claims, 66 Drawing Sheets

(56) References Cited

U.S. PATENT DOCUMENTS

| | | | | |
|---|---|---|---|---|
| 10,942,416 | B1 | 3/2021 | Lu et al. | |
| 11,178,389 | B2 | 11/2021 | Sinha et al. | |
| 11,426,107 | B2 | 8/2022 | Gibbons et al. | |
| 11,432,718 | B2 | 9/2022 | Xu et al. | |
| 11,768,594 | B2 | 9/2023 | Cameron | |
| 12,011,224 | B2 | 6/2024 | Goyal et al. | |
| 12,210,149 | B2 | 1/2025 | Jin et al. | |
| 2011/0228228 | A1 | 9/2011 | Butler et al. | |
| 2015/0219899 | A1 | 8/2015 | Mack et al. | |
| 2017/0017083 | A1 | 1/2017 | Samec et al. | |
| 2017/0196496 | A1 | 7/2017 | Goldstein et al. | |
| 2018/0008141 | A1 | 1/2018 | Krueger | |
| 2019/0008441 | A1 | 1/2019 | Guzik | |
| 2019/0298166 | A1 | 10/2019 | Smith et al. | |
| 2019/0328305 | A1 | 10/2019 | Wood et al. | |
| 2019/0350452 | A1 | 11/2019 | Lewis | |
| 2020/0097076 | A1 | 3/2020 | Alcaide et al. | |
| 2020/0315450 | A1 | 10/2020 | Samadani et al. | |
| 2020/0337627 | A1 | 10/2020 | Penney et al. | |
| 2021/0015357 | A1 | 1/2021 | Batta et al. | |
| 2021/0259539 | A1 | 8/2021 | Lewis et al. | |
| 2021/0275013 | A1 | 9/2021 | Alvarez et al. | |
| 2021/0330185 | A1* | 10/2021 | Krukowski ........ | G02B 27/0093 |
| 2022/0007929 | A1 | 1/2022 | Padula et al. | |
| 2022/0160223 | A1 | 5/2022 | Bradley et al. | |
| 2023/0168497 | A1* | 6/2023 | Abou Shousha .. | G02B 27/0093 345/8 |
| 2023/0200644 | A1 | 6/2023 | Mansouri et al. | |
| 2023/0210442 | A1 | 7/2023 | Krueger | |
| 2024/0423465 | A1 | 12/2024 | Christofferson et al. | |
| 2025/0130428 | A1 | 4/2025 | Adema et al. | |
| 2025/0306403 | A1 | 10/2025 | Hart et al. | |

FOREIGN PATENT DOCUMENTS

| | | | |
|---|---|---|---|
| GR | 1005651 | B | 9/2007 |
| HU | 185600 | B | 2/1985 |
| JP | H0626538 | B2 | 4/1994 |
| JP | 2721892 | B2 | 3/1998 |
| JP | 2000079095 | A | 3/2000 |
| JP | 2001275968 | A | 10/2001 |
| JP | 2001286442 | A | 10/2001 |
| JP | 3259920 | B2 | 2/2002 |
| JP | 2002051981 | A | 2/2002 |
| JP | 2003038440 | A | 2/2003 |
| JP | 2003079574 | A | 3/2003 |
| JP | 3655129 | B2 | 6/2005 |
| JP | 2012100758 | A | 5/2012 |
| JP | 5007435 | B2 | 8/2012 |
| WO | 1994013192 | A1 | 6/1994 |
| WO | 2011022428 | A2 | 2/2011 |
| WO | 2016165272 | A1 | 10/2016 |
| WO | 2017070704 | A2 | 4/2017 |
| WO | 2021018224 | A1 | 2/2021 |
| WO | 2022111663 | A1 | 6/2022 |

* cited by examiner

820

Acuity Test Overview

To select the "upwards" orientation, either:

Point the controller at the top quadrant of the wall above the letter, then press the trigger.

OR

Tilt the joystick upwards and then press the trigger to submit.

Continue

Back

1200

Generate a virtual reality user interface corresponding to photorealistic environment
1202
A Render the VR user interface on the HMD
1204

Simulate one or more real-world scenarios in the VR user interface
1206
B

The photorealistic virtual environment prioritizes precision, control, repeatability and/or data collection over immersion, interaction, variety and/or user experience to assess visual functions accurately
1214

The photorealistic virtual environment corresponds to an environment selected from the group consisting of: urban streets, natural landscapes, indoor settings, and crowded public spaces.
1216

The photorealistic virtual environment corresponds to an environment with varied lighting conditions or scenarios with a level of detail and movement similar to busy intersections or forest trails
1218

The VR user interface allows a user to navigate through virtual environments using natural head and eye movements, mimicking real-world interactions and responses
1220

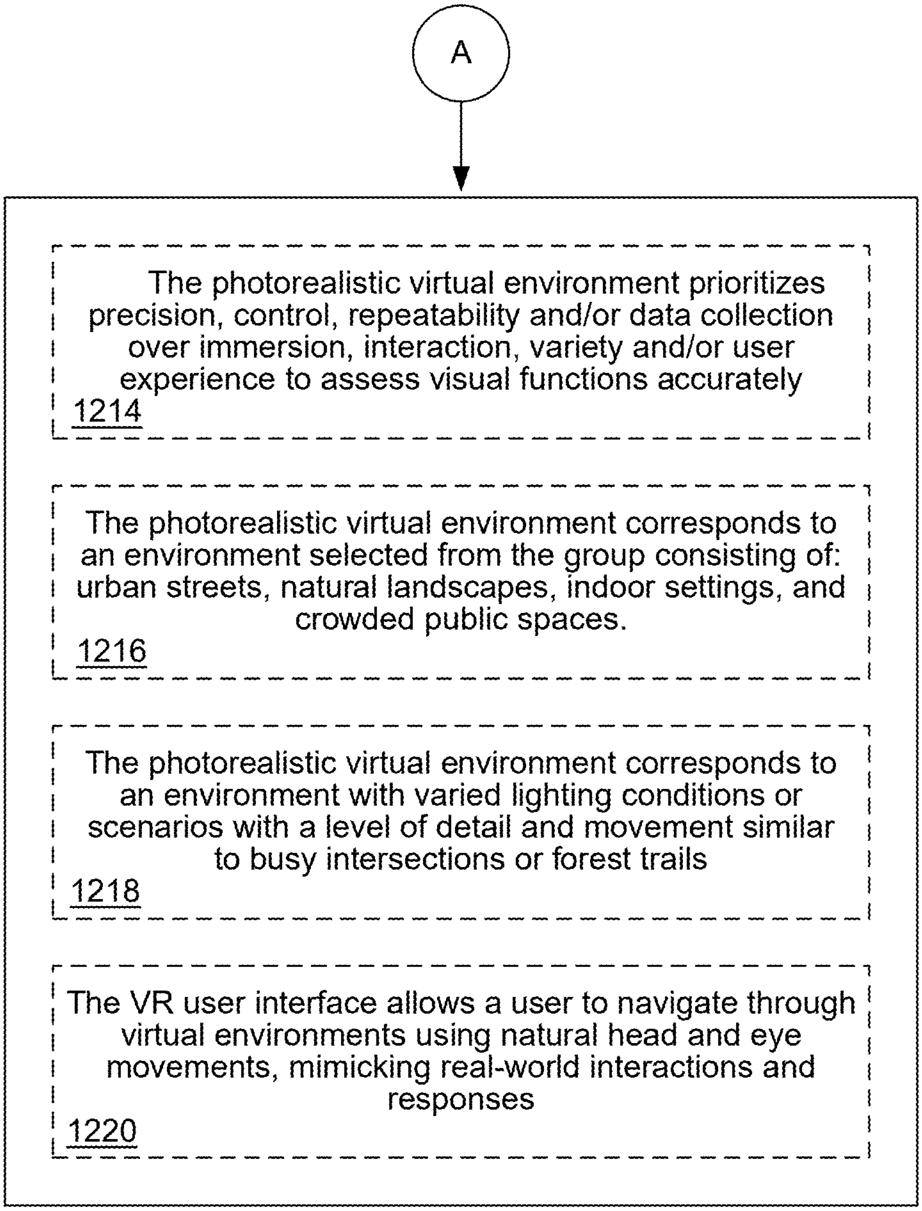

FIG. 12B

Simulate one or more daily activities selected from the group consisting of: walking through a park, driving, or navigating through a busy city street, where the user must respond to visual stimuli corresponding to moving vehicles, pedestrians, and/or changing light conditions
1222

Real-time render dynamic weather changes, day-night cycles, and/or varying traffic conditions, to test visual acuity in different contexts.
1224

Use stereoscopic three-dimensional (3D) and head tracking to create a realistic depth perception
1226

Simulate driving at night, reading signs in varying light conditions, identifying objects in peripheral vision while walking, or responding to moving objects in a busy environment
1228

Simulate entering a tunnel while driving
1230

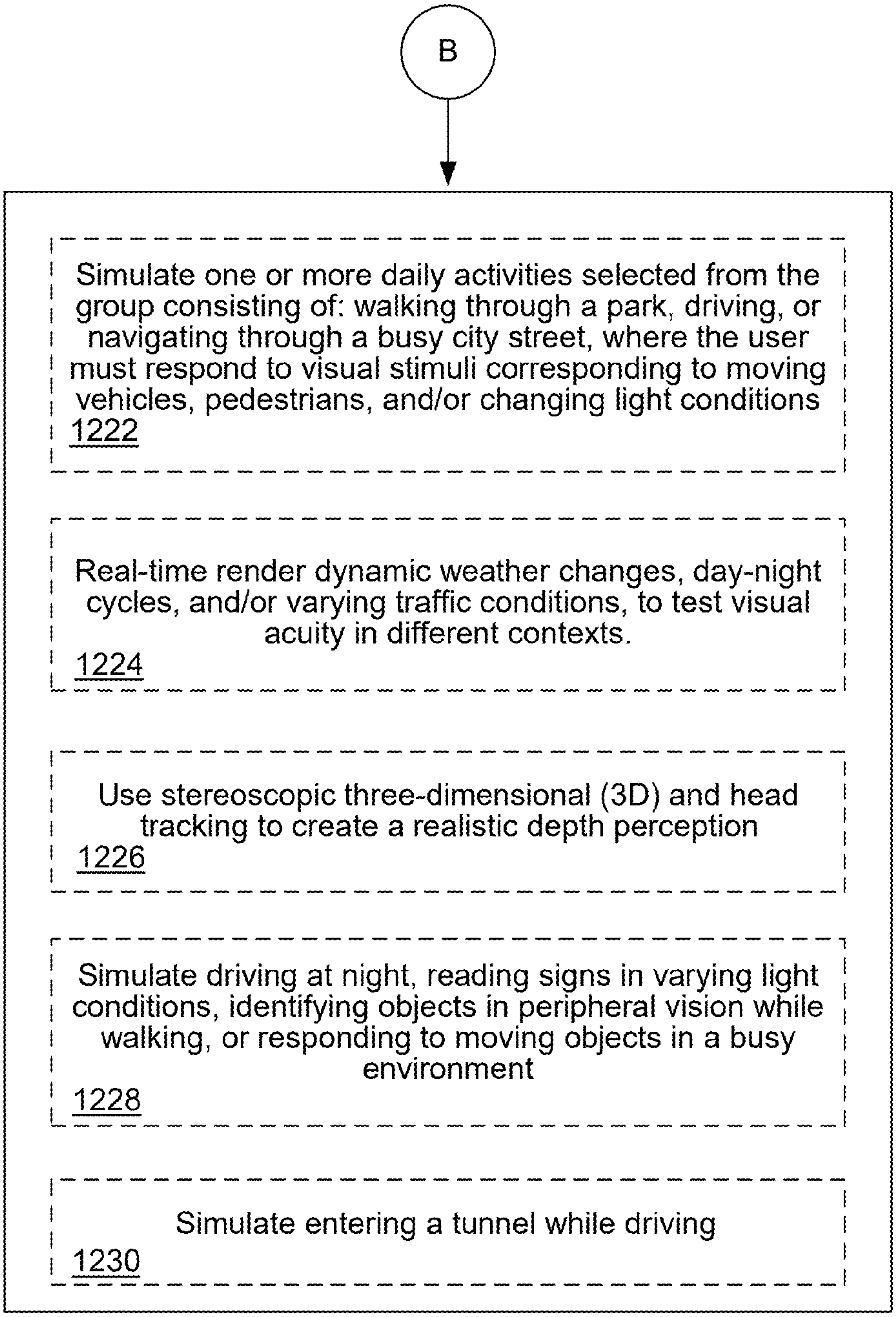

FIG. 12C

While simulating the one or more real-world scenario:

Dynamically adjust the photorealistic environment based on real-time monitoring of eye movements, pupil dilation, and neural responses, to adapt visual scenarios, such as changing object speed or light intensity
1232

Personalize one or more testing sequences for a user by customizing the one or more real-world scenarios based on the user's daily activities, workplace, common travel route, preferences, and/or specific visual challenges.
1234

Personalize one or more testing sequences for a user by customizing the one or more real-world scenarios based on the user's demography or the user's prior vision performance
1236

Personalize one or more testing sequences for a user by customizing the one or more real-world scenarios based on the user's prior vision performance
1238

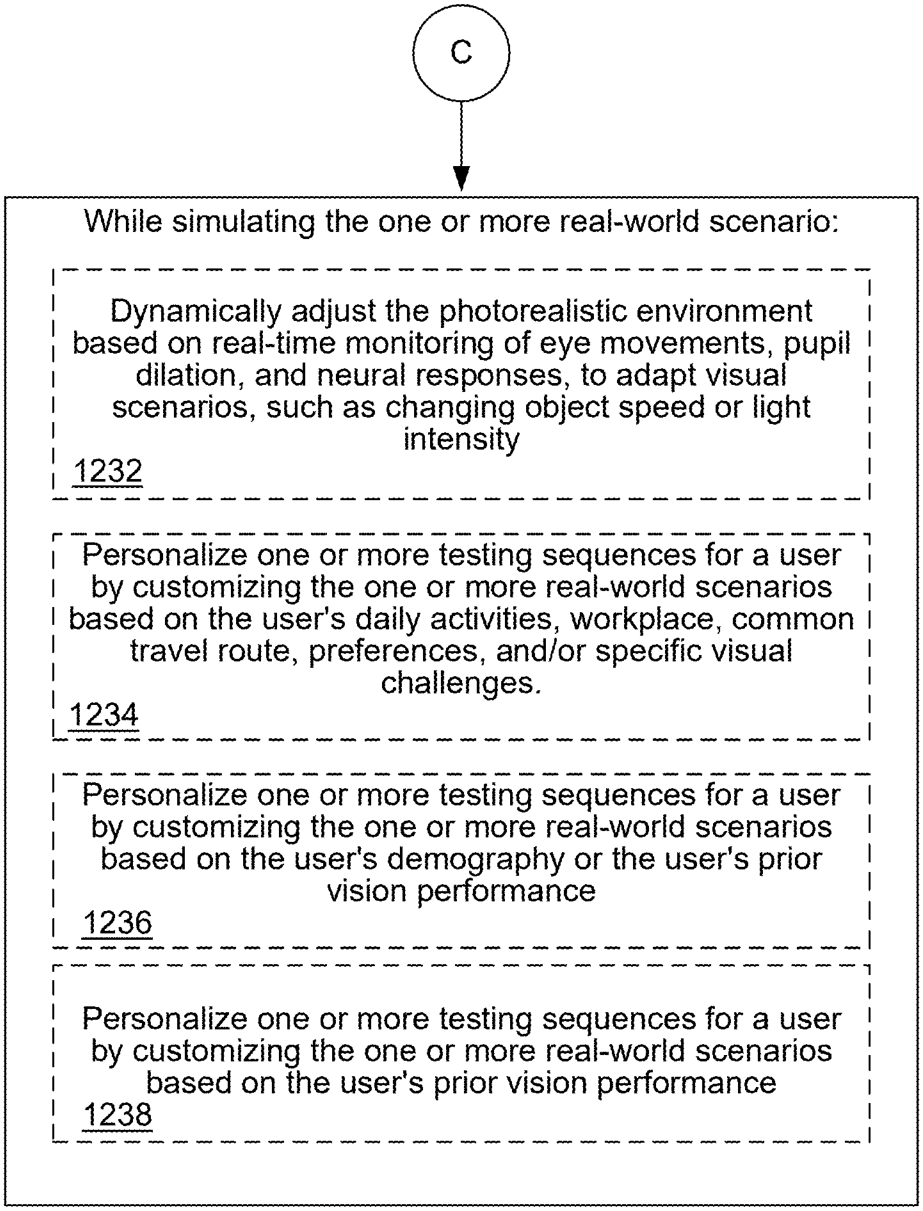

FIG. 12D

While simulating the one or more real-world scenarios:

Use stereoscopic 3D to create realistic depth, for testing depth perception
1240

Perform dynamic rendering of moving objects and environments, for testing motion detection
1242

Simulate different lighting scenarios from bright sunlight to dim streetlights, for testing varying light conditions
1244

Track rapid movements of the eye between fixation points at rates of at least 100 - 500 Hz
1246

Track eye movements where eyes are relatively stationary and focused on a single point at rates of 50 - 100 Hz
1248

Track eye movements where the eyes smoothly follows a moving object at rates of 100 - 200 Hz
1250

Track a time a user takes to respond to the visual stimulus at a sampling rate of 1000 Hz or higher
1252

Collect data for clinical analysis, including metrics comprising saccadic latency, fixation stability, and smooth pursuit accuracy
1254

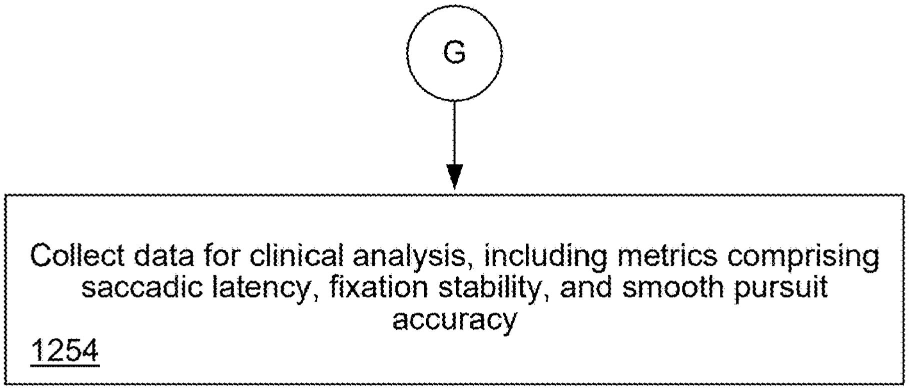

FIG. 12H

Simultaneously evaluate the user response for depth perception, motion detection, and light adaptation
1256

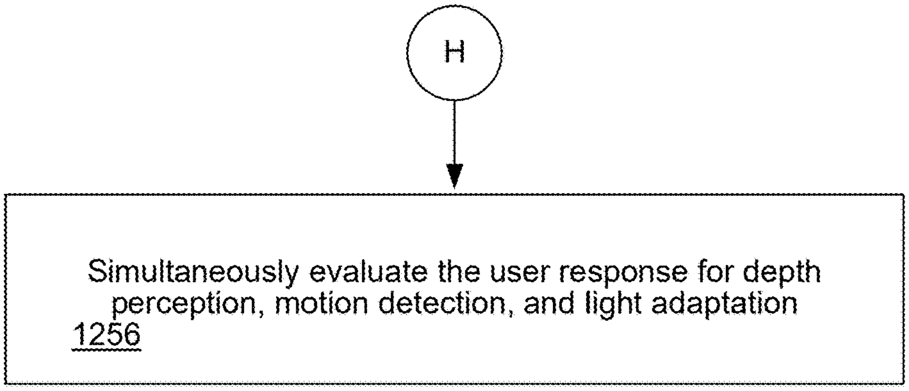

FIG. 12I

Testing visual acuity and perception includes detecting a visual impairment for adapting to a sudden change in light conditions or tracking moving objects
1258

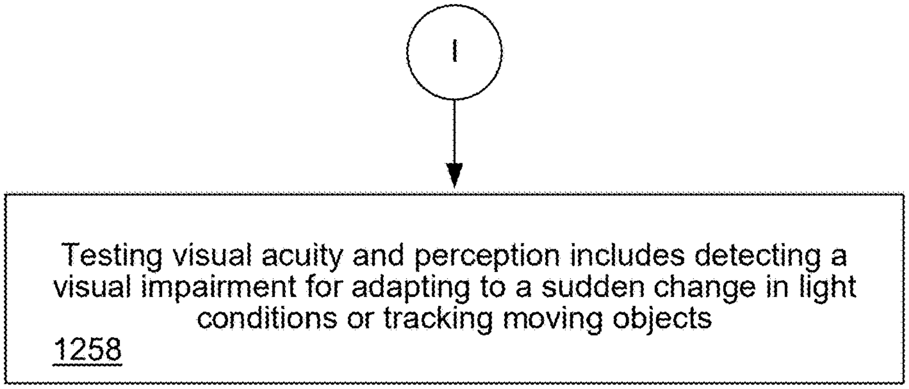

FIG. 12J

Perform real-time adjustments to speed of moving objects and/or light levels based on the user response
1260

Perform real-time adaptation of the visual stimuli based on the user response
1262

Track physiological responses and use the responses to adjust visual stimuli, three-dimensional environment, and/or scenarios
1264

Obtain detailed data collection for medical analysis
1266

The testing sequence includes gradual reduction of object size and increased complexity of visual tasks as the test progresses, thereby requiring increased focus and clarity as the test progresses
1312

The testing sequence includes depth testing by having objects appear at different distances and requiring identification or interaction.
1314

The testing sequence includes testing scenarios selected from the group consisting of: driving through varying weather conditions, reading signs at different distances, and navigating through crowded areas
1316

The testing sequence includes one or more tests for testing nuances of depth perception, spatial awareness, and varying visual stimuli, for vision testing
1318

The one or more tests include at least one scenario with realistic depth cues, varying object distances, or diverse visual elements, for vision testing
1320

The at least one scenario includes moving pedestrians or fluctuating light levels, to mimic everyday challenges
1322

The progressively finer details correspond to increasing granularity of vision performance testing
1324

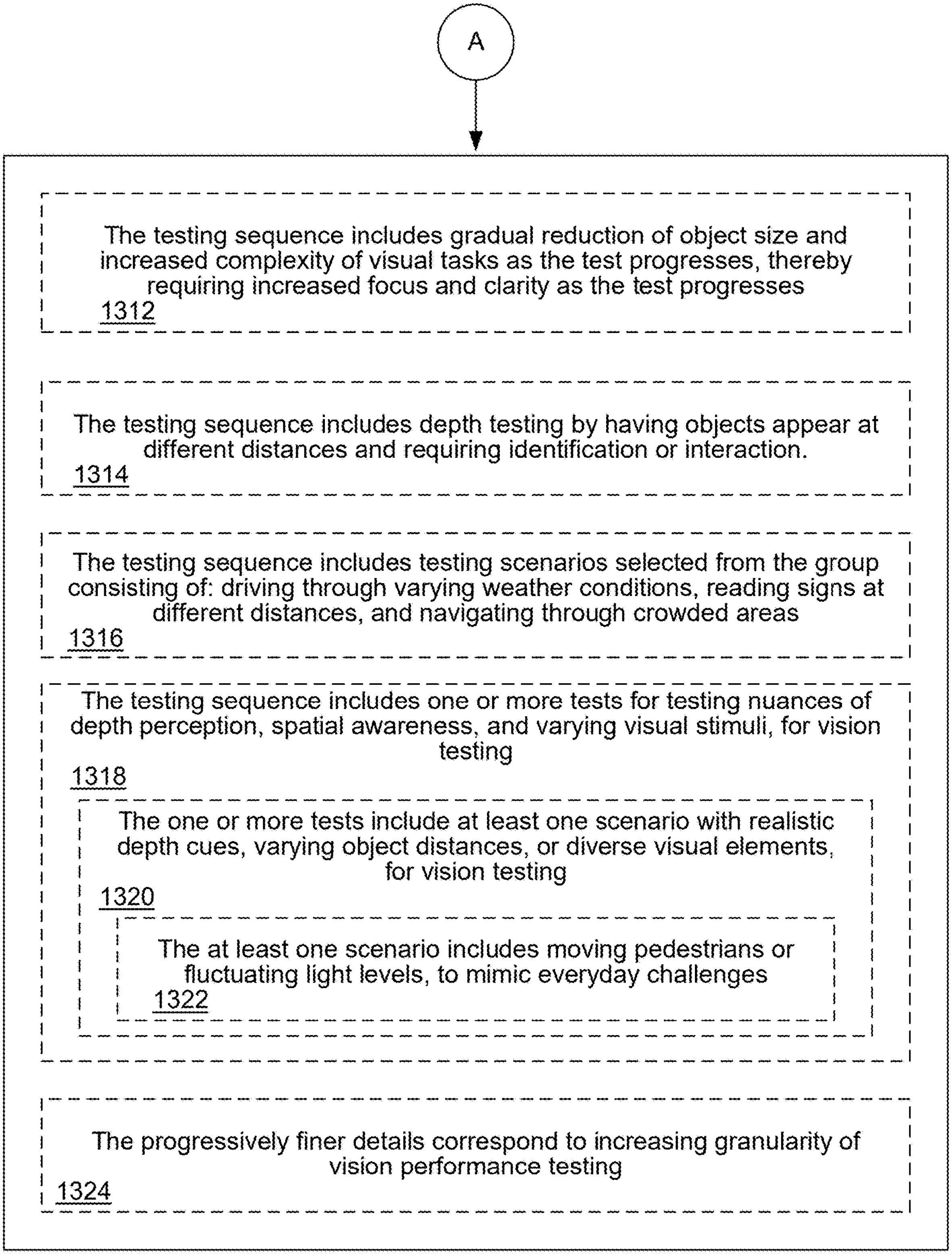

FIG. 13B

Optimize the testing sequence for individual needs using one or more AI algorithms that adapt the three-dimensional virtual environment in real-time based on user responses and physiological data
1326

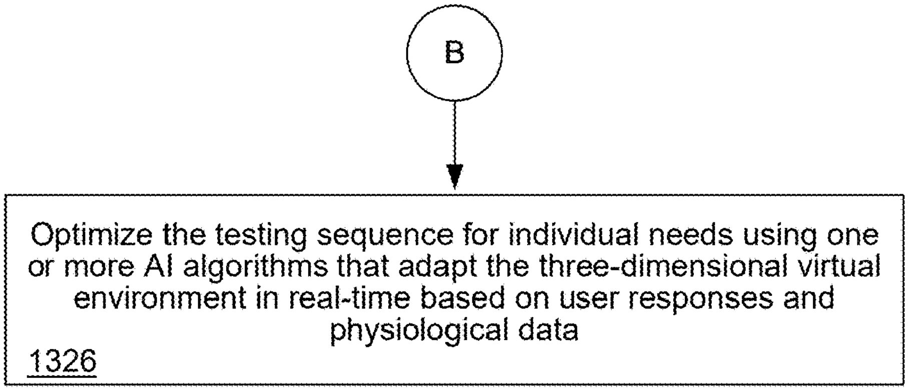

FIG. 13C

Generate a personalized and dynamic testing environment by adjusting visual stimuli including object speed and lighting, based on eye movement and pupil response, using real-time AI adaptation
1328

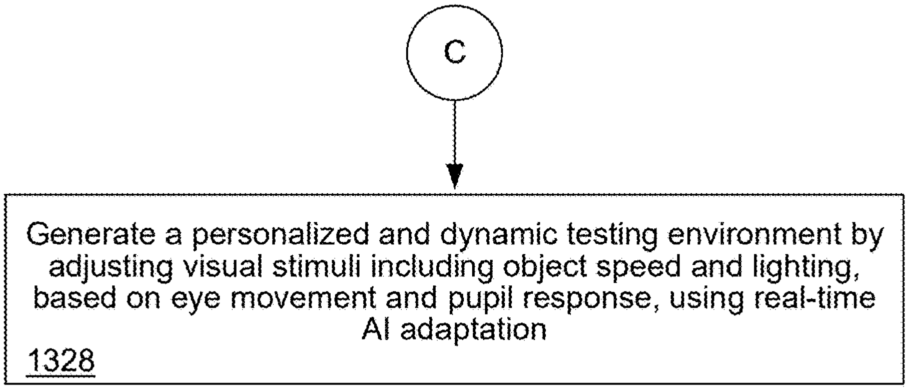

FIG. 13D

Perform personalized adaptive testing by customizing one or more scenarios of the testing sequence and/or the three-dimensional virtual environment, to match a user's visual profile, ensuring that each test is relevant to their specific vision challenges and daily experiences
1330

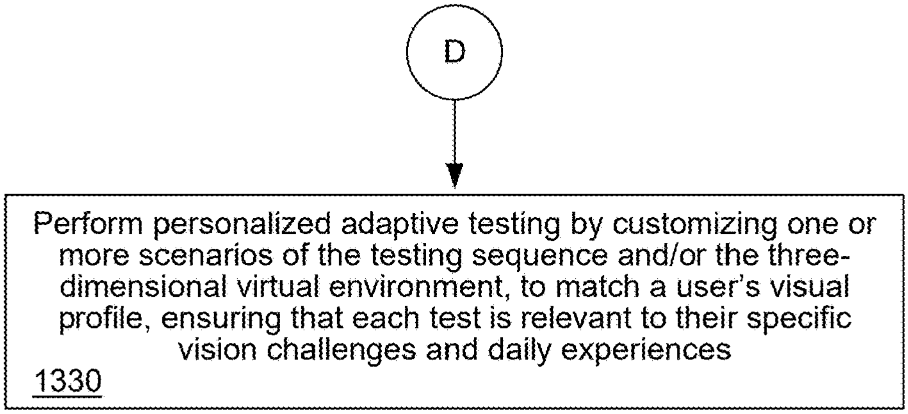

FIG. 13E

Simulating the dynamic real-world visual experience includes simulating one or more scenarios where a user physically moves through virtual spaces, encountering changing perspectives and/or environments
1412

Simulating the dynamic real-world visual experience includes simulating one or more scenarios that allow a user to navigate virtual environments, interact with moving objects, and adjust to changing viewpoints.
1414

Simulating the dynamic real-world visual experience includes dynamic adjustment of visual stimuli comprising performing real-time changes in visual elements based on user movements
1416

Performing real-time changes includes altering a speed of one or more moving objects
1418

Performing real-time changes includes altering a direction of an incoming stimuli
1420

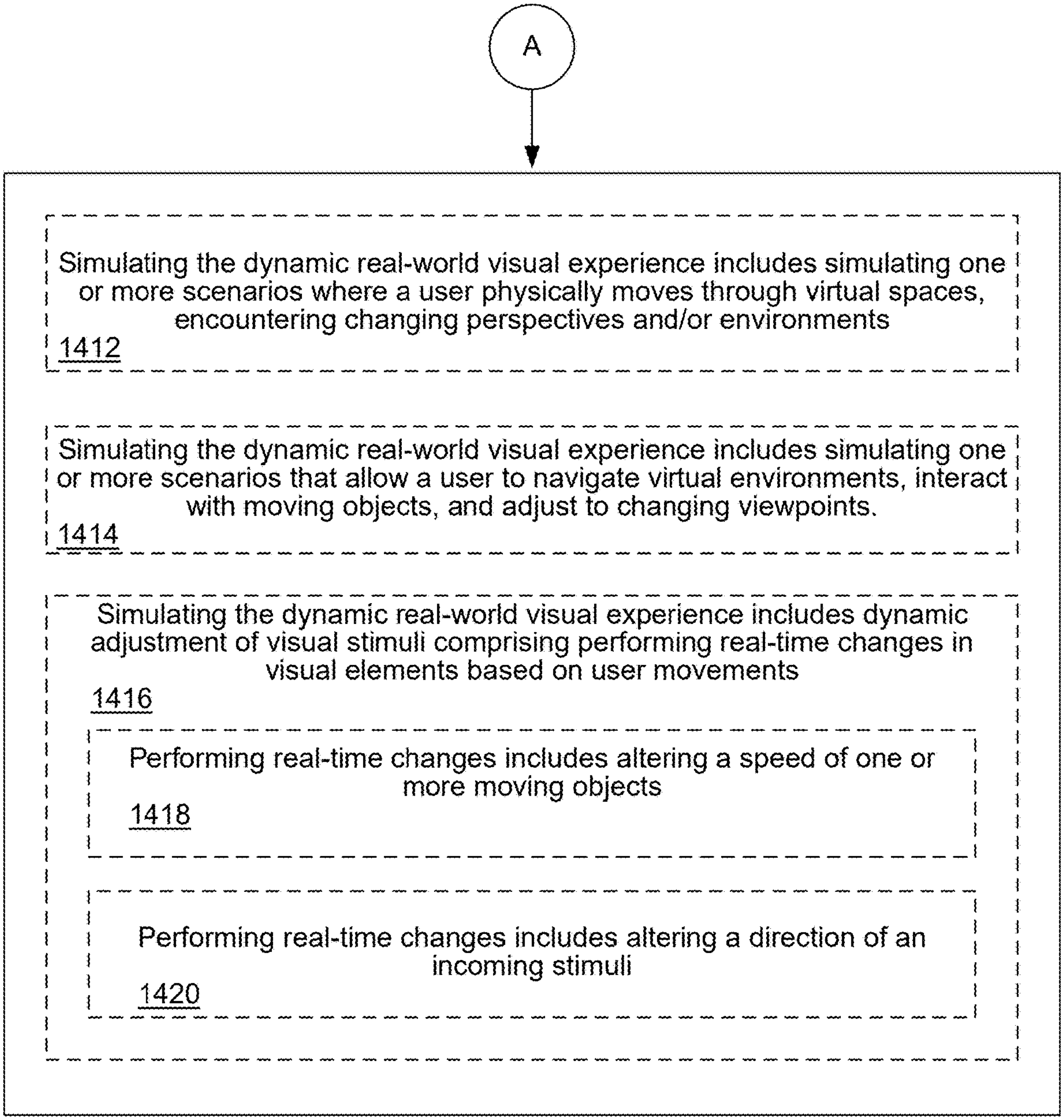

FIG. 14B

Evaluating depth perception, motion detection, and spatial awareness includes (i) assessing how a user perceives and responds to objects at varying distances and speeds, and (ii) assessing the user's ability to navigate through complex environments
1422

Detection of motion sensitivity issues includes identifying difficulties in tracking moving objects or adjusting to rapid changes in the visual scene.
1424

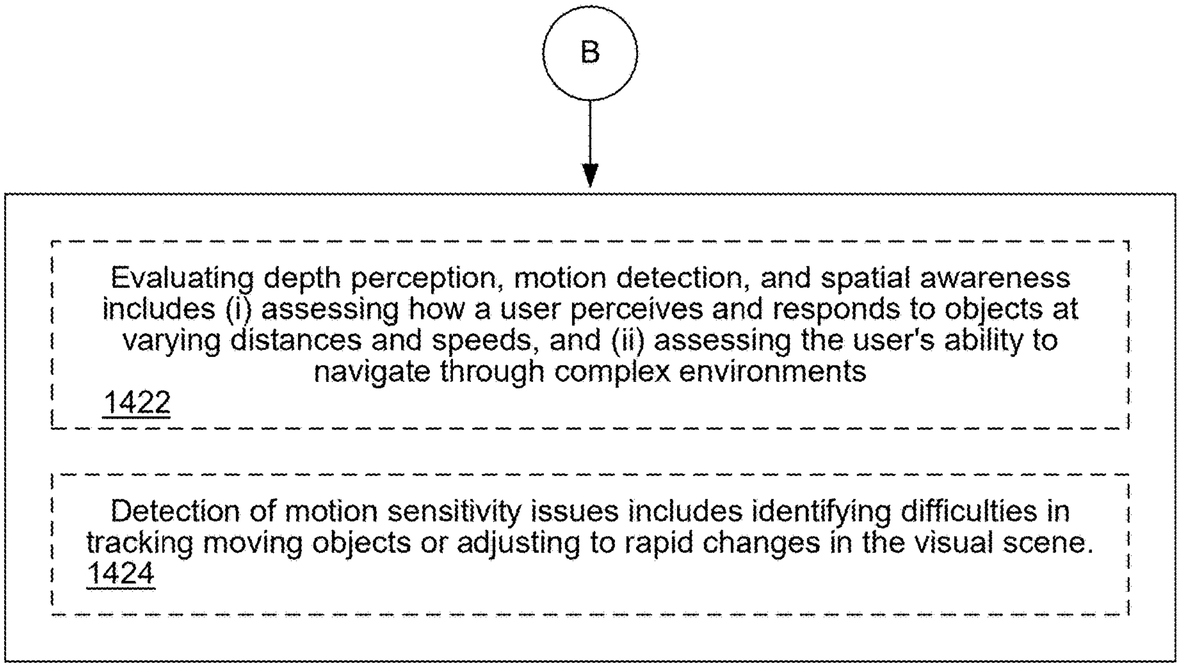

FIG. 14C

Use one or more biometric sensors to monitor physiological responses to gather data on visual performance under dynamic conditions
1426

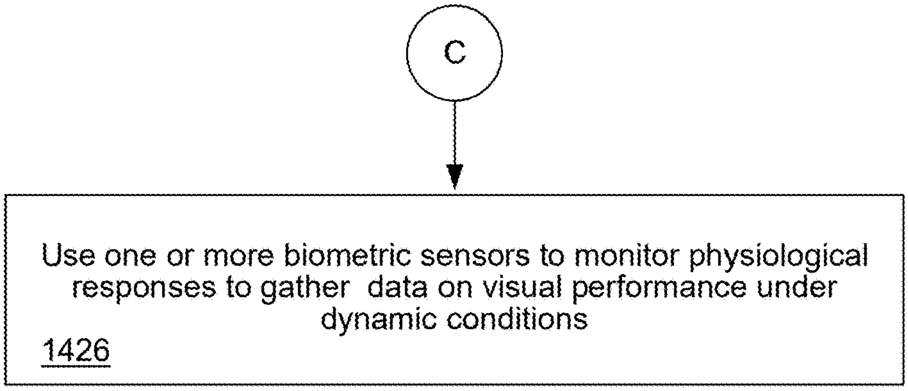

FIG. 14D

Use a AI-driven adaptive testing environment that uses AI to modify one or more VR scenarios in real-time based on a user's performance and physiological feedback, for a personalized assessment
1428

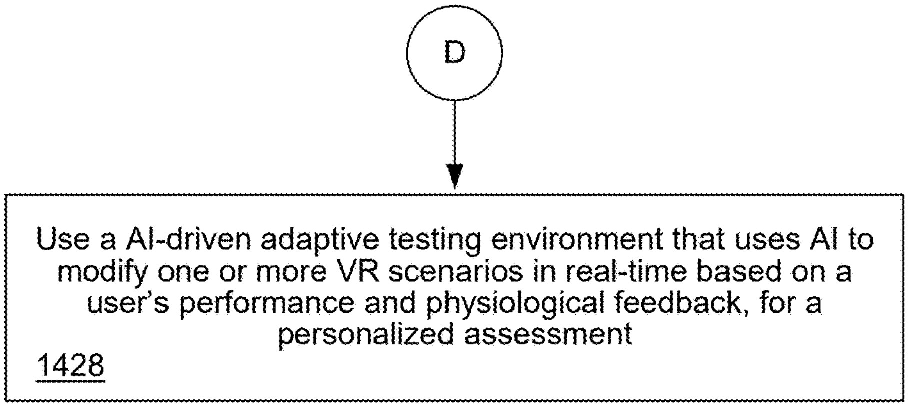

FIG. 14E

Tailor the dynamic real-world visual experience to a user's specific vision needs and daily activities providing relevant and practical assessment results for the user
1430

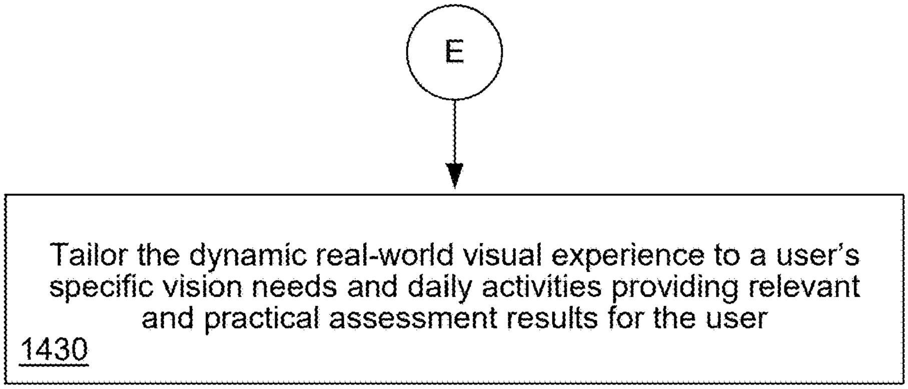

Generate a virtual user interface corresponding to three-dimensional virtual environment
1502
C Render the VR user interface on the HMD
1504

Simulate real-world motion and target recognition visual tasks in the VR user interface
1506
A
D Track, using the camera, eye movements and response times to visual stimuli presented in the real-world motion and target recognition visual tasks
1508

Measure dynamic visual acuity based on the eye movements and the response times
1510
B

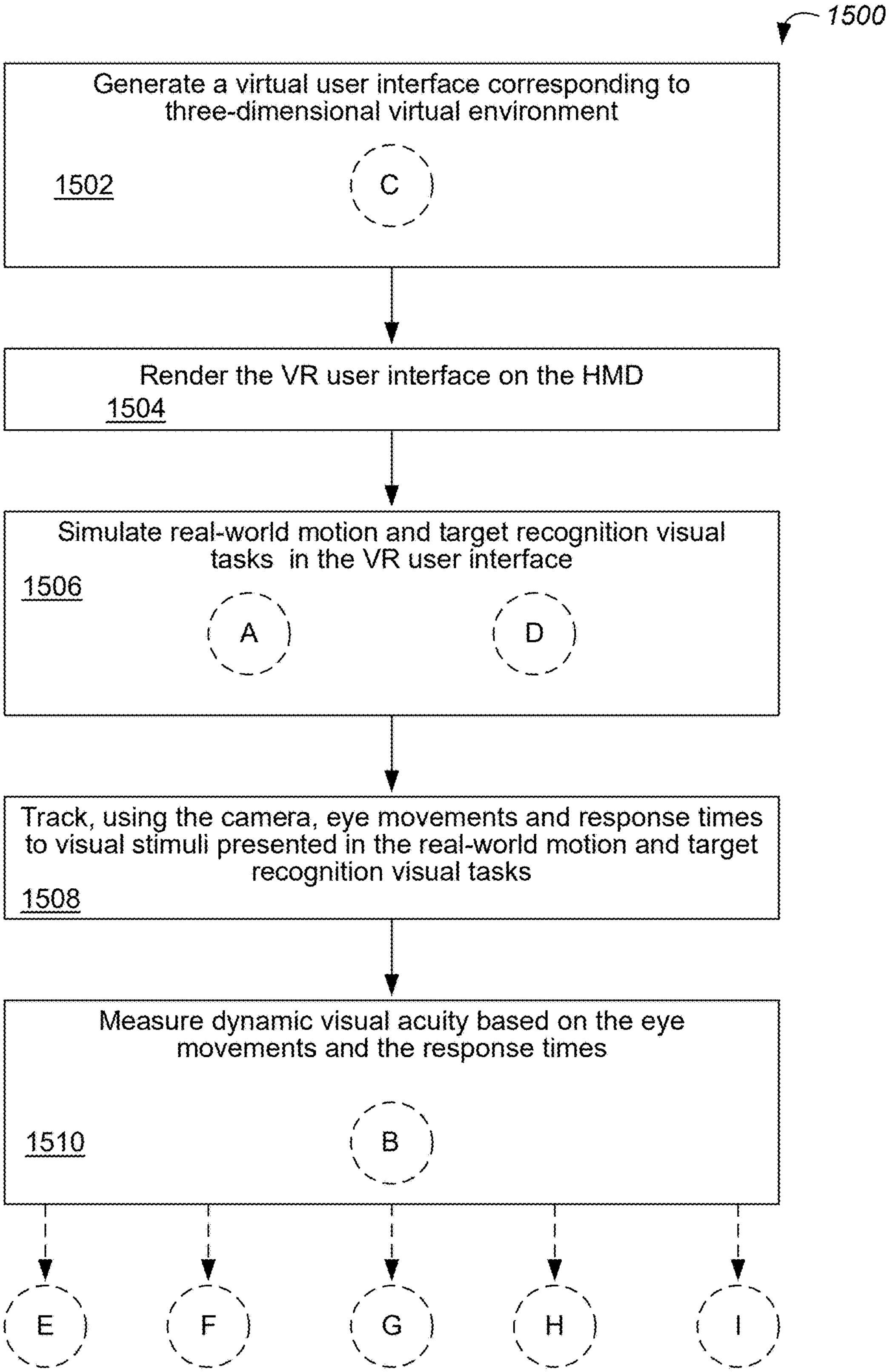

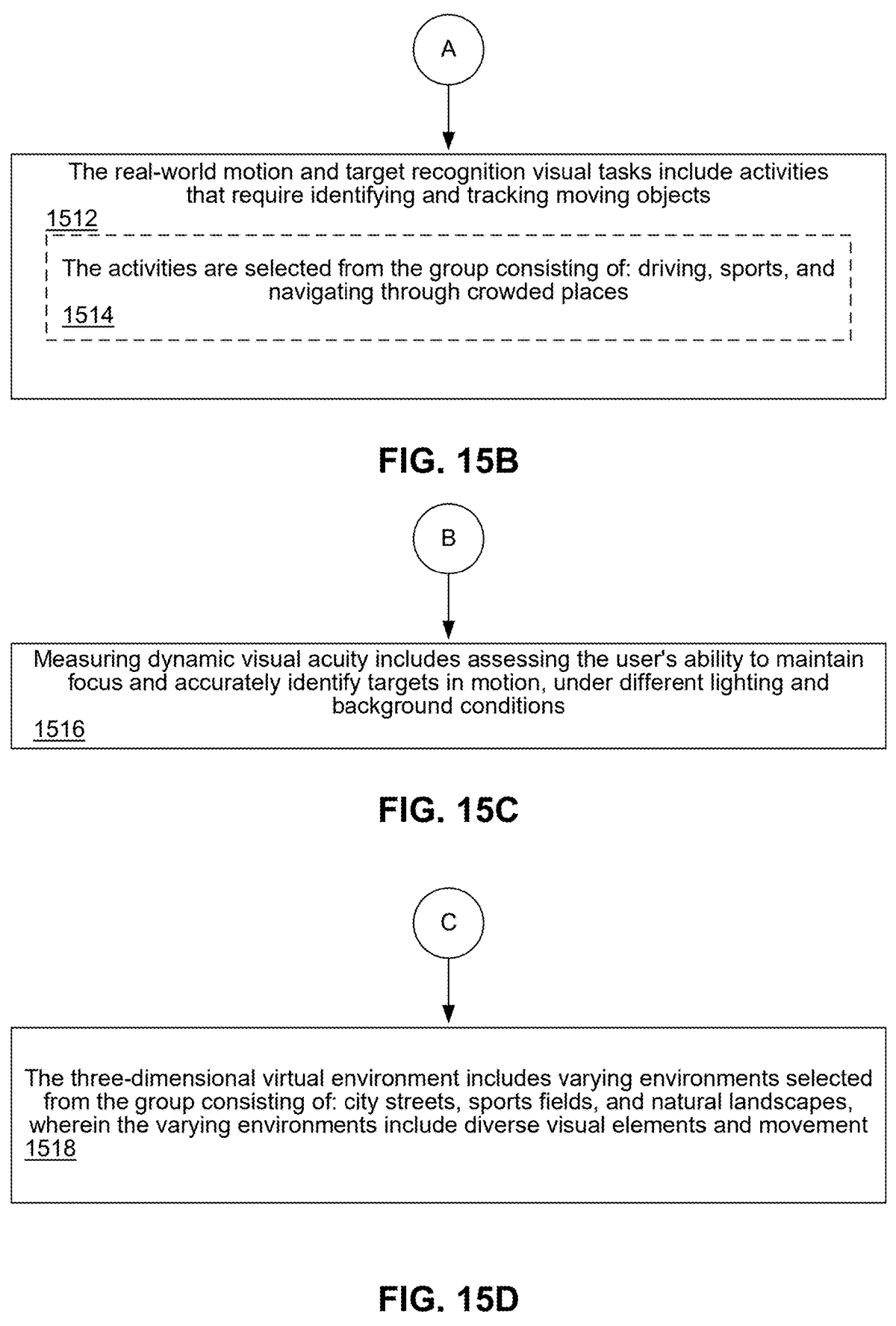

The real-world motion and target recognition visual tasks include activities that require identifying and tracking moving objects
1512

The activities are selected from the group consisting of: driving, sports, and navigating through crowded places
1514

Measuring dynamic visual acuity includes assessing the user's ability to maintain focus and accurately identify targets in motion, under different lighting and background conditions
1516

The three-dimensional virtual environment includes varying environments selected from the group consisting of: city streets, sports fields, and natural landscapes, wherein the varying environments include diverse visual elements and movement
1518

FIG. 15D

Simulating real-world motion and target recognition visual tasks includes simulating one or more scenarios that require identification and tracking of progressively finer details and varying speeds of moving targets
1520

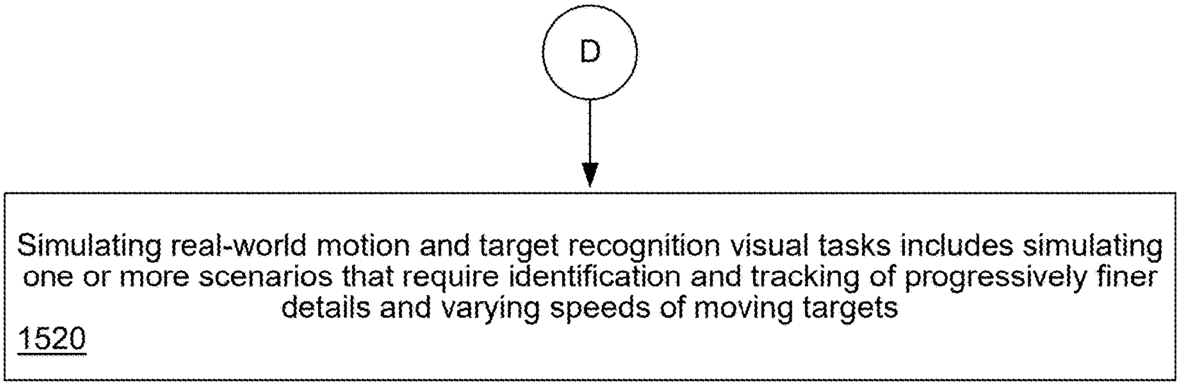

FIG. 15E

Control and customize the virtual environment based on manipulation of target speed, background complexity, and lighting
1522

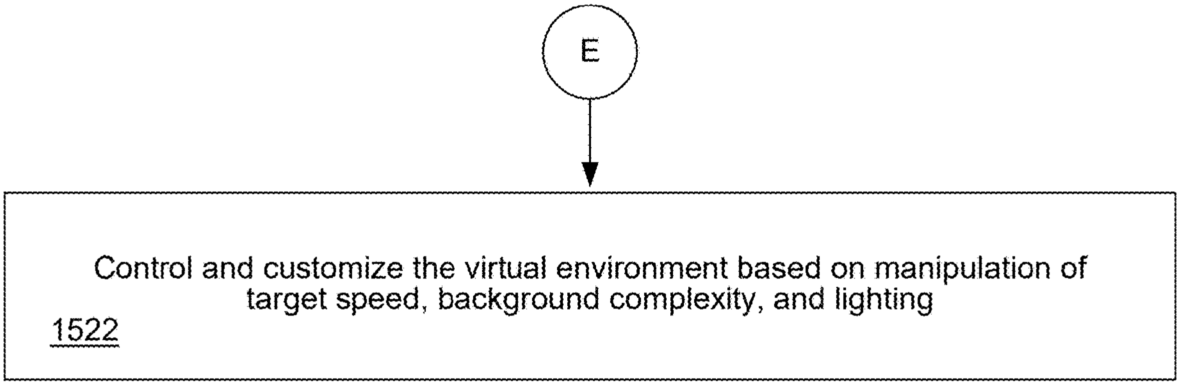

FIG. 15F

Provide exercises for improving visual acuity comprising repeated exposure to adaptive difficulty levels in VR scenarios to enhance visual tracking and recognition skills
1524

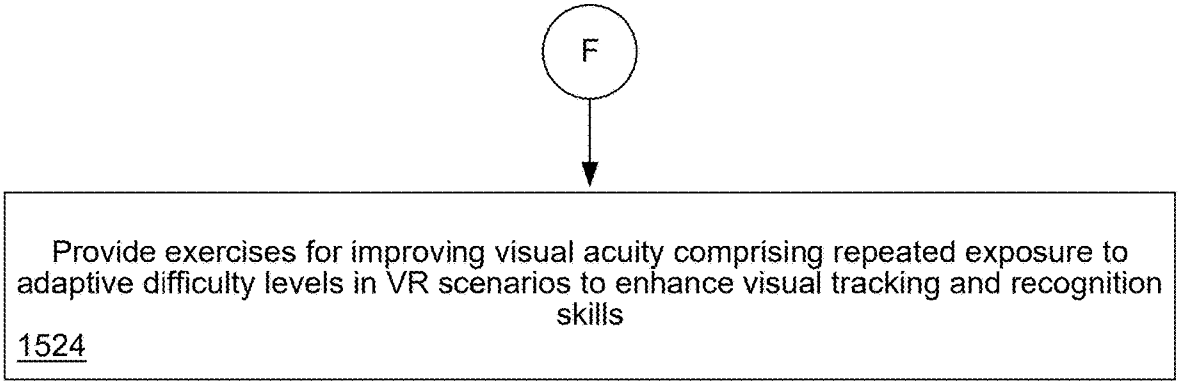

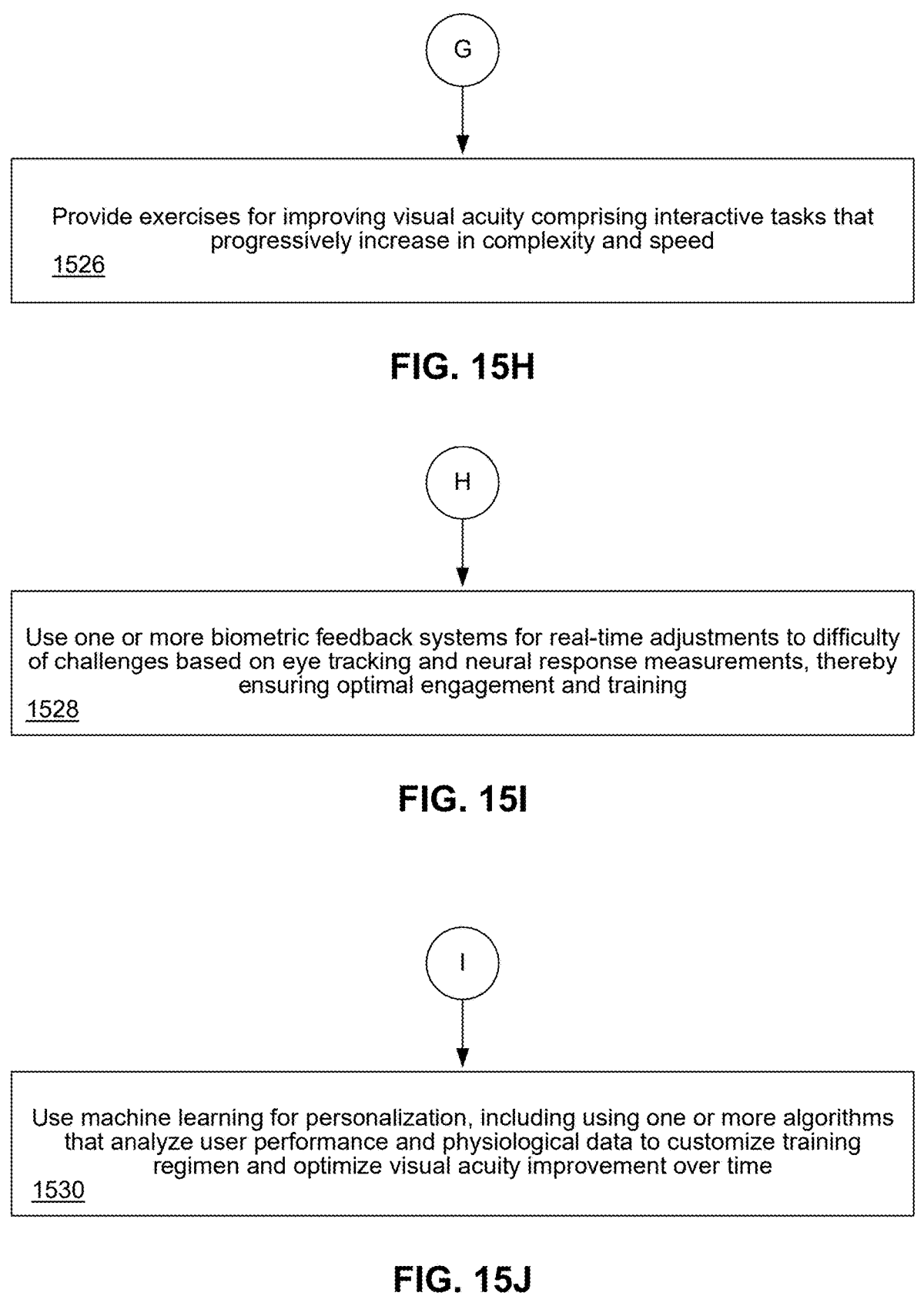

Provide exercises for improving visual acuity comprising interactive tasks that progressively increase in complexity and speed
1526

Use one or more biometric feedback systems for real-time adjustments to difficulty of challenges based on eye tracking and neural response measurements, thereby ensuring optimal engagement and training
1528

Use machine learning for personalization, including using one or more algorithms that analyze user performance and physiological data to customize training regimen and optimize visual acuity improvement over time
1530

FIG. 15J

The three-dimensional virtual environment requires users to continuously adjust their focus, simulating real-life visual tasks
1612

The three-dimensional virtual environment constricts a test subject from rotating their head or squinting to temporarily compensate for astigmatism
1614

The plurality of visual scenarios includes scenarios that require rapidly shifting focus between distant and near objects
1616

The plurality of visual scenarios includes scenarios that require adjusting focus while tracking moving objects
1618

The plurality of visual scenarios replicates real-world viewing conditions by presenting targets at multiple distances and angles
1620

The plurality of visual scenarios test perception of depth, curvature and dimensionality using 3D shapes and contours
1622

The plurality of visual scenarios dynamically introduce or manipulate cylindrical and other complex lens powers to precisely map the degree and axis of astigmatic errors
1624

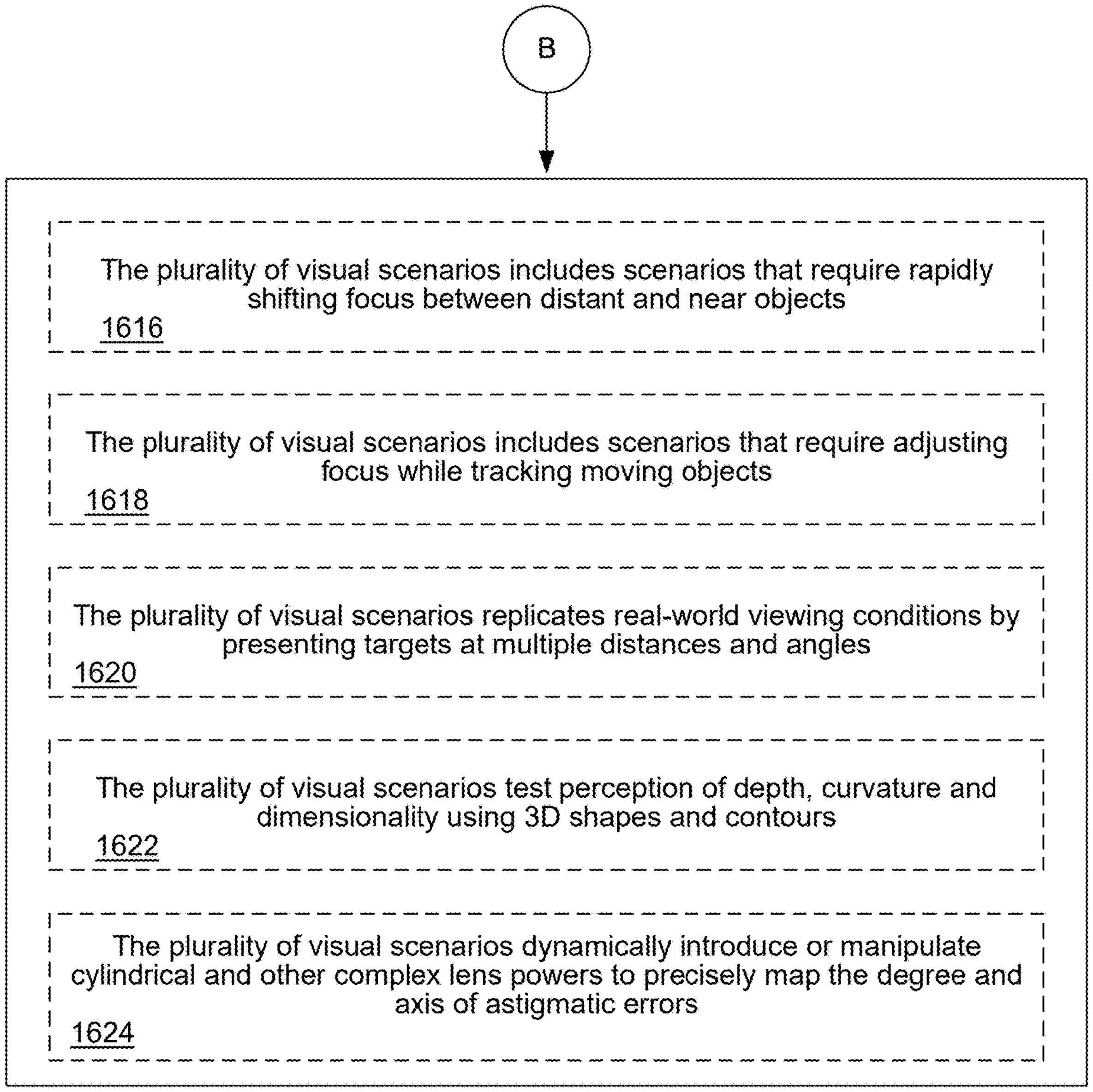

FIG. 16C

Use biometric sensors to track eye movements, pupil responses, and/or neural activity, to adjust the plurality of visual scenarios in real-time
1626

Use artificial intelligence to tailor the plurality of visual scenarios based on a user's visual profile, thereby adjusting the complexity and focus requirements dynamically
1628

Generate one or more insights into visual environment interaction including data on how individuals with astigmatism interact with various visual elements, including how quickly they can refocus between objects at different distances or under different lighting conditions
1630

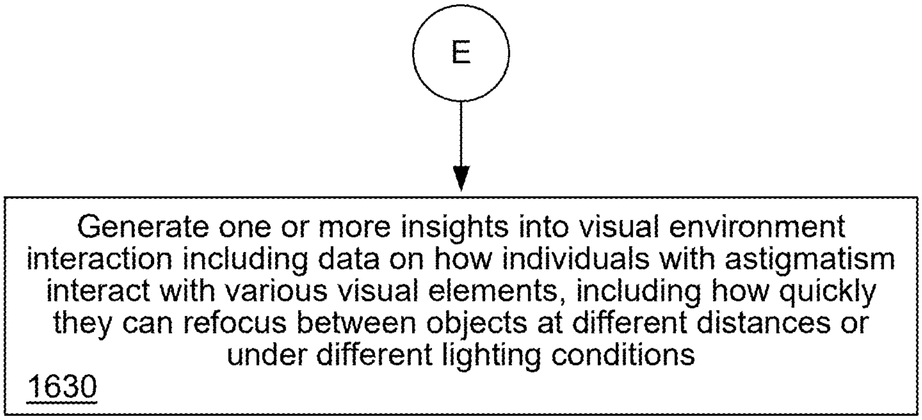

FIG. 16F

Provide targeted treatments and corrective measures utilizing insights based on the measurement of astigmatism to recommend treatments and corrective measures, including customized corrective lenses or specific vision therapy exercises that address the unique challenges faced by each patient
1632

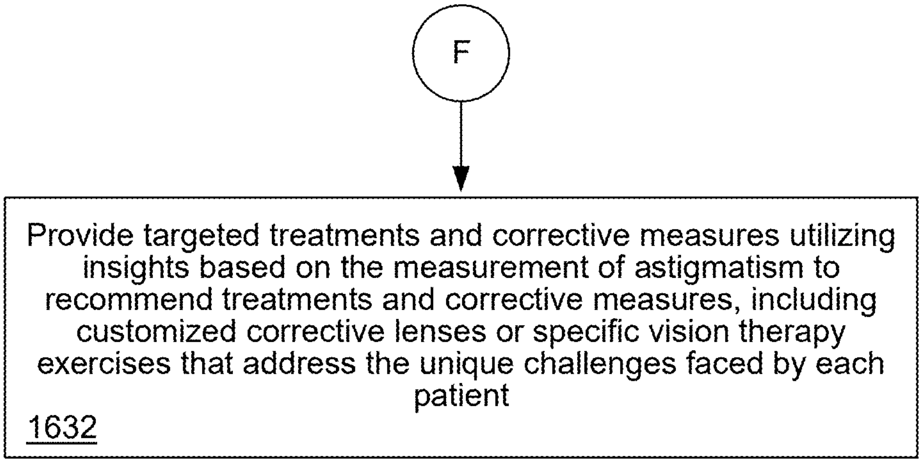

FIG. 16G

The three-dimensional virtual environment includes one or more environments where users encounter various visual scenarios designed to reveal specific distortions caused by astigmatism
1712

The three-dimensional virtual environment allows for manipulation of visual stimuli including adjusting text size, distance, and lighting conditions
1714

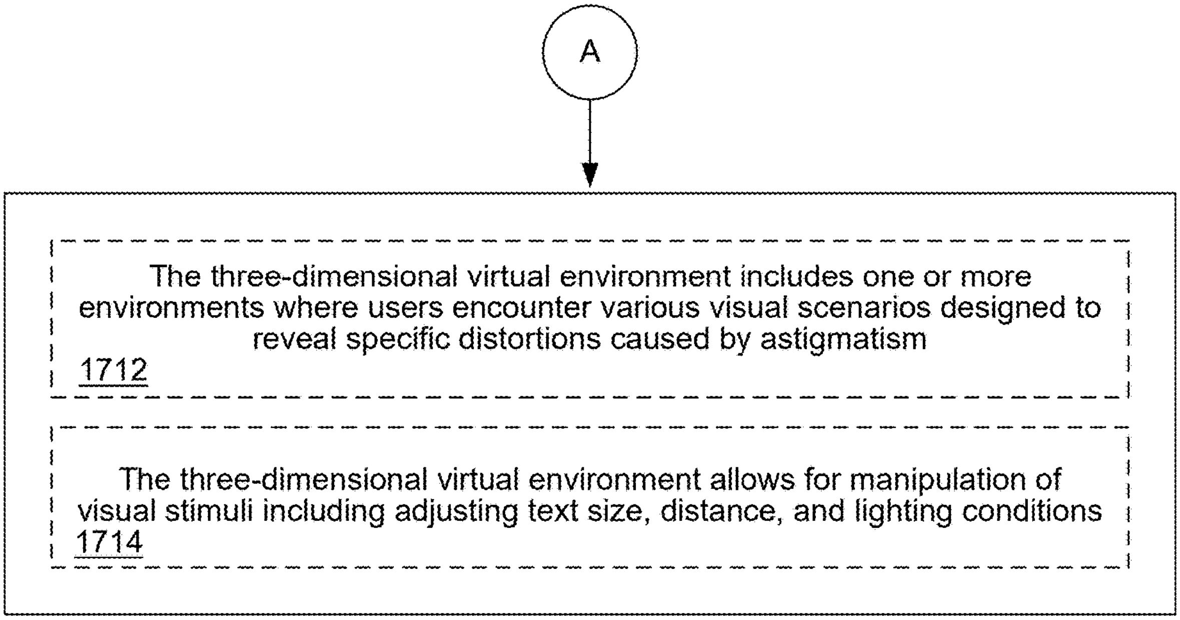

FIG. 17B

The plurality of visual scenarios includes at least one scenario with blurring of lines, ghosting, or irregular focus
1716

The plurality of visual scenarios includes reading text at different distances or identifying objects in motion
1718

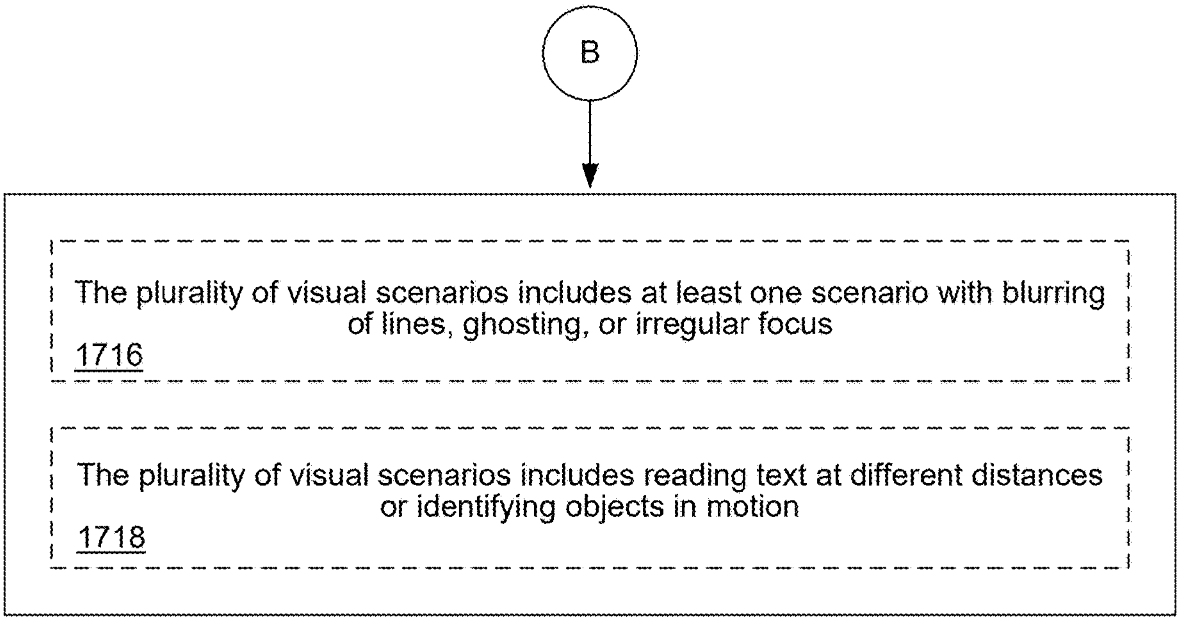

FIG. 17C

Provide a description of a patient's condition comprising detailed maps of visual distortions, highlighting areas where the patient experiences the most significant difficulties
1720

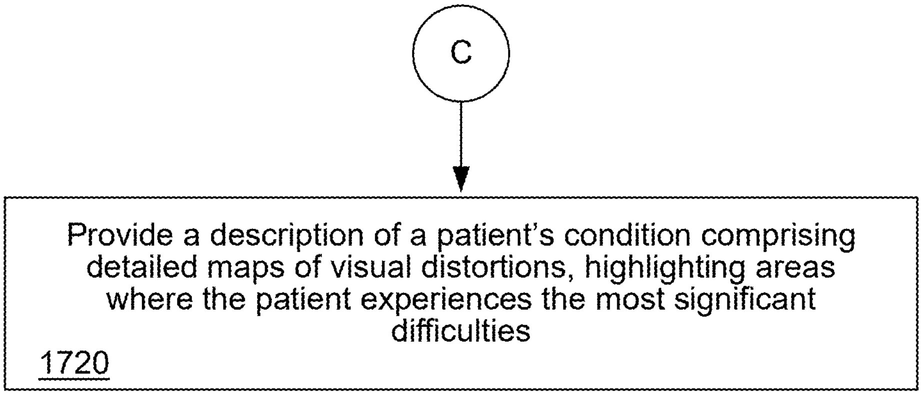

FIG. 17D

Use adaptive optics for simulating corrective lenses in real-time, thereby allowing users to experience immediate adjustments to their visual distortions, to provide feedback on the effectiveness of different corrections
1722

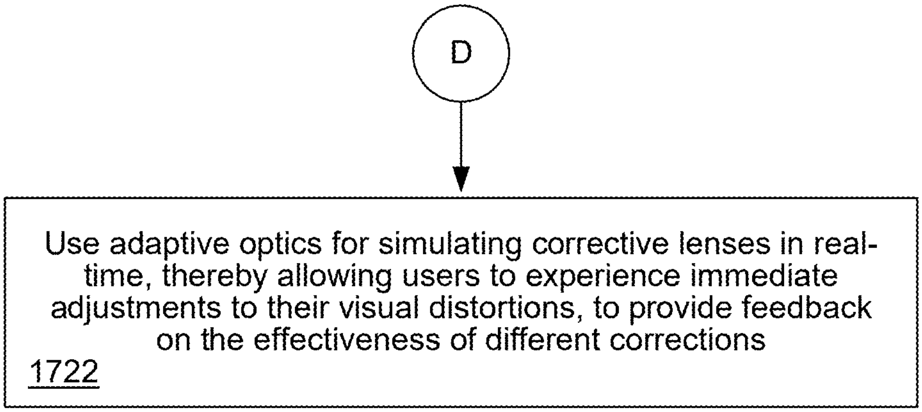

FIG. 17E

Use one or more machine learning algorithms to analyze visual responses, thereby continuously optimizing the plurality of visual scenarios for personalized assessment and correction
1724

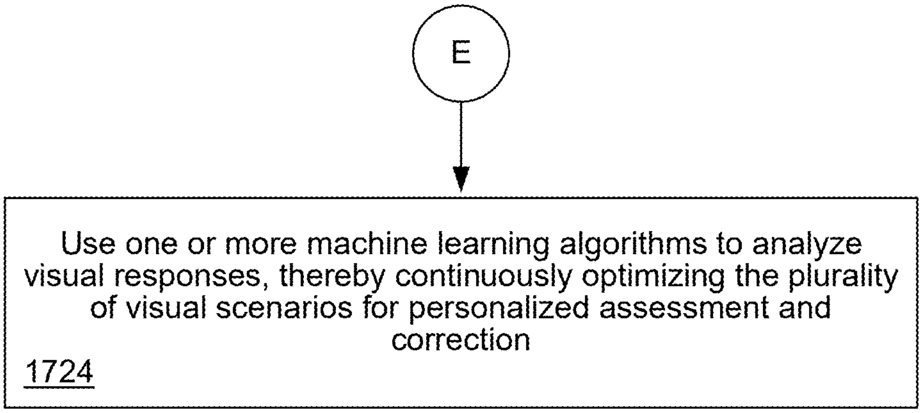

FIG. 17F

Provide personalized corrective measures comprising customizing vision correction strategies based on detailed assessments, ensuring that treatments and corrective lenses are tailored to an individual's specific visual needs
1726

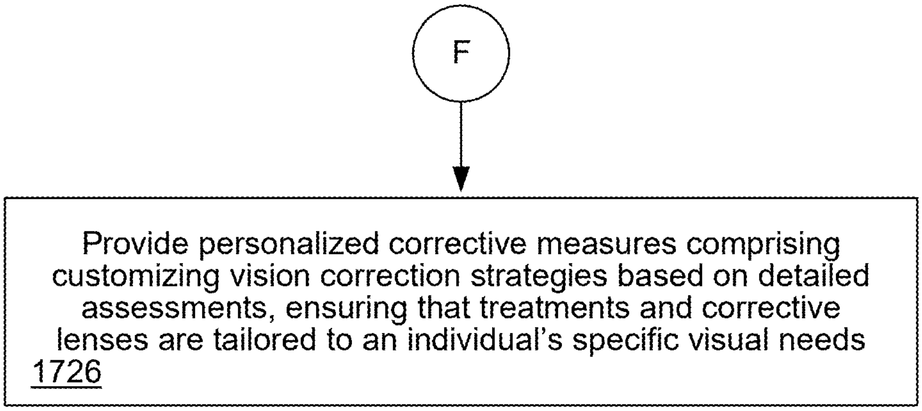

FIG. 17G

The plurality of visual scenarios corresponds to progressively decreasing light levels, simulating conditions including twilight, moonlight, and complete darkness
1812

The plurality of visual scenarios includes low-light conditions, wherein a drop in visual performance based on the user interactions and responses indicates areas of night blindness
1814

B

A baseline visual acuity test for testing a patient's visual acuity under normal, well-lit conditions to establish a baseline
1816

A dark adaptation test where the patient is placed in a dark room or environment for an extended period to allow the patient's eyes to adapt to the darkness
1818

A night vision simulation test to immerse the patient in the three-dimensional virtual environment simulating night-time or low-light conditions
1820

A visual acuity testing in low light using standard eye charts, objects, or other visual targets presented at various distances and contrasts under controlled lighting conditions
1822

A dynamic testing where the three-dimensional virtual environment introduces dynamic elements, including moving objects or changes in lighting conditions, to assess the patient's ability to perceive and react to visual stimuli in low light
1824

A night vision tasks testing where the patient is asked to perform simulated tasks that require good night vision, including navigating through a dimly lit environment, identifying objects, or reading signs/labels
1826

A subjective assessment where the patient is asked to report their subjective experience, including any difficulties or discomfort experienced during the low-light simulation
1828

Repeat testing where the entire sequence may be repeated multiple times, with varying levels of illumination or different three-dimensional virtual environments, to fully assess the severity and consistency of the night blindness
1830

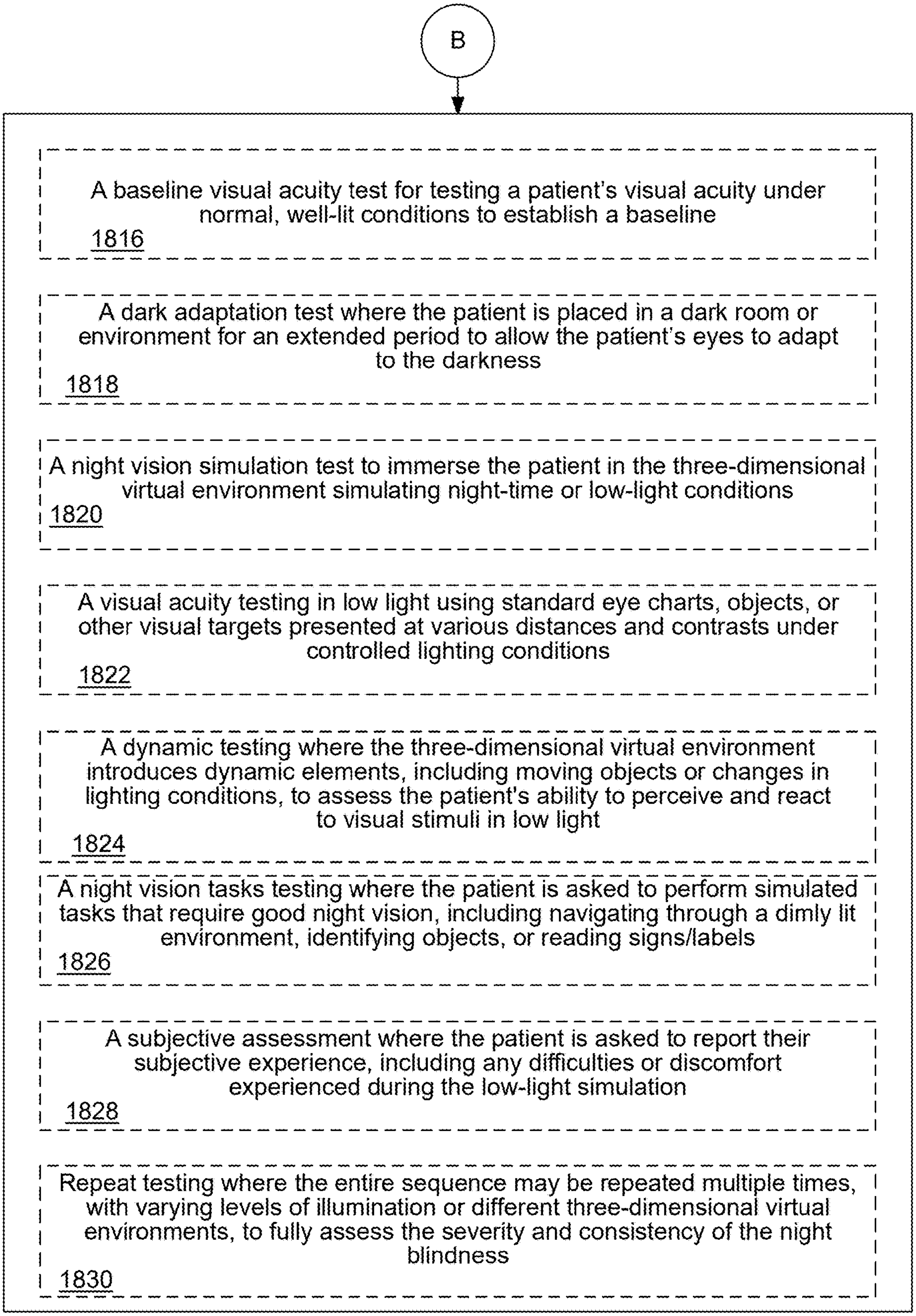

FIG. 18C

Measuring night blindness includes evaluation of visual performance based on assessing a user's ability to navigate and identify objects in low-light conditions, evaluating their adaptation to different lighting scenarios
1832

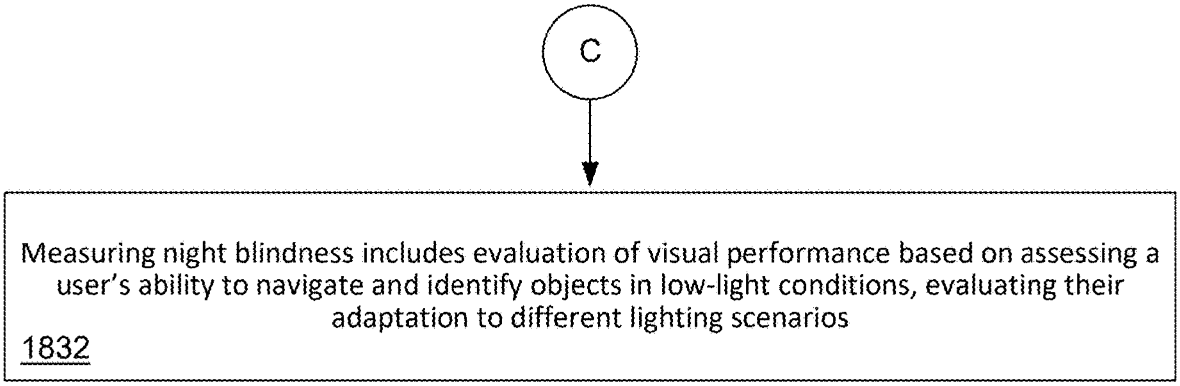

FIG. 18D

Use one or more biometric feedback mechanisms including sensors to track pupil dilation, eye movement, and retinal response, allowing real-time adjustments to low-light simulations based on physiological feedback
1834

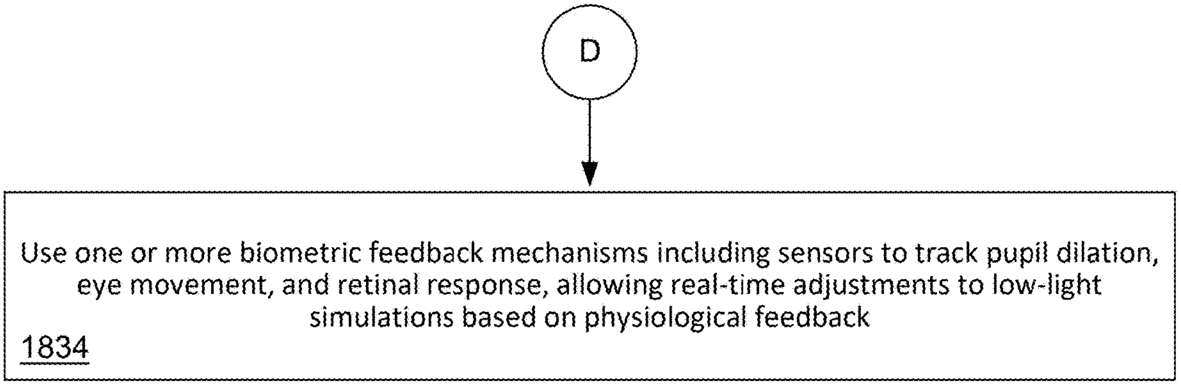

FIG. 18E

Utilize artificial intelligence to adapt the plurality of visual scenarios for an individual for tailoring difficulty and nature of visual tasks based on the individual's visual performance, to provide a personalized assessment for the individual
1836

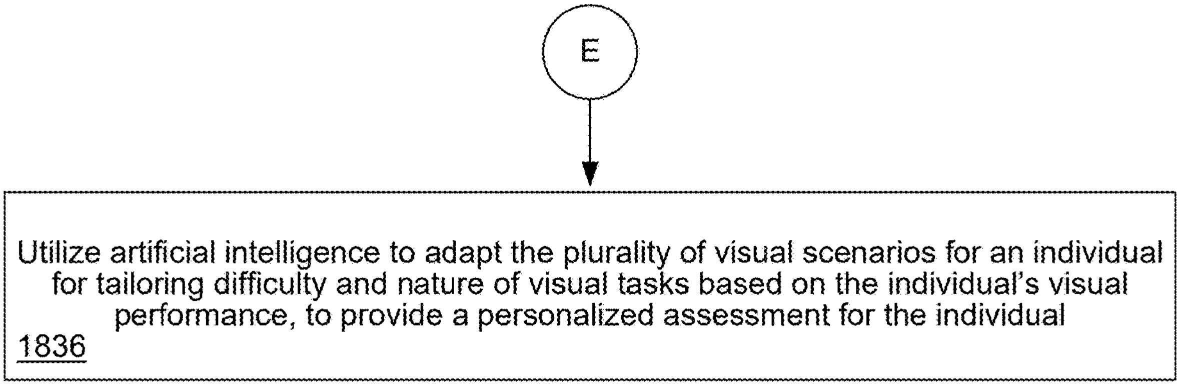

An interactive element representing real-time manipulation of light levels:

2606

- A slider or dial controlling ambient light in the virtual environment
- Buttons to switch between different visual challenges

2608

2610

A Performance Graph:

- X-axis showing decreasing light levels
- Y-axis showing visual performance metrics
- A line graph demonstrating the drop in visual performance as light decreases

2612

2614

An AI interface illustration:

- Real-time analysis of user performance
- Suggestions for adapting the test difficulty based on individual results

2616

2618

Biometric Feedback:

- Real-time displays of pupil dilation
- Eye movement patterns
- Retinal response data

2620

2622

Results Summary:

- Overall night blindness assessment
- Breakdown of performance in different lighting conditions
- Recommendations for further testing or treatment

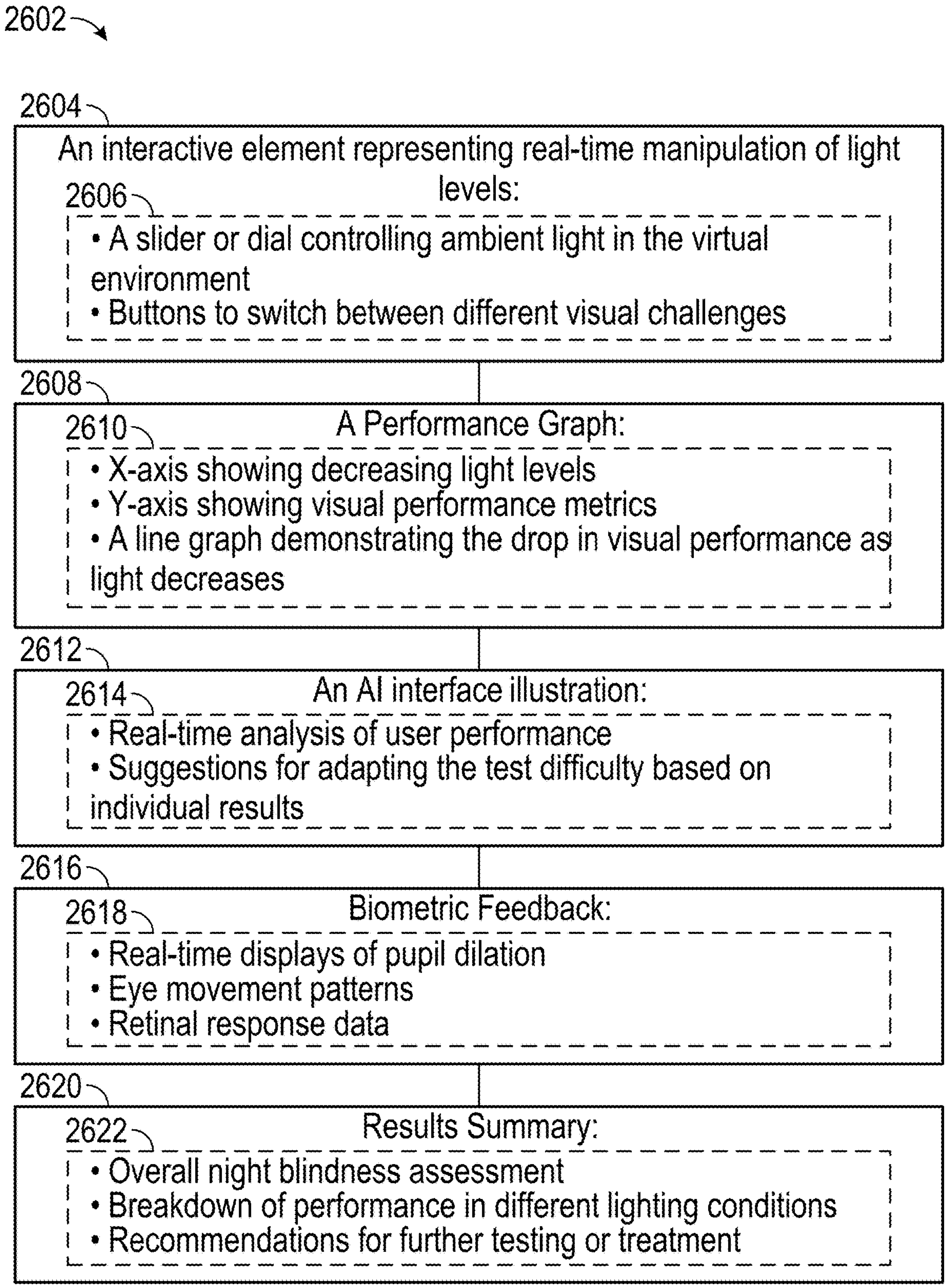

FIG. 26B

METHODS AND SYSTEMS FOR MEASURING AND ADJUSTING VISUAL DISTORTIONS CAUSED BY ASTIGMATISM USING VR-BASED SCENARIOS

TECHNICAL FIELD

The present inventions relate to vision test technology. More specifically, methods, systems, devices, and non-statutory computer-readable storage media are applied to implement vision testing in an extended reality environment.

BACKGROUND

Traditional visual assessment methods have been the cornerstone of evaluating eye health and vision for many years. These methods are typically conducted in clinical environments, where specialized equipment and standardized procedures are used to ensure accurate and reliable results. The parameters for these assessments are generally fixed, reflecting the controlled nature of the clinical setting.

Over time, these techniques have become the accepted standard for diagnosing and monitoring visual conditions, forming the basis of routine eye care practices in medical offices, hospitals, and specialized eye care facilities. Despite their widespread use, these methods have traditionally been limited to professional settings, where they can be conducted under the supervision of trained healthcare providers using dedicated equipment.

SUMMARY

The present disclosure relates to innovative methods and systems that can revolutionize vision care, making vision testing and other exams more accessible and affordable for patients. Additionally, it is contemplated that the principles and features of the present disclosure can be implemented in numerous other applications of display technology, including headsets, heads-up displays, and other micro-displays (e.g., microLED and microOLED) to address challenges and limitations inherent in such products and their uses.

In accordance with at least some embodiments disclosed herein is the realization that traditional methods for visual assessment do not allow for dynamic adjustment of test parameters, leading to less accurate assessments, nor can they be implemented to test eyes and vision at home using household devices in a consistent and environment-locked manner.

Some embodiments are directed to a method of implementing a virtual vision test at an electronic device including a head-mounted display (HMD) and a camera. The method includes executing a user application configured to enable the virtual vision test; generating a virtual reality (VR) user interface corresponding to a three-dimensional (3D) virtual environment; focusing the camera on an eye area of a user wearing the electronic device; displaying, on the user interface, a visual stimulus corresponding to the virtual vision test; while displaying the visual stimulus, in real time, capturing a sequence of eye images using the camera of the electronic device; determining eye movement information including a temporal sequence of eyeball positions based on the sequence of eye images; and comparing the visual stimulus and the eye movement information to determine an eye health condition.

In some embodiments, a user application can be implemented by a head-mounted display configured to create a customized extended reality (XR) environment for a user engaged on an XR information platform. Products may be rendered for the user in a three-dimension format in the XR environment, thereby facilitating eyewear selection and fitting. The XR can be an umbrella term encapsulating Augmented Reality (AR), Virtual Reality (VR), Mixed Reality (MR), and everything in between. In this application, any embodiments that apply a VR system can be implemented using an AR or MR system as well.

Some embodiments are directed to a method of implementing a virtual eye test for evaluating visual acuity and perception. The method is performed at an electronic device including a head-mounted display and a camera. The method includes generating a virtual reality (VR) user interface corresponding to a photorealistic virtual environment. The method also includes rendering the VR user interface on the HMD. The method also includes simulating one or more real-world scenarios in the VR user interface. The method also includes, while simulating the one or more real-world scenarios, in real time: continuously tracking, using the camera, eye movements and response times to visual stimuli presented in the one or more real-world scenarios; and evaluating user response based on the eye movements and the response times for testing visual acuity and perception.

Some embodiments are directed to a method of implementing a virtual eye test for evaluating visual acuity. The method is performed at an electronic device including a head-mounted display and a camera. The method includes generating a virtual reality (VR) user interface corresponding to a three-dimensional virtual environment. The method also includes rendering the VR user interface on the HMD. The method also includes generating and displaying a testing sequence in the VR user interface, wherein the testing sequence including progressively finer details and varying depths in the three-dimensional virtual environment. The method also includes tracking, using the camera, eye movements and response times to visual stimuli presented in the testing sequence. The method also includes evaluating user response based on the eye movements and the response times for testing visual acuity.

Some embodiments are directed to a method of implementing a virtual eye test for evaluating visual acuity. The method is performed at an electronic device including a head-mounted display and a camera. The method includes generating a virtual reality (VR) user interface corresponding to a three-dimensional virtual environment. The method also includes rendering the VR user interface on the HMD. The method also includes simulating a dynamic real-world visual experience in the VR user interface. The method also includes tracking, using the camera, eye movements and response times to visual stimuli presented in the dynamic real-world visual experience. The method also includes evaluating depth perception, motion detection, and spatial awareness based on the eye movements and the response times.

Some embodiments are directed to a method of implementing a virtual eye test for evaluating visual acuity. The method is performed at an electronic device including a head-mounted display and a camera. The method includes generating a virtual reality (VR) user interface corresponding to a three-dimensional virtual environment. The method also includes rendering the VR user interface on the HMD. The method also includes simulating real-world motion and target recognition visual tasks in the VR user interface. The method also includes tracking, using the camera, eye movements and response times to visual stimuli presented in the real-world motion and target recognition visual tasks. The method also includes measuring dynamic visual acuity based on the eye movements and the response times.

Some embodiments are directed to a method of implementing a virtual eye test for assessing astigmatism. The method is performed at an electronic device including a head-mounted display and a camera. The method includes generating a virtual reality (VR) user interface corresponding to a three-dimensional virtual environment. The method also includes rendering the VR user interface on the HMD. The method also includes simulating, in the VR user interface, a plurality of visual scenarios requiring focus adjustments. The method also includes tracking, using the camera, dynamic focus adjustment to visual stimuli presented in the plurality of visual scenarios. The method also includes measuring astigmatism based on the dynamic focus adjustment.

Some embodiments are directed to a method of implementing a virtual eye test for measuring and adjusting for visual distortions caused by astigmatism. The method is performed at an electronic device including a head-mounted display and a camera. The method includes generating a virtual reality (VR) user interface corresponding to a three-dimensional virtual environment. The method also includes rendering the VR user interface on the HMD. The method also includes simulating, in the VR user interface, a plurality of visual scenarios. The method also includes tracking, using the camera, user interactions and responses to visual stimuli presented in the plurality of visual scenarios. The method also includes measuring and adjusting for visual distortions based on the user interactions and responses.

Some embodiments are directed to a method of implementing a virtual eye test for assessing night blindness. The method is performed at an electronic device including a head-mounted display and a camera. The method includes generating a virtual reality (VR) user interface corresponding to a three-dimensional virtual environment. The method also includes rendering the VR user interface on the HMD. The method also includes simulating, in the VR user interface, a plurality of visual scenarios, each visual scenario corresponding to a different lighting condition. The method also includes tracking, using the camera, user interactions and responses to visual stimuli presented in the plurality of visual scenarios. The method also includes measuring night blindness based on the user interactions and responses.

Some embodiments are directed to a system for implementing a virtual eye test. The system includes a head-mounted display including a display and one or more cameras. The system also includes one or more processors and memory storing one or more programs configured to be executed by the one or more processors. The one or more programs includes instructions for a user interface module configured to generate a virtual reality (VR) user interface corresponding to a three-dimensional virtual environment. The one or more programs also includes instructions for a rendering module configured to render the VR user interface on the HMD. The one or more programs also includes instructions for a simulation module configured to simulate one or more scenarios in the VR user interface. The one or more programs also includes instructions for a tracking module configured to continuously track, using at least one of the one or more cameras, eye movements and response times to visual stimuli presented in the one or more scenarios. The one or more programs also includes instructions for an evaluation module configured to analyze user interactions and system performance to determine and measure at least one of: visual acuity and perception, depth perception, motion detection, spatial awareness, dynamic visual acuity, astigmatism, or night blindness, based on the tracked eye movements and response times.

In another aspect, a non-transitory computer readable storage medium is provided, according to some embodiments. The medium stores one or more programs for execution by one or more processors of a computer system, the one or more programs including instructions for performing any of the methods described herein.

In another aspect, an electronic device is provided, according to some embodiments. The electronic device includes an HMD, a camera, one or more processors, and memory for storing one or more programs for execution by the one or more processors, the one or more programs including instructions for performing any of the methods described herein.

Additional features and advantages of the subject technology will be set forth in the description below, and in part will be apparent from the description, or may be learned by practice of the subject technology. The advantages of the subject technology will be realized and attained by the structure particularly pointed out in the written description and embodiments hereof as well as the appended drawings.

It is to be understood that both the foregoing general description and the following detailed description are exemplary and explanatory and are intended to provide further explanation of the subject technology.

BRIEF DESCRIPTION OF THE FIGURES

Various features of illustrative embodiments of the inventions are described below with reference to the drawings. The illustrated embodiments are intended to illustrate, but not to limit, the inventions.

FIGS. 13A-13E show a flow diagram of an example process for implementing a virtual eye test for evaluating visual acuity and perception, according to some embodiments.

FIGS. 14A-14F show a flow diagram of an example process for implementing a virtual eye test for evaluating dynamic visual acuity, according to some embodiments.

FIGS. 15A-15J show a flow diagram of an example process for implementing a virtual eye test for measure and improve dynamic visual acuity with target recognition challenges, according to some embodiments.

FIGS. 16A-16G show a flow diagram of an example process for assessing astigmatism by simulating visual scenarios requiring focus adjustments, according to some embodiments.

FIGS. 17A-17G show a flow diagram of an example process for assessing astigmatism by simulating visual scenarios requiring focus adjustments, according to some embodiments.

FIGS. 18A-18F show a flow diagram of an example process for implementing a virtual eye test for evaluating visual acuity and perception, according to some embodiments.

FIG. 26B is a block diagram of example components for VR night blindness assessment, according to some embodiments.

DETAILED DESCRIPTION

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for case of understanding.

Figure 1:
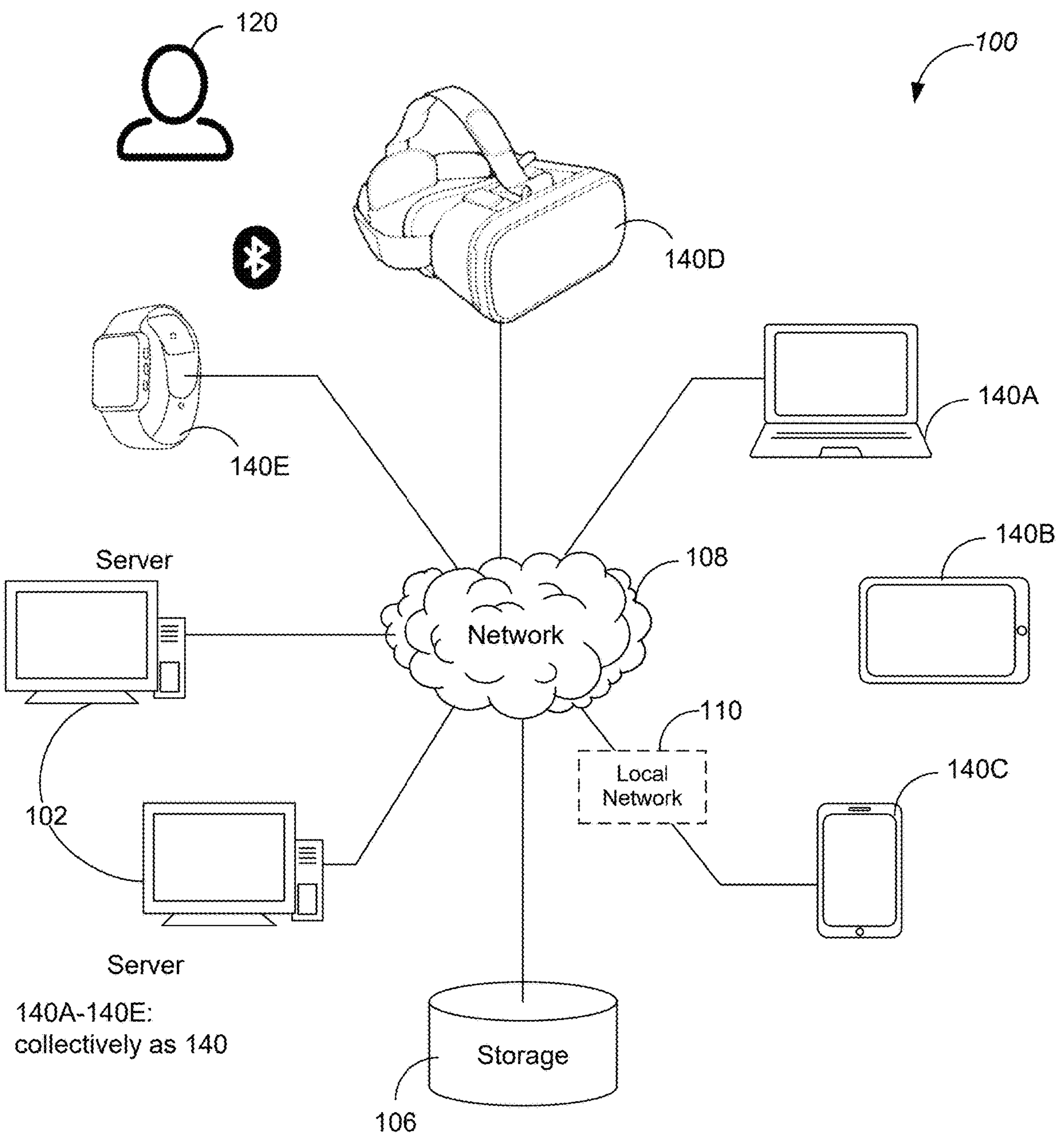
FIG. 1 is an example data processing environment having one or more servers communicatively coupled to one or more computer devices (e.g., includes an headset device), in accordance with some embodiments.

FIG. 1 is an example data processing environment 100 having one or more servers 102 communicatively coupled to one or more computer devices 140 (e.g., includes an headset device 140D), in accordance with some embodiments. The one or more computer devices 140 are electronic devices having computational capabilities, and may be, for example, desktop computers 140A, tablet computers 140B, mobile phones 140C, or intelligent, multi-sensing, network-connected home devices (e.g., a depth camera, a visible light camera). In some embodiments, the one or more computer devices 140 include a headset device 140D (also called a head-mounted display 140D) configured to render extended reality content. In some embodiments, the one or more computer devices 140 include a wireless wearable device 140E (e.g., a smart watch, a fitness band) configured to track health data (e.g., heart rate, quality of sleep) and activity data (e.g., steps walked, stairs climbed) of a user wearing the device 140E. Each computer device 140 can collect data or user inputs, executes user applications, and present outputs on its user interface. The collected data or user inputs can be processed locally at the computer device 140 and/or remotely by the server(s) 102. The one or more servers 102 provides system data (e.g., boot files, operating system images, and user applications) to the computer devices 140, and in some embodiments, processes the data and user inputs received from the computer device(s) 140 when the user applications are executed on the computer devices 140. In some embodiments, the data processing environment 100 further includes a storage 106 for storing data related to the servers 102, computer devices 140, and applications executed on the computer devices 140. For example, storage 106 may store video content, static visual content, and/or audio data.

The one or more servers 102 can enable real-time data communication with the computer devices 140 that can be remote from each other or from the one or more servers 102. Further, in some embodiments, the one or more servers 102 can implement data processing tasks that are not completed locally by the computer devices 140. For example, the computer devices 140 include a game console (e.g., the headset device 140D) that executes an interactive online gaming application. The game console receives a user instruction and sends it to a game server 102 with user data. The game server 102 generates a stream of video data based on the user instruction and user data, and provides the stream of video data for display on the game console and other computer devices that can be engaged in the same game session with the game console.

The one or more servers 102, one or more computer devices 140, and storage 106 can be communicatively coupled to each other via one or more communication networks 108, which are the medium used to provide communications links between these devices and computers connected together within the data processing environment 100. The one or more communication networks 108 may include connections, such as wire, wireless communication links, or fiber optic cables. Examples of the one or more communication networks 108 include local area networks (LAN), wide area networks (WAN) such as the Internet, or a combination thereof. The one or more communication networks 108 are, optionally, implemented using any known network protocol includes various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol. A connection to the one or more communication networks 108 may be established either directly (e.g., using 1G/4G connectivity to a wireless carrier), or through a network interface 110 (e.g., a router, switch, gateway, hub, or an intelligent, dedicated whole-home control node), or through any combination thereof. As such, the one or more communication networks 108 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other electronic systems that route data and messages.

In some embodiments, the headset device 140D can be communicatively coupled to a data processing environment 100. The headset device 140D includes one or more cameras (e.g., a visible light camera, a depth camera), a microphone, a speaker, one or more inertial sensors (e.g., gyroscope, accelerometer), and a display. In some situations, the camera captures hand gestures of a user wearing the headset device 140D. In some situations, the microphone records ambient sound includes user's voice commands.

In some embodiments, the headset device 140D is communicatively coupled to one or more servers 102, and enables a centralized vision test management platform with the one or more servers 102. This vision test management platform may aggregate data (e.g., visual stimuli 338, sensor data 342, vision test results 344) from a plurality of user accounts associated with a plurality of users, analyze the aggregated data, and track vision health trends for individual users or user groups. In some embodiments, data are communicated between a headset device 140D and a server 102 in an encrypted format. In some embodiments, the vision test management platform is coupled to a global health database storing epidemiological data, and configured to cross-reference the data collected from its user accounts with the epidemiological data to identify an emerging pattern and a public health concern. For example, a teenager's vision data was collected and analyzed during an extended duration of time (e.g., 10 years) to identify an individual vision development trend, and cross-referenced with an average vision development trend extracted from the global health database. A doctor can rely on a cross-referencing result to determine whether the individual vision development trend is normal or whether the teenager's eyesight drops faster than average teenagers. As such, various embodiments of the vision test management platform integrates biometric data and global health analytics and provides a secure, personalized, and interactive environment for vision testing, which improves precision and user experience of vision assessments and contributes to broader public health monitoring and research initiatives.

Figure 2:
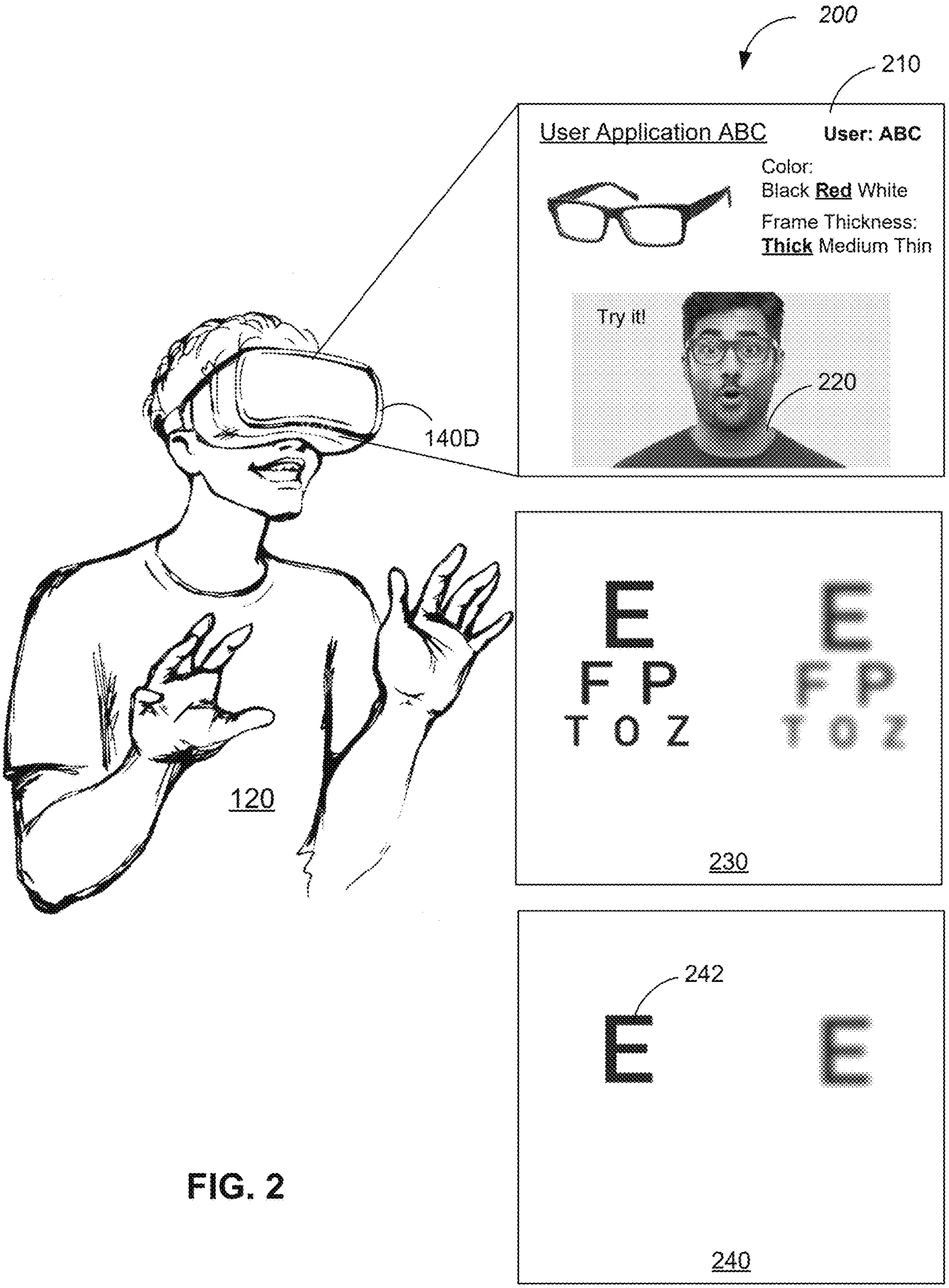
FIG. 2 is an environment in which a computer device (e.g., a headset device) is applied to facilitate visual assessment or eyewear fitting, in accordance with some embodiments.

FIG. 2 is an environment 200 in which a computer device 140 (e.g., a headset device 140D) is applied to facilitate visual assessment or eyewear fitting, in accordance with some embodiments. The XR headset device 140D may be communicatively coupled within the data processing environment 100. The XR headset device 140D may include one or more cameras (e.g., a visible light camera, a depth camera), a microphone, a speaker, one or more inertial sensors (e.g., gyroscope, accelerometer), and a display. In some situations, the camera captures hand gestures of a user wearing the XR headset device 140D. In some situations, the microphone records ambient sound includes user's voice commands. The XR headset device 140D may execute a client-side eyewear fitting application 326 or a client-side visual assessment application 328 (FIG. 3) via a user account associated with a user 120 (e.g., an optometrist user, an optician user, a patient user). In some embodiments, a computer device 140 (e.g., a mobile phone 140C) distinct from the XR headset device 140D can be used to implement the client-side eyewear fitting application 326 or visual assessment application 328 (FIG. 3).

In some embodiments, a first user interface 210 can be displayed on a computer device 140 (e.g., the headset device 140D) associated with the user 120. In some embodiments, an eyewear can be tried on or displayed as being worn by a 2D or 3D image 220 of the user 120. The server 102 or computer device 140 receives, from the first user interface 210, a user feedback message indicating an issue, requesting further improvement, or confirming a fit. In some embodiments, a second user interface 230 can be displayed on a computer device 140 associated with the user 120. The second user interface 230 includes a plurality of optotypes (e.g., six optotypes E, F, P, T, O, and Z) having different sizes. In some embodiments, a third user interface 240 can be displayed on a computer device 140 associated with the user 120. The second user interface 230 can display a temporal sequence of optotypes having respective sizes. Each optotype of a corresponding size can be displayed at one time.

Figure 3:
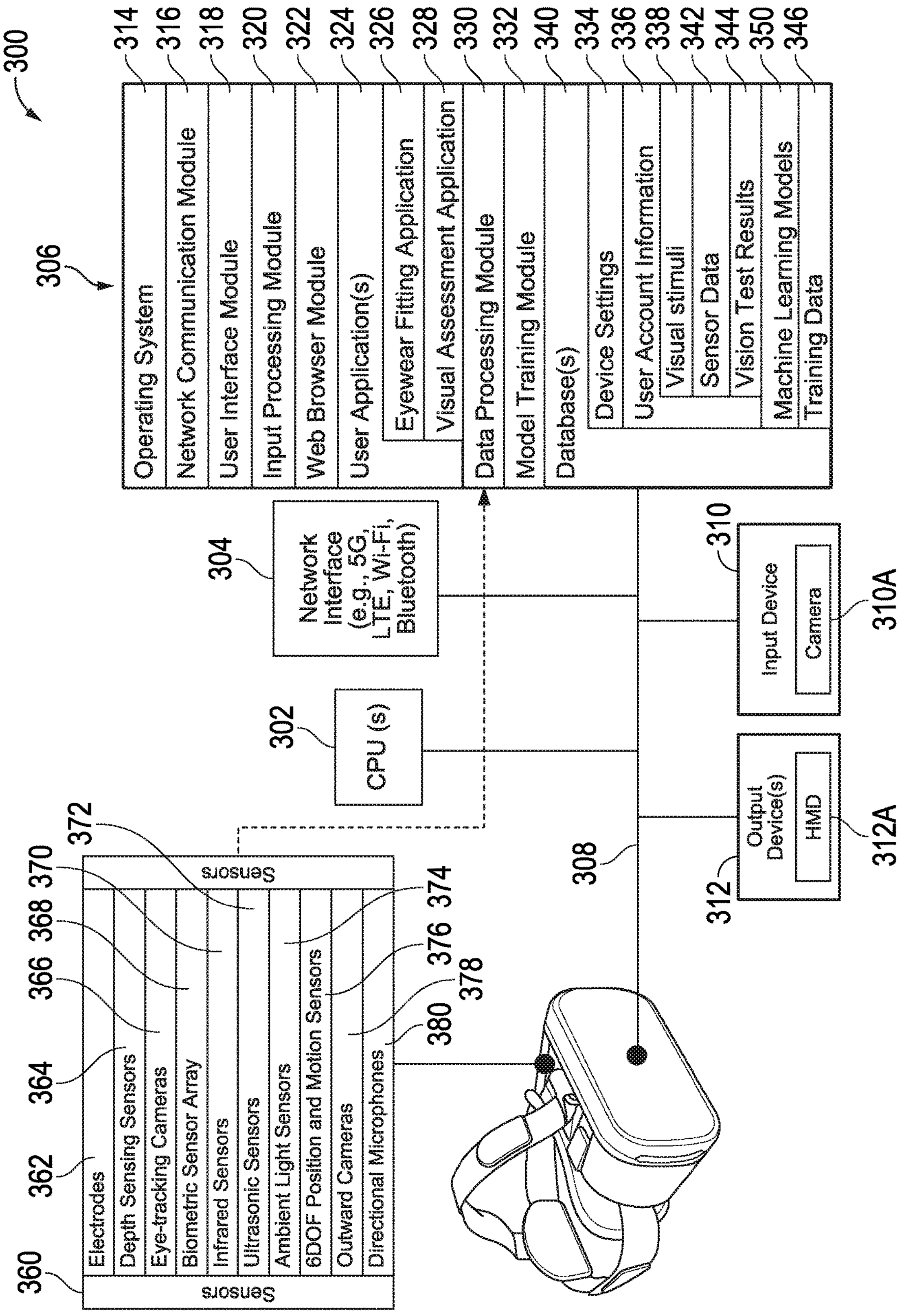
FIG. 3 is a block diagram of a computer system (e.g., including a headset device) configured to implement vision assessment or eyewear fitting, in accordance with some embodiments.

FIG. 3 is a block diagram of a computer system 300 (e.g., including a headset device 140D, a server, or a combination thereof) configured to implement vision assessment or eyewear fitting, in accordance with some embodiments. The computer system 300 typically, includes one or more processing units (CPUs) 302, one or more network interfaces 304, memory 306, and one or more communication buses 308 for interconnecting these components (sometimes called a chipset). The computer system 300 includes one or more input devices 310 that facilitate user input, such as a keyboard, a mouse, a voice-command input unit or microphone, a touch screen display, a touch-sensitive input pad, a gesture capturing camera, or other input buttons or controls. Furthermore, in some embodiments, the computer device 140 of the computer system 300 uses a microphone for voice recognition or an eye tracking camera 366 for tracking eyeball movement. In some embodiments, the computer device 140 includes one or more optical cameras (e.g., an RGB camera), scanners, or photo sensor units for capturing images. The computer system 300 also includes one or more output devices 312 that enable presentation of user interfaces 210 and display content includes one or more speakers and/or one or more visual displays.

The computer system 300 includes one or more sensors 360, which further includes one or more of: a plurality of electrodes 362, one or more depth sensing sensors 364, one or more eye tracking cameras 366, a biometric sensor array 368, one or more infrared sensors 370, one or more ultrasonic sensors 372, one or more ambient sensors 374, one or more motion sensors (e.g., six degree of freedom (6DOF) position and motion sensors 376, one or more outward camera 378, and one or more directional microphones 380. It is noted that the one or more sensors 360 are also included in the input device 310 and used to collect data to the computer system 300.

Memory 306 includes high-speed random-access memory, such as DRAM, SRAM, DDR RAM, or other random-access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some embodiments, memory 306, or the non-transitory computer readable storage medium of memory 306, stores the following programs, modules, and data structures, or a subset or superset thereof:

- Operating system 314 including procedures for handling various basic system services and for performing hardware dependent tasks;
- Network communication module 316 for connecting each server 102 or computer device 140 to other devices (e.g., server 102, computer device 140, or storage 106) via one or more network interfaces 304 (wired or wireless) and one or more communication networks

108, such as the Internet, other wide area networks, local area networks, metropolitan area networks, and so on;
- User interface module 318 for enabling presentation of information (e.g., a graphical user interface for application(s) 324, widgets, websites and web pages thereof, and/or games, audio and/or video content, text, etc.) at each computer device 140 via one or more output devices 312 (e.g., displays, speakers, etc.);
- Input processing module 320 for detecting one or more user inputs or interactions from one of the one or more input devices 310 and interpreting the detected input or interaction;
- Web browser module 322 for navigating, requesting (e.g., via HTTP), and displaying websites and web pages thereof includes a web interface for logging into a user account associated with a computer device 140 or another electronic device, controlling the computer device if associated with the user account, and editing and reviewing settings and data that are associated with the user account;
- One or more user applications 324 for execution by the computer system 300 (e.g., games, social network applications, smart home applications, extended reality application, and/or other web or non-web-based applications for controlling another electronic device and reviewing data captured by such devices), where in some embodiments, an eyewear fitting application 326 can be executed to implement eyewear fitting, and has a plurality of user accounts associated with a plurality of users 120 (e.g., technician users and eyewear users), and in some embodiments, a visual assessment application 328 can be executed to evaluate eyesight of a patient user, and has a plurality of user accounts associated with a plurality of users 120 (e.g., an optometrist user, a patient user);
- Data processing module 330 for processing data associated with the user applications 324, e.g., using machine learning models 350;
- Model training Module 332 for obtaining training data 346 and training machine learning models 350; and
- One or more databases 340 for storing at least data including one or more of:
  - Device settings 334 including common device settings (e.g., service tier, device model, storage capacity, processing capabilities, communication capabilities, etc.) of the computer system 300;
  - User account information 336 for the one or more user applications 324, e.g., user names, security questions, account history data, user preferences, and predefined account settings, where in some embodiments, the user account information 336 includes facial measurements and one or more virtual fitting parameters associated with associated with a user account of an eye fitting application 326, and in some embodiments, the user account information 336 includes visual stimuli 338, sensor data 342, and vision test results 344 associated with a user account of a visual assessment application 328; and
  - Machine learning models 350 including parameters (e.g., weights, biases) used to implement vision test or select eyewear for eyewear users.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various embodiments. In some embodiments, memory 306, optionally, stores a subset of the modules and data structures identified above. Furthermore, memory 306, optionally, stores additional modules and data structures not described above.

Figure 4:
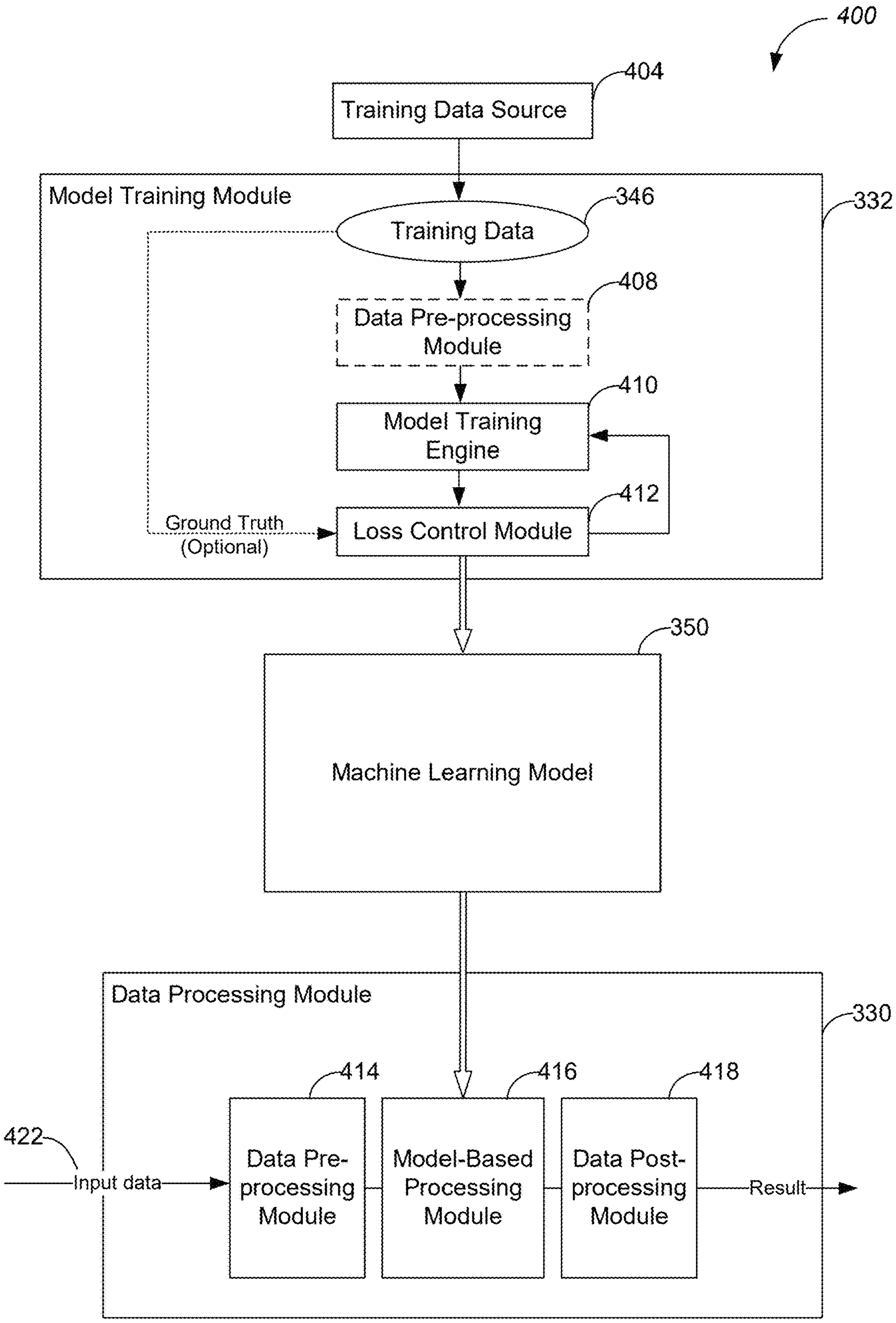
FIG. 4 is a block diagram of a machine learning system for training and applying machine learning models (e.g., for glass making), in accordance with some embodiments.

FIG. 4 is a block diagram of a machine learning system 400 for training and applying machine learning models 350 (e.g., for glass making), in accordance with some embodiments. The machine learning system 400 includes a model training module 332 establishing one or more machine learning models 350 and a data processing module 330 for processing input data 422 using the machine learning model 350. In some embodiments, both the model training module 332 and the data processing module 330 are located within a computer device 140 (e.g., a VR headset), while a training data source 404 provides training data 346 to the computer device 140. In some embodiments, the training data source 404 is the data obtained from the computer device 140 itself, from a server 102, from storage 106, or from another electronic device or computer device 140. Alternatively, in some embodiments, the model training module 332 is located at a server 102, and the data processing module 330 is located in a computer device 140. The server 102 trains the machine learning model 350 and provides the trained models 350 to the computer device 140 to process real-time input data 422 detected by the computer device 140. In some embodiments, the training data 346 provided by the training data source 404 include a standard dataset widely used to train machine learning models 350. The input data 422 further includes sensor data. Further, in some embodiments, a subset of the training data 346 is modified to augment the training data 346. The subset of modified training data is used in place of or jointly with the subset of training data 346 to train the machine learning models 350.

In some embodiments, the model training module 332 includes a model training engine 410, and a loss control module 412. Each machine learning model 350 is trained by the model training engine 410 to process corresponding input data 422 to implement a respective task. Specifically, the model training engine 410 receives the training data 346 corresponding to a machine learning model 350 to be trained, and processes the training data to build the machine learning model 350. In some embodiments, during this process, the loss control module 412 monitors a loss function comparing the output associated with the respective training data item to a ground truth of the respective training data item. In these embodiments, the model training engine 410 modifies the machine learning models 350 to reduce the loss, until the loss function satisfies a loss criteria (e.g., a comparison result of the loss function is minimized or reduced below a loss threshold). The machine learning models 350 are thereby trained and provided to the data processing module 330 of a computer device 140 to process real-time input data 422 from the computer device 140.

In some embodiments, the model training module 402 further includes a data pre-processing module 408 configured to pre-process the training data 346 before the training data 346 is used by the model training engine 410 to train a machine learning model 350. For example, an image pre-processing module 408 is configured to format patients' eye images in the training data 346 into a predefined image format. For example, the preprocessing module 408 may normalize the images to a fixed size, resolution, or contrast level. In another example, an image pre-processing module 408 extracts a region of interest (ROI) corresponding to an eye area.

In some embodiments, the model training module 332 uses supervised learning in which the training data 346 is labelled and includes a desired output for each training data item (also called the ground truth in some situations). In some embodiments, the desirable output is labelled manually by people or labelled automatically by the model training model 332 before training. In some embodiments, the model training module 332 uses unsupervised learning in which the training data 346 is not labelled. The model training module 332 is configured to identify previously undetected patterns in the training data 346 without pre-existing labels and with little or no human supervision. Additionally, in some embodiments, the model training module 332 uses partially supervised learning in which the training data is partially labelled.

In some embodiments, the data processing module 330 includes a data pre-processing module 414, a model-based processing module 416, and a data post-processing module 418. The data pre-processing modules 414 pre-processes input data 422 based on the type of the input data 422. In some embodiments, functions of the data pre-processing modules 414 are consistent with those of the pre-processing module 408, and convert the input data 422 into a predefined data format that is suitable for the inputs of the model-based processing module 416. The model-based processing module 416 applies the trained machine learning model 350 provided by the model training module 332 to process the pre-processed input data 422. In some embodiments, the model-based processing module 416 also monitors an error indicator to determine whether the input data 422 has been properly processed in the machine learning model 350. In some embodiments, the processed input data is further processed by the data post-processing module 418 to create a preferred format or to provide additional information that can be derived from the processed input data. The data processing module 330 uses the processed input data to make eyewear glasses for a patient user.

Examples of the machine learning model 350 include, but are not limited to, an eye trajectory model, an eye position model, an ocular microtremor model, a response analysis model, a response analysis model, a biomedical data model, and medical information models.

Figure 5A:
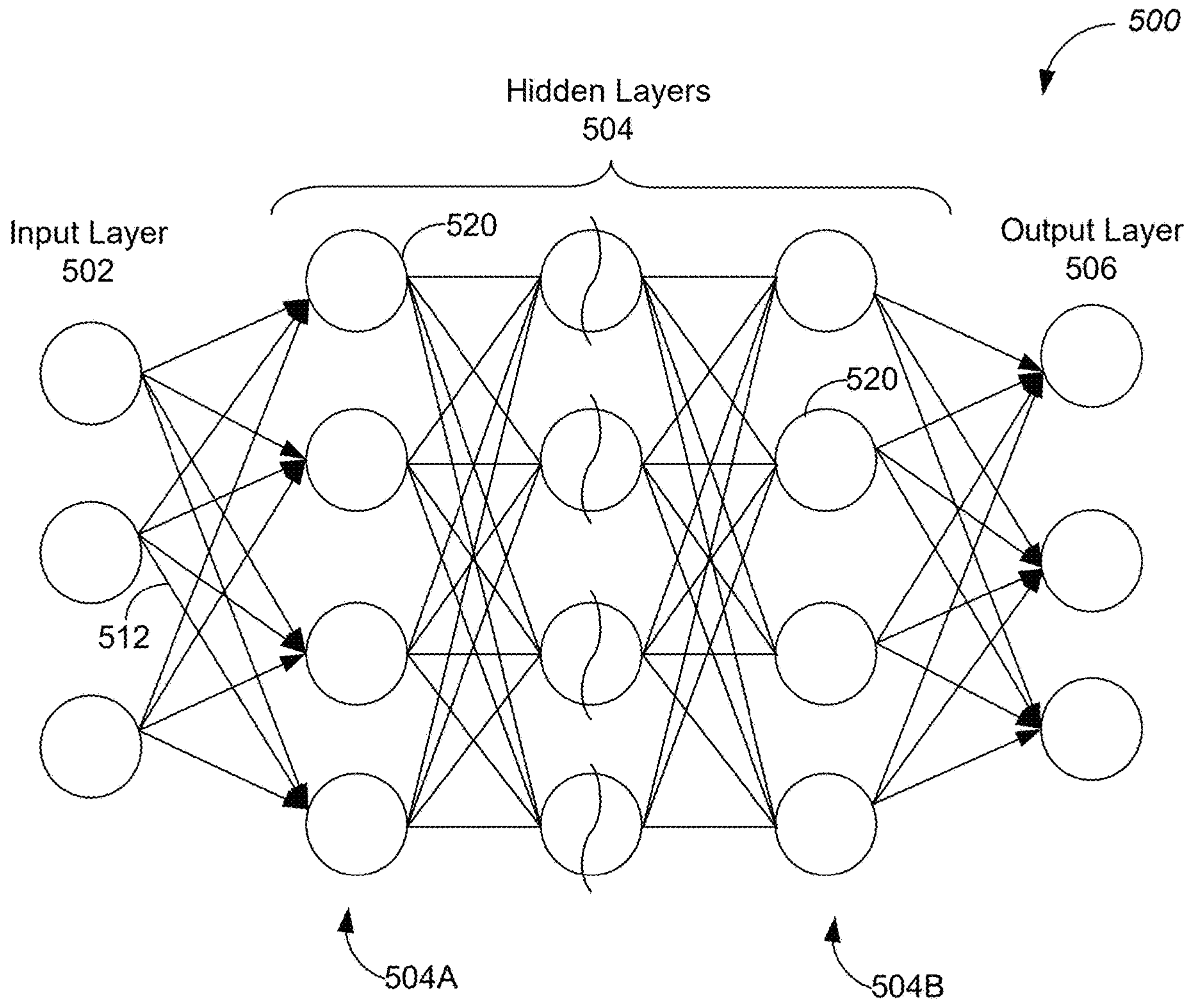
FIG. 5A is a structural diagram of an example neural network applied to process input data in a machine learning model, in accordance with some embodiments.
Figure 5B:
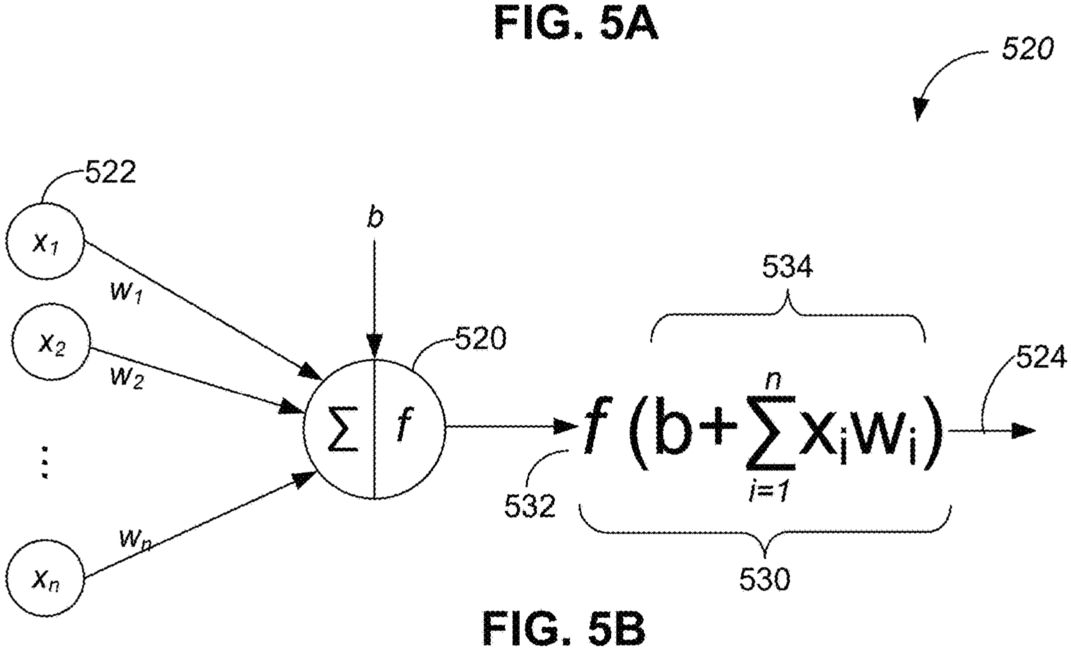
FIG. 5B is an example node in the neural network, in accordance with some embodiments.

FIG. 5A is a structural diagram of an example neural network 500 applied to process input data in a machine learning model 350, in accordance with some embodiments, and FIG. 5B is an example node 520 in the neural network 500, in accordance with some embodiments. It should be noted that this description is used as an example only, and other types or configurations may be used to implement the embodiments described herein. The machine learning model 350 is established based on the neural network 500. A corresponding model-based processing module 416 applies the machine learning model 350 including the neural network 500 to process input data 422 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a machine learning model 350 to process input data. The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs. For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the machine learning model 350 to process input data 422. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of input data are processed by the data processing module 330, and two or more types of neural networks (e.g., both a CNN and an RNN) are applied in the same machine learning model 350 to process the input data jointly.

The training process is a process for calibrating all of the weights wi for each layer of the neural network 500 using training data 346 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted outputs 534 from the previous layer before the activation function 532 is applied. The network bias b provides a perturbation that helps the neural network 500 avoid over fitting the training data. In some embodiments, the result of the training includes a network bias parameter b for each layer.

Figure 6A:
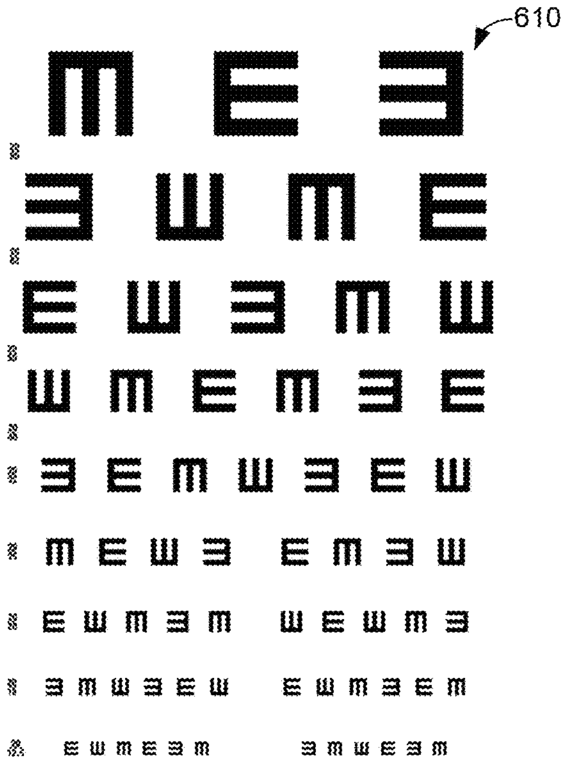
FIG. 6A is an example "tumbling E" chart applied in a visual acuity test.
Figure 6B:
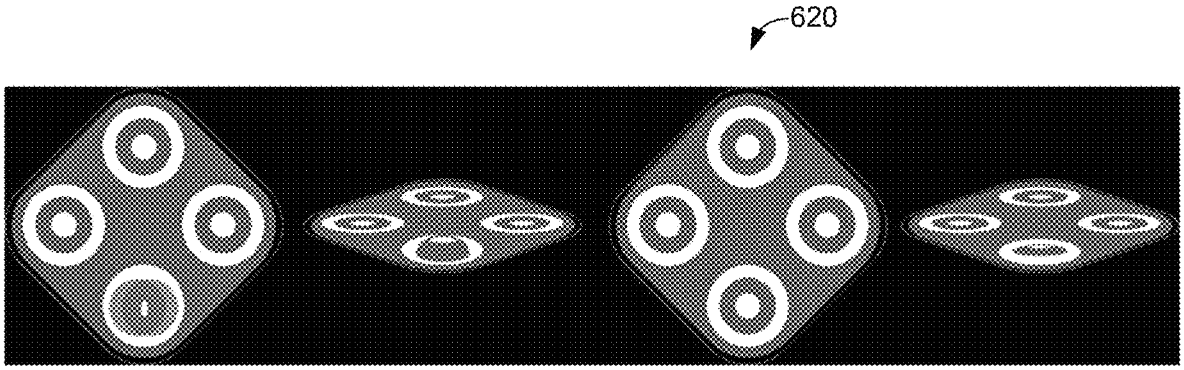
FIGS. 6B-6E are example patterns applied in an astigmatism test, a stereopsis test, a visual field test, and a color blindness test, in accordance with some embodiments.
Figure 6C:
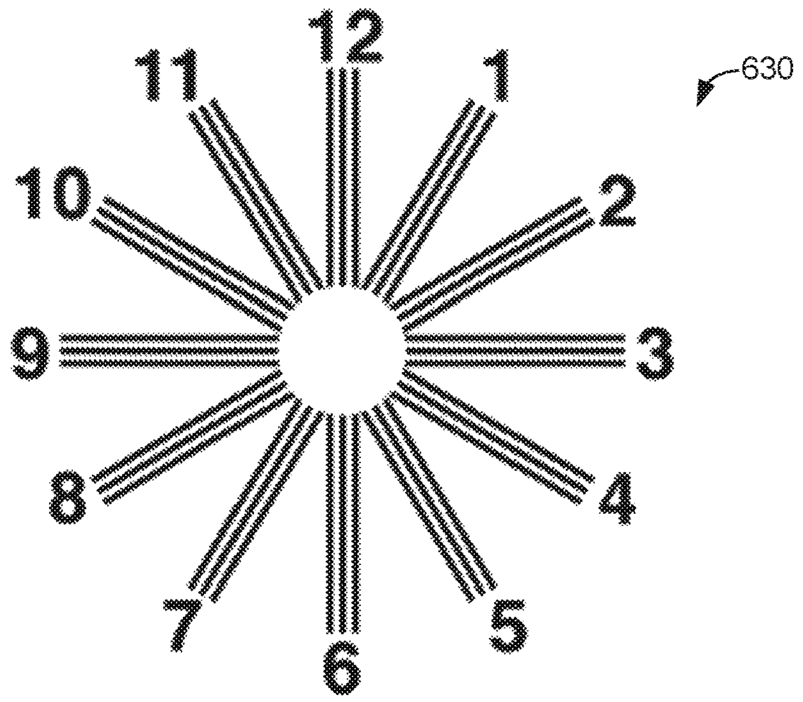
Figure 6D:
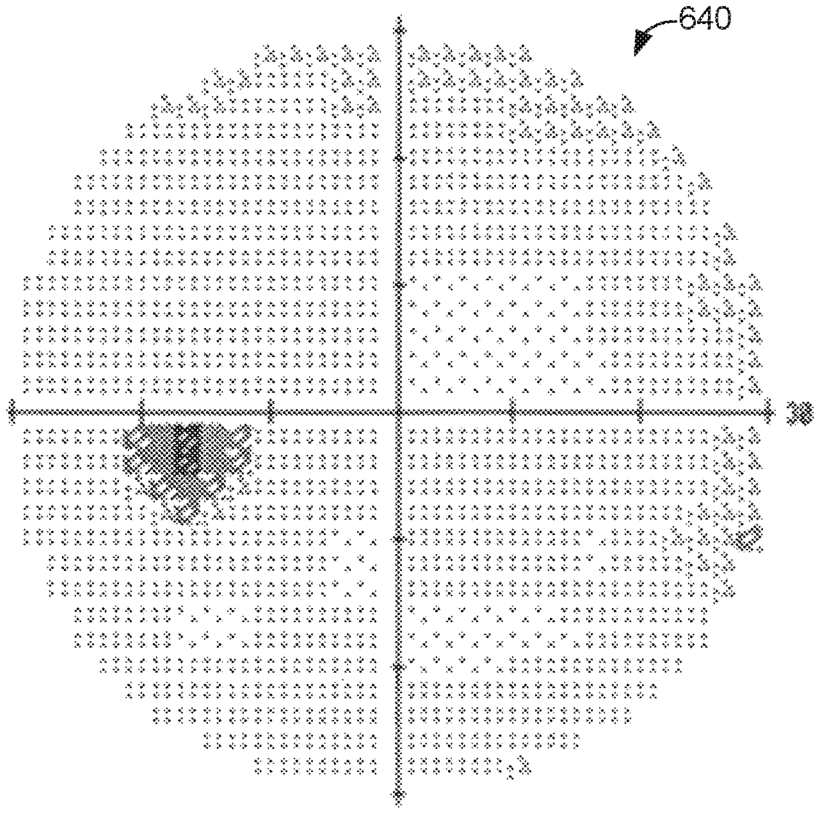
Figure 6E:
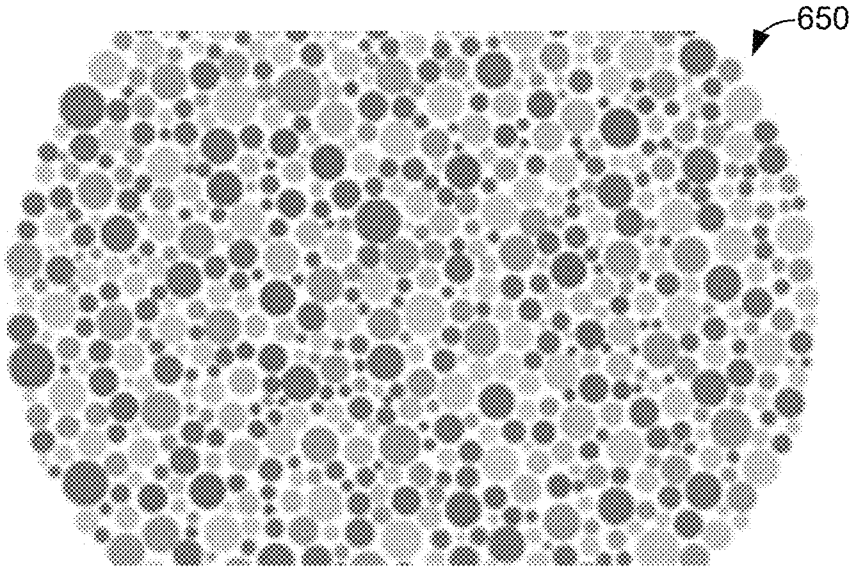

In some embodiments of the present disclosure, a vision test is implemented in a headset device 140D configured to display a user interface creating a three-dimensional (3D) virtual environment. Examples of a vision test implemented in the 3D virtual environment include, but are not limited to a visual acuity test, a visual field test, a visual depth test, a color blindness test, a retinoscopy, a test for stereopsis, a refraction test, an astigmatism test, and a contact lens exam. FIG. 6A is an example "tumbling E" chart 610 applied in a visual acuity test, in accordance with some embodiments. FIGS. 6B, 6C, 6D, and 6E are example patterns 620, 630, 640, and 650 applied in an astigmatism test, a stereopsis test, a visual field test, and a color blindness test, in accordance with some embodiments.

Figure 7:
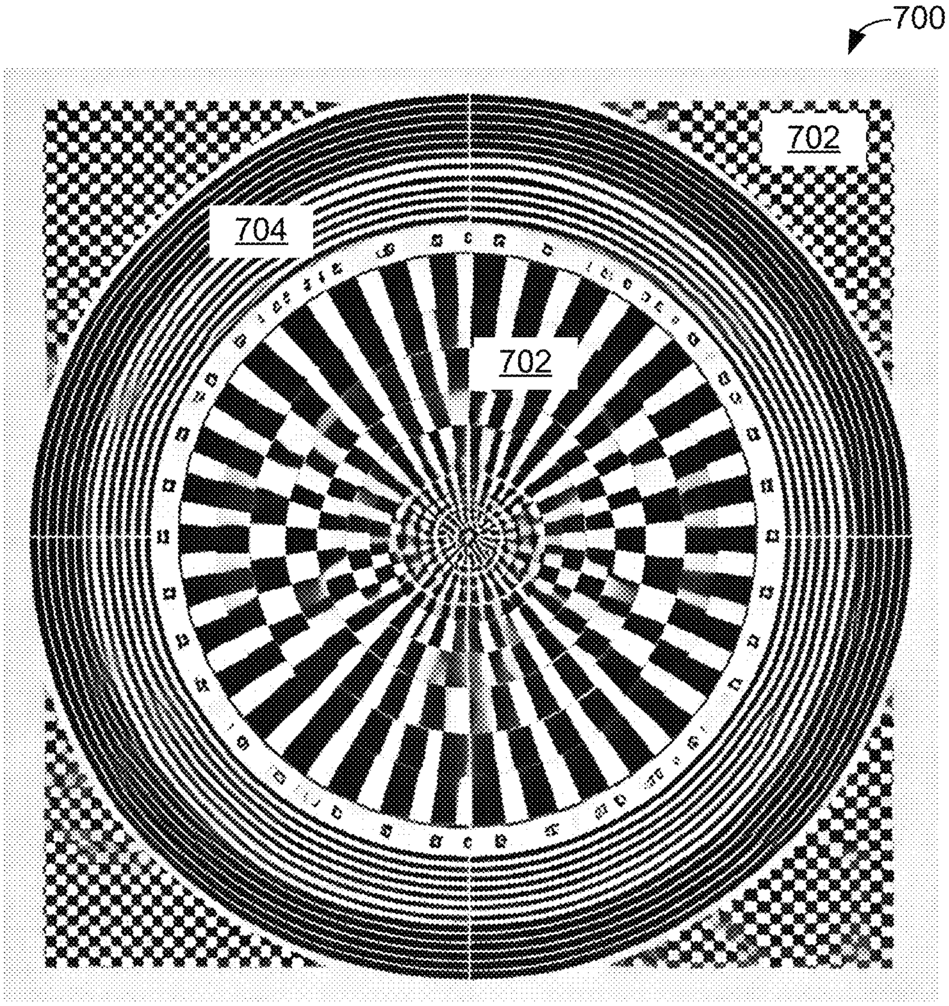
FIG. 7 is another example visual pattern applied to test visual acuity and astigmatism, in accordance with some embodiments.
Figure 8A:
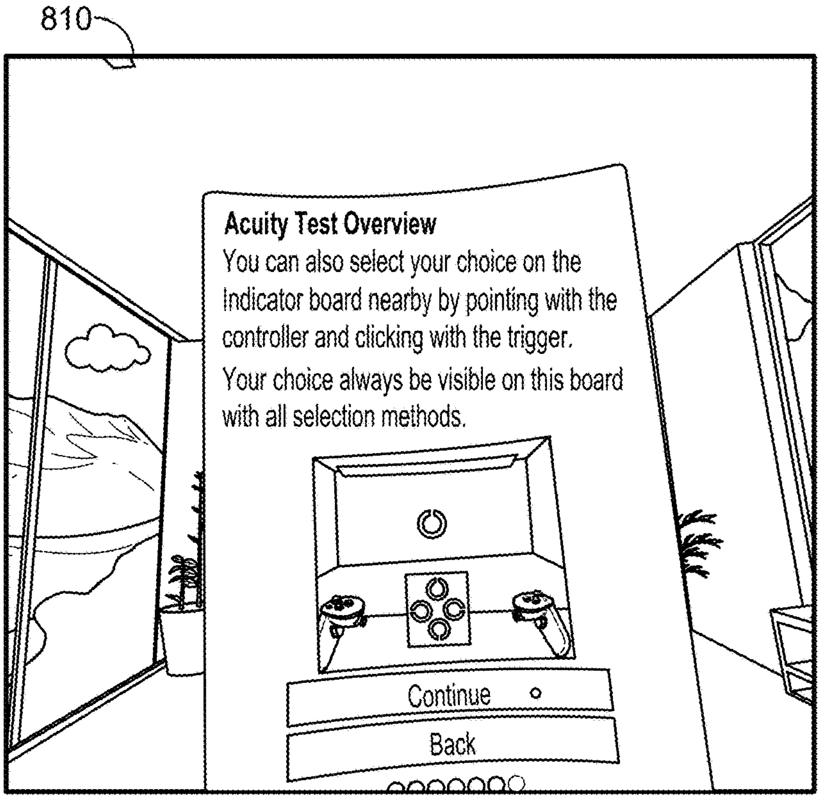
FIGS. 8A-8D include four diagrams of example graphical user interfaces rendered to determine a visual acuity score in a virtual environment created by a headset device, in accordance with some embodiments.
Figure 8B:
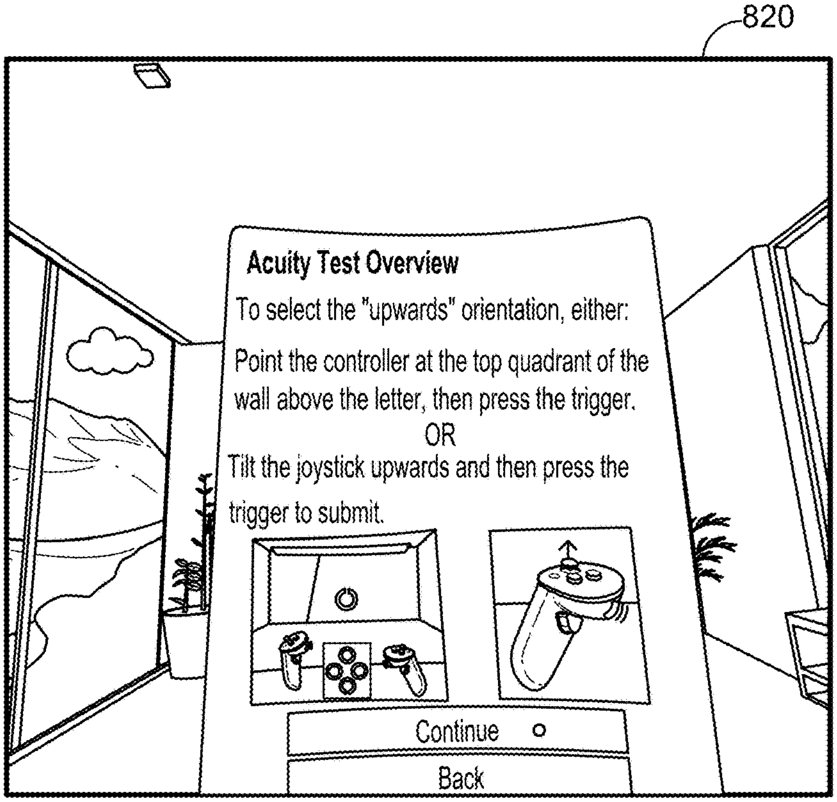
Figure 8C:
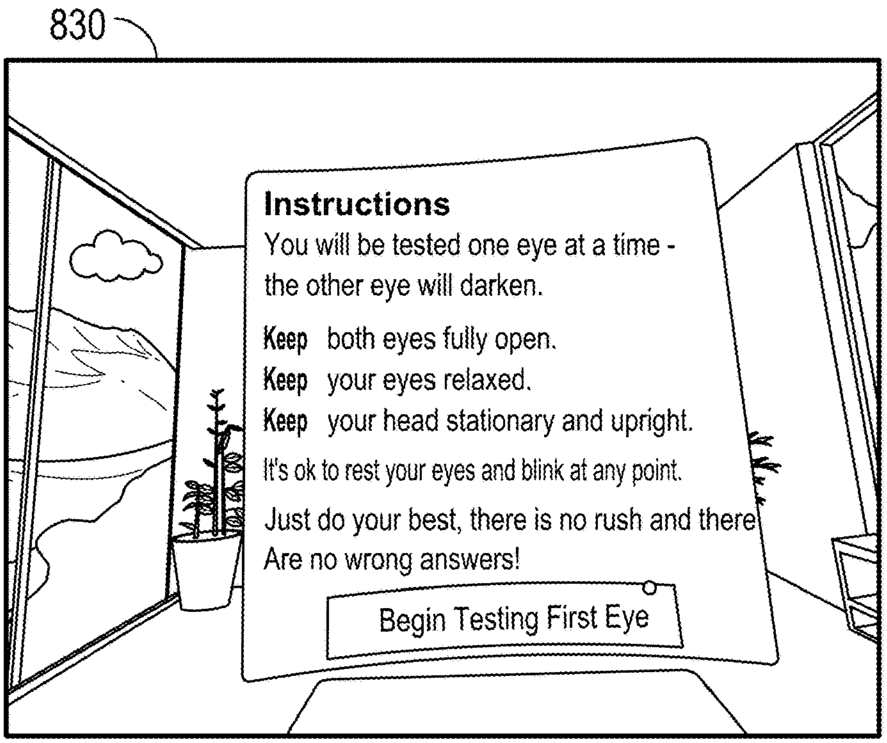
Figure 8D:
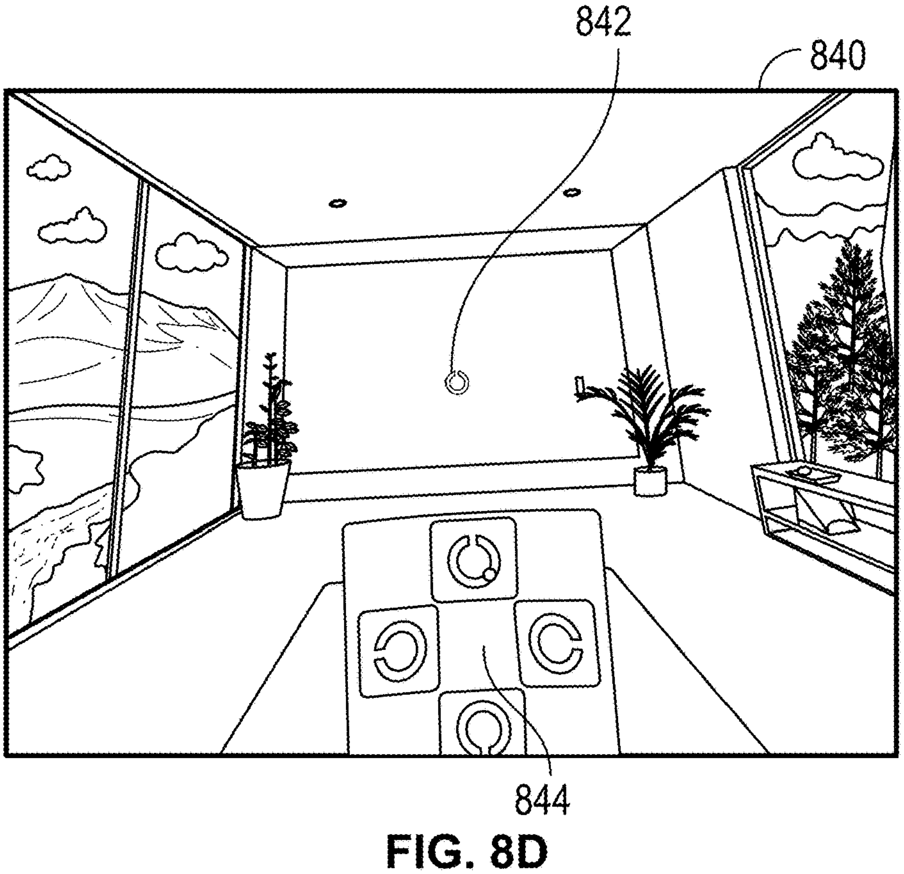

FIG. 7 is another example visual pattern 700 applied to test visual acuity and astigmatism, in accordance with some embodiments. The visual pattern 700 integrates a grid pattern 702 and concentric rings 704. The grid pattern 702 may include evenly spaced horizontal and vertical lines, creating a checkerboard pattern. The grid pattern 702 may be configured to identify distortions in straight lines, which can indicate issues with visual acuity and astigmatism. The concentric rings 704 may expand outward from a center of the visual pattern 700 and can assist in detecting radial distortions, which are common indicators of astigmatism. The visual pattern 700 may be depicted in high-contrast black and white, which ensures maximum clarity and reduces the potential for color-related distortions, making it easier to detect any visual impairment or defect.

FIGS. 8A-8D include four diagrams of example graphical user interfaces 810, 820, 830, and 840 rendered to determine a visual acuity score in a virtual environment created by a headset device 140D, in accordance with some embodiments. The user interface 810 displays an information page including instructions on controlling a headset device 140D to select one of a plurality of optotype candidates to match a target optotype displayed in the virtual environment. The user interface 820 displays an information page including two optional ways of using the controller to select the one of the plurality of optotype candidates. The user interface 830 displays an information page including general guidelines on a visual acuity assessment process. The user interface 840 displays an optotype 842 that is projected on a screen that has a first distance L1 from a user's position in the virtual environment. In a second distance L2 near the user, a selection panel 844 including a plurality of optotype candidates is displayed, prompting the user to select one of the optotype candidates that matches the optotype 842. In some embodiments, in response to a user selection of the one of the optotype candidates, the optotype 842 displayed in the first distance L1 is updated with a new optotype 842. Further, in some embodiments, the new optotype 842 spins at a fast rate for a shortened duration of time (e.g., 2 seconds), before it settles in place of the original optotype 842. In an example, the optotype 842 spins and gradually shrinks in size during the shortened duration of time.

Figure 9A:
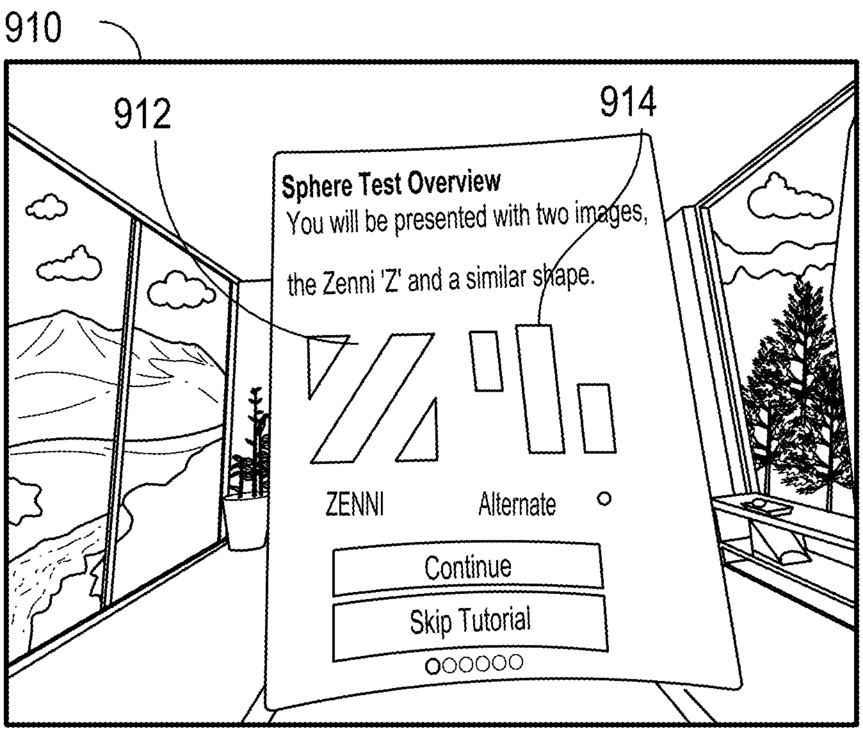
FIGS. 9A-9C include three diagrams of example graphical user interfaces rendered to determine a nearsighted or farsighted power in a virtual environment created by a headset device, in accordance with some embodiments.
Figure 9B:
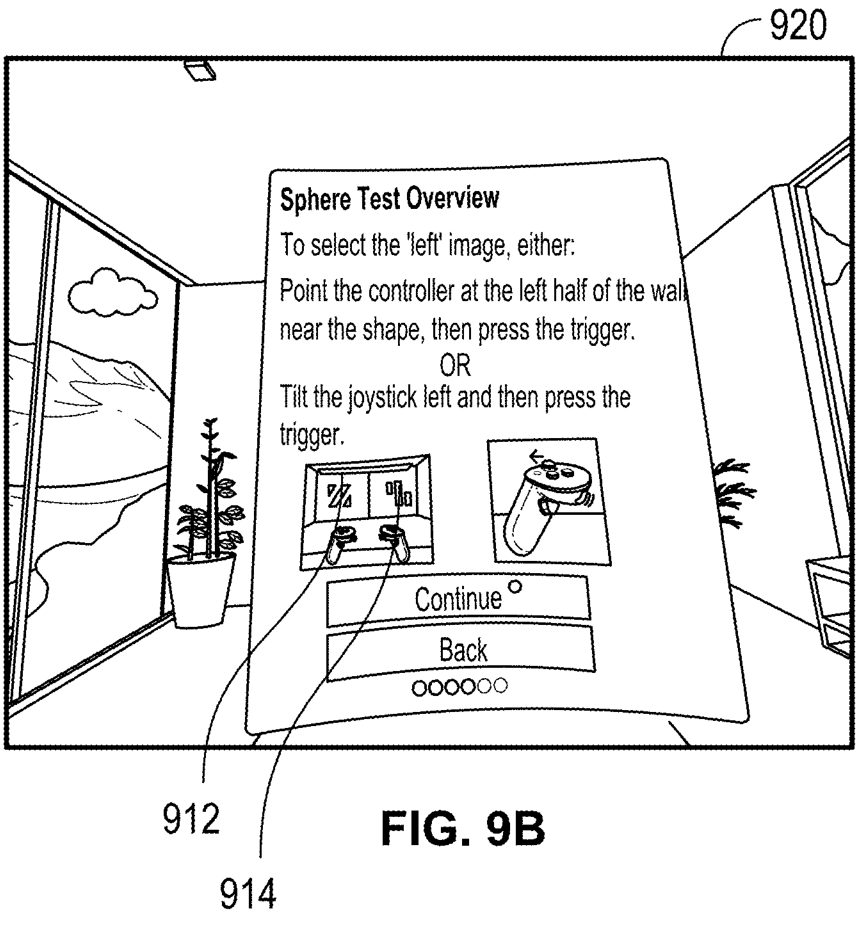
Figure 9C:
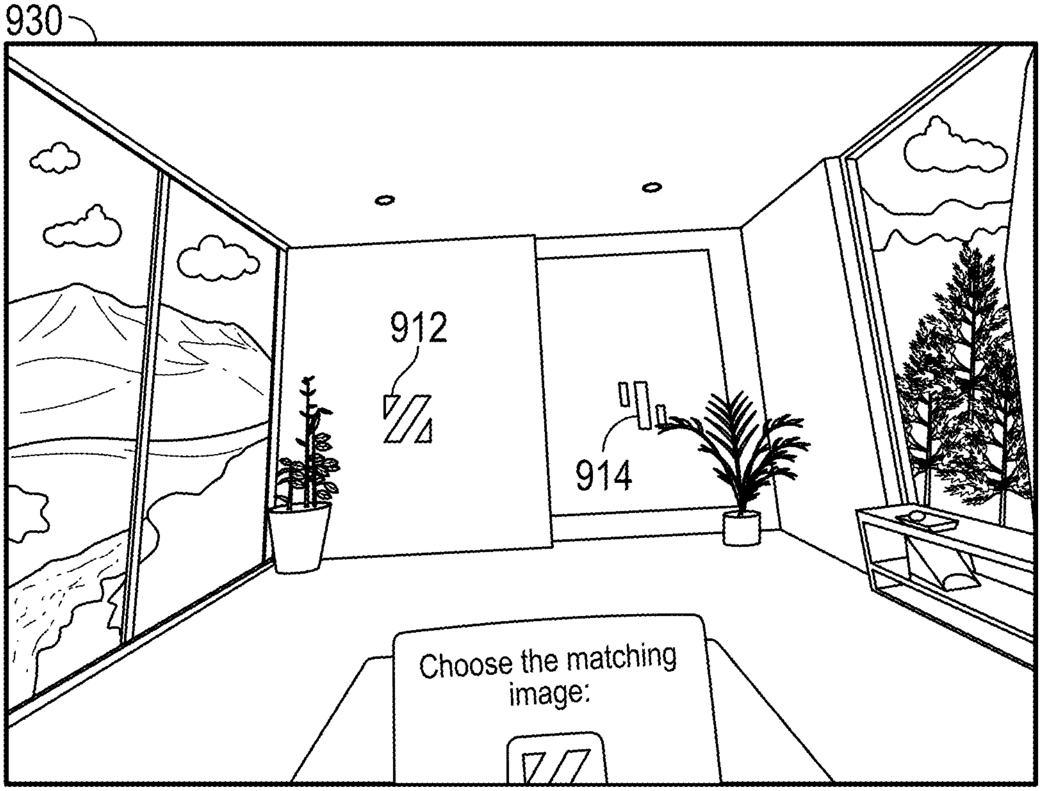
Figure 10A:
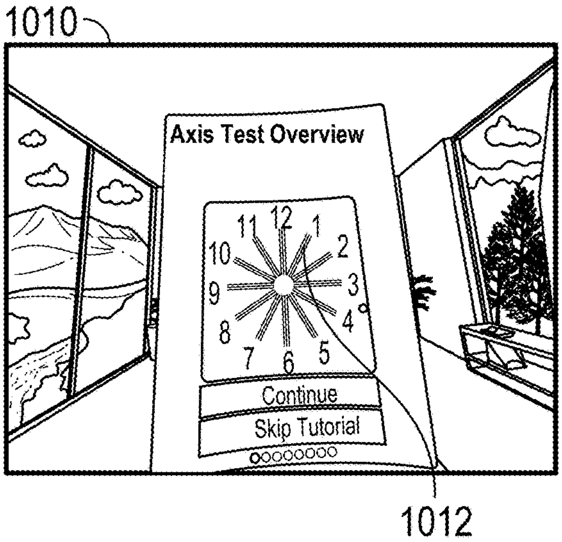
FIGS. 10A-10F include six diagrams of example graphical user interfaces rendered to determine eye stigmatism in a virtual environment created by a headset device, in accordance with some embodiments.
Figure 10B:
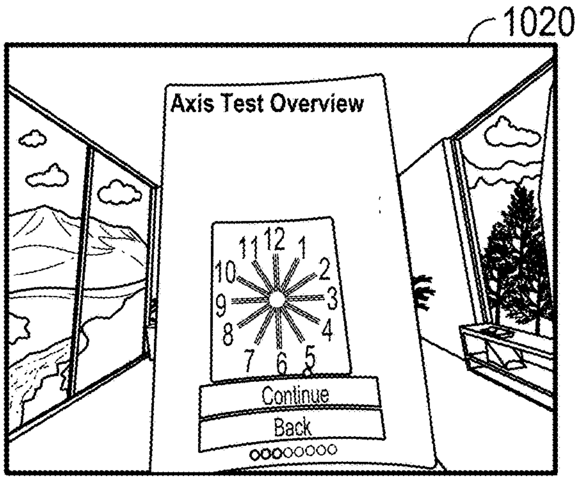
Figure 10C:
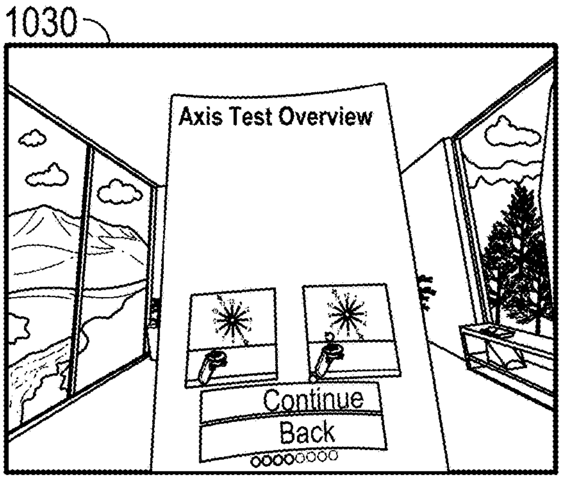
Figure 10D:
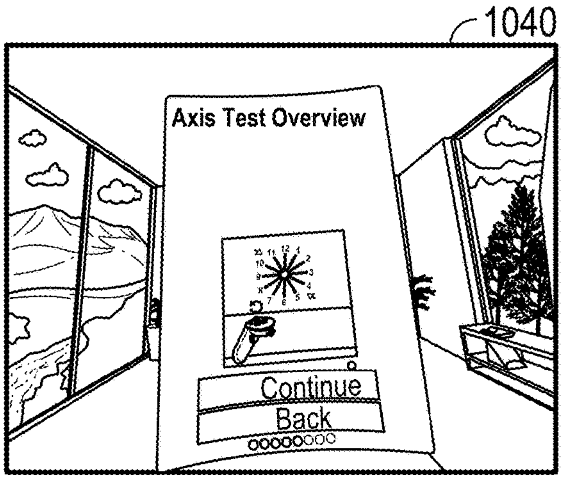
Figure 10E:
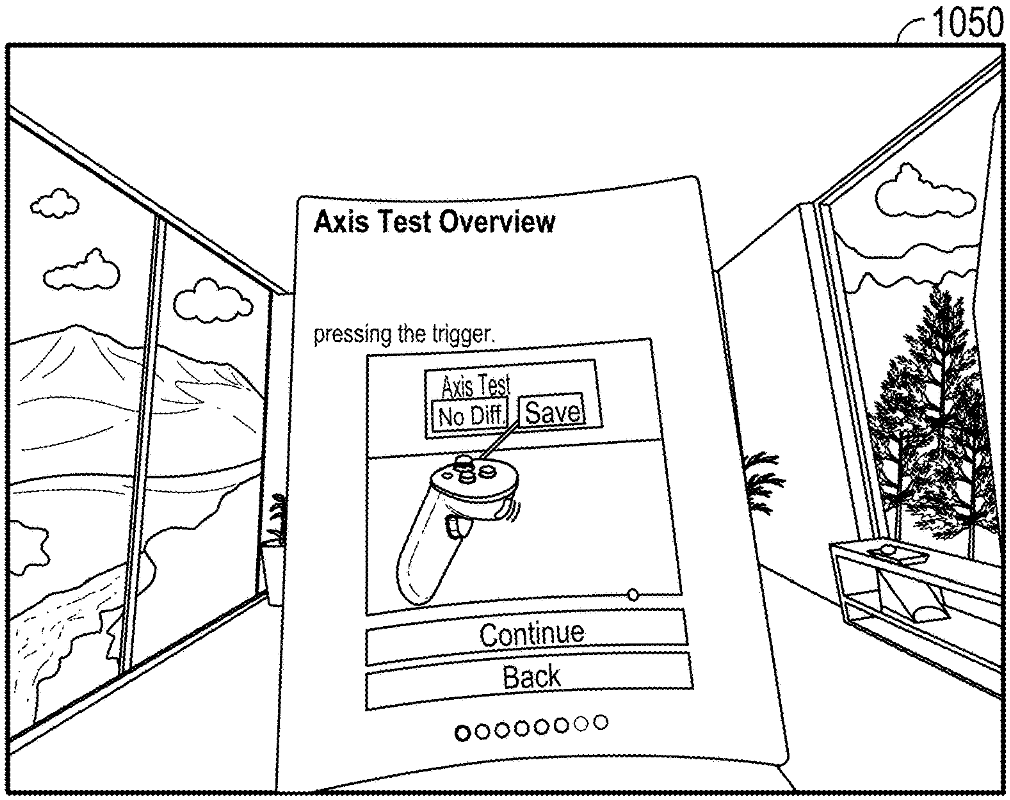
Figure 10F:
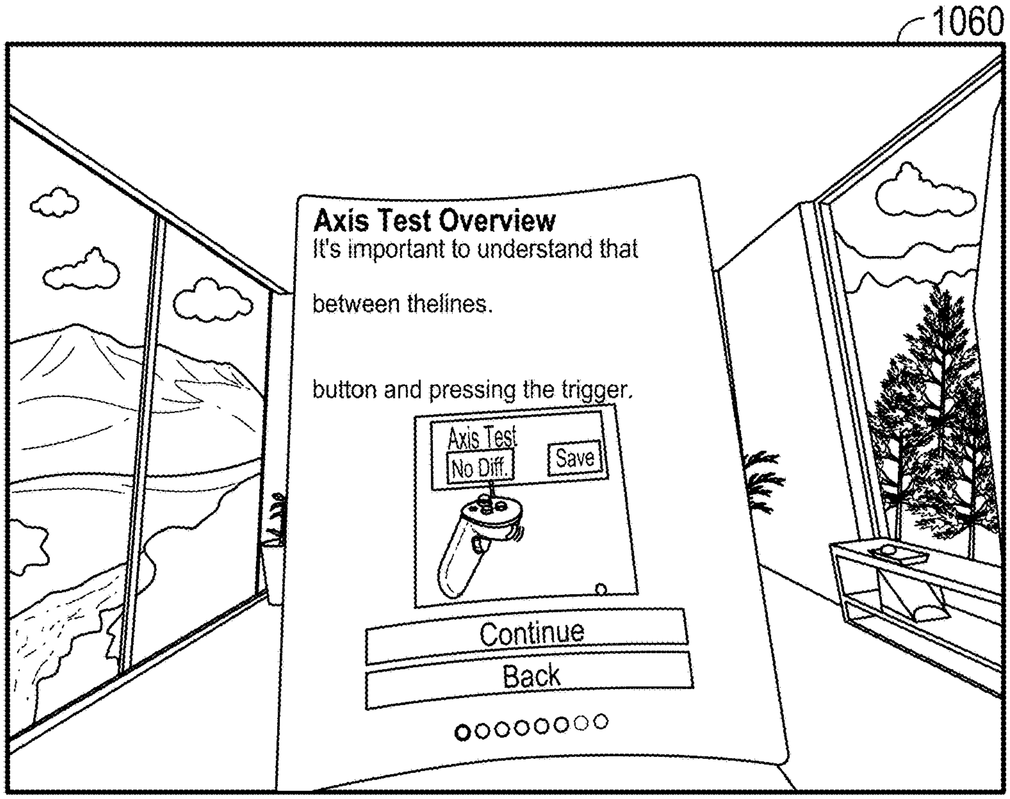

FIGS. 9A-9C include three diagrams of example graphical user interfaces 910, 920, and 930 rendered to determine a nearsighted or farsighted power in a virtual environment created by a headset device 140D, in accordance with some embodiments. The user interface 910 displays an information page explaining that two target optotypes 912 and 914 are displayed in the virtual environment. The user interface 920 displays an information page including two optional ways of using the controller to select one of the two target optotypes 912 and 914. The user interface 930 displays two target optotypes 912 and 914 that are projected on a screen that has a first distance L1 from a user's position in the virtual environment. In this example, the target optotype 912 located on the left is highlighted (e.g., by being displayed in a colored background). In a second distance L2 near the user, a confirmation panel 932 is displayed, prompting the user to select one of the two target optotypes 912 and 914. In some embodiments, in response to a user selection of the one of the two target optotypes 912 and 914, the two target optotypes 912 and 914 displayed in the first distance L1 is updated with a new pair of two target optotypes 912 and 914. Further, in some embodiments, each optotype 912 or 914 spins at a fast rate for a shortened duration of time (e.g., 2 seconds), before it settles in place of the original optotype 912 or 914. In an example, the optotype 912 or 914 spins and gradually shrinks in size during the shortened duration of time.

FIGS. 10A-10F include six diagrams of example graphical user interfaces 1010, 1020, 1030, 1040, 1050, and 1060 rendered to determine eye stigmatism in a virtual environment created by a headset device 140D, in accordance with some embodiments. The user interface 1010 displays an information page explaining that a clock diagram of converging numbered lines 1012 (which is a type of optotype) is displayed in the virtual environment. The user interface 1020 displays an information page explaining what is selected on the clock diagram of converging numbered lines 1012 displayed in the virtual environment. The user interface 1030 displays an information page including two optional ways of using the controller to select lines on the clock diagram of converging numbered lines 1012. The user interface 1040 displays an information page explaining a situation having equally clear lines on the clock diagram of converging numbered lines 1012. The user interface 1050 displays an information page including an instruction using the controller to submit a selection. The user interface 1060 displays an information page including an instruction using the controller to indicate that no difference is observed on the clock diagram of converging numbered lines 1012.

Some embodiments of a VR system are configured to enhance administration and experience of vision tests. The VR system includes a headset device 140D equipped with a display (sometimes referred to as a head-mounted display (HMD)). In some embodiments, the headset device 140D includes and one or more sensors for tracking one or more of eye movement, head orientation, and/or hand gestures of a user wearing the headset device 140D. In some embodiments, the headset device 140D is configured to execute a vision assessment application 328 configured to adaptively manage a sequence of vision tests based on the user's condition. In some embodiments, the headset device 140D is communicatively coupled to a server 102 configured to execute a server-side module for the vision assessment application 328, thereby managing the sequence of vision tests jointly with a device-side module of the vision assessment application 328 executed on the headset device. The vision assessment application 328 is configured to generate a virtual reality (VR) user interface corresponding to a three-dimensional (3D) virtual environment and render visual stimuli 338 in this 3D virtual environment. A range of different vision tests are conducted based on the visual stimuli within an immersive VR space.

In some embodiments, a headset device 140D includes one or more processors 302 and memory 306 storing instructions to execute the vision assessment application 328 for rendering visual stimuli 338 in an output device 312 (e.g., a display) and processing sensor data 342 collected from the sensors 360 in response to the visual stimuli 338. The sensor data 342 may be processed to determine vision test results 344 (e.g., eye movement patterns, response times, and visual perception accuracy) for the user. Further, in some embodiments, VR technology facilitates a personalized control scheme for navigating the vision tests. The personalized control scheme enables the user to interact with the test environment through intuitive hand gestures and eye movements, thereby providing a natural and engaging testing experience. The vision tests may be customized based on individual users' requirements and accommodate a wide range of vision impairments.

In some embodiments, the vision test results 344 are used to generate comprehensive reports on the user's visual performance. For example, the headset device 140D employs a deep learning model that correlates micro-expression data with vision test results 344 to provide holistic assessment of the user's ocular health. In some situations, the vision test results 344 are applied to identify vision conditions of the user and track changes of the vision conditions over time, thereby offering valuable insights to healthcare providers. In various embodiments of this application, eye images are captured and used to determine eye movement information automatically and without user intervention, which is an efficient solution to provide reliable supplemental information that cannot be provided by the user's active responses to visual stimuli.

Example Vision Test System

Figure 11A:
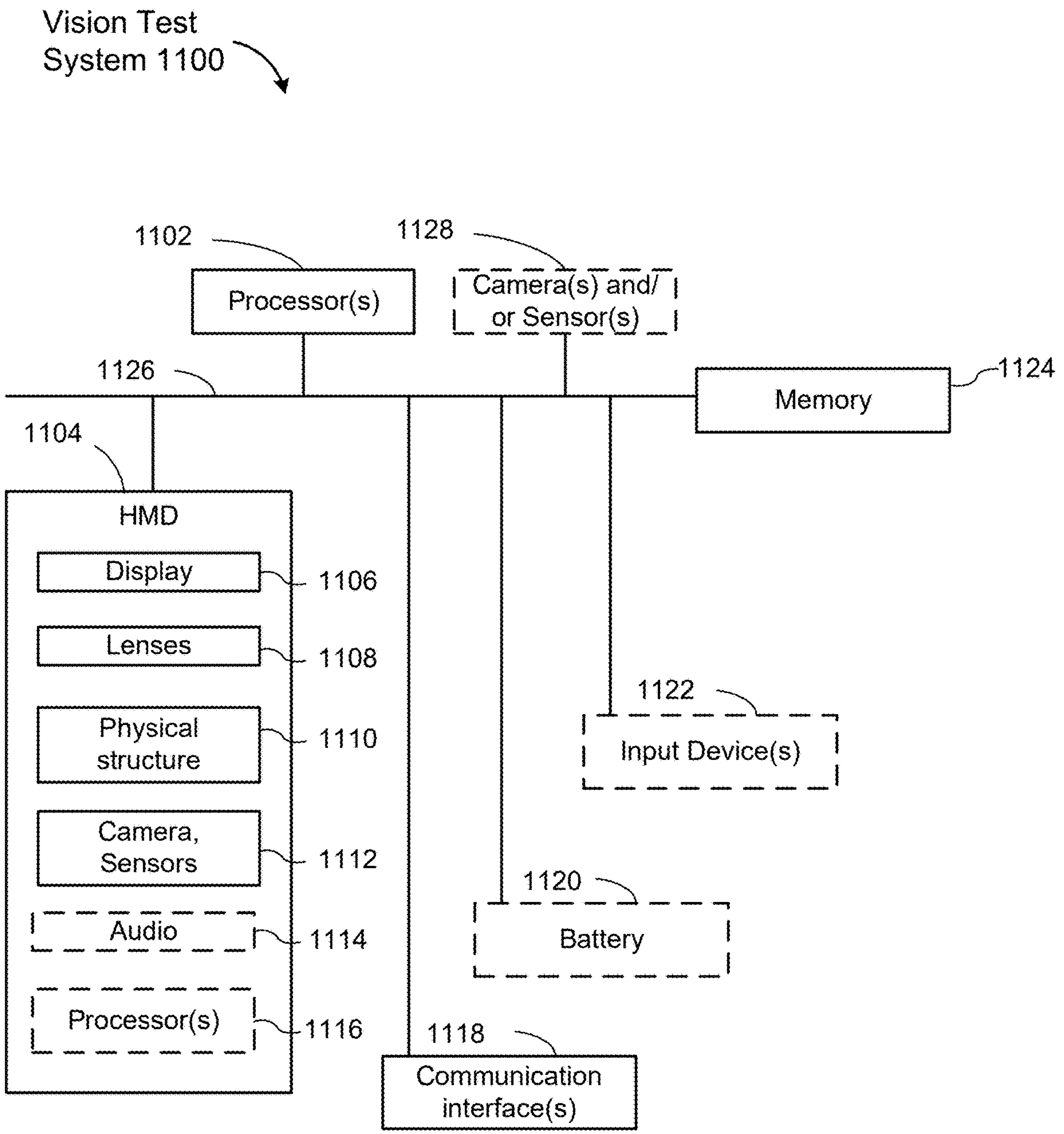
FIGS. 11A and 11B are diagrams showing an example vision test system, in accordance with some embodiments.

FIG. 11A is a diagram showing an example vision test system 1100, in accordance with some embodiments. The vision test system 1100 is implemented using a computer device (e.g., headset device 140D). The computer device includes one or more processors 1102, memory 1124 storing instructions to be implemented by the processor(s) 1102, a head-mounted display 1104, one or more network or other communications interfaces 1118, and one or more communication buses 1126 for interconnecting these and other optional components. The communication buses 1126 may include circuitry that interconnects and controls communications between system components.

The HMD 1104 may include a display 1106 (e.g., one or more high-resolution screens), one or more lenses 1108 (to focus and/or shape display images), cameras and/or sensors 1112 (e.g., outward camera 378, eye-tracking camera 366), and/or a physical structure 1110 (e.g., a structure that holds the components and configured to be worn on a head). The HMD 1104 optionally includes audio devices 1114 and one or more processors 1116 (instead of or in addition to the processors 1102, to implement instructions in the memory 1124). One or more cameras and/or sensors 1128 may be optionally included in some embodiments, instead of or in addition to the cameras and/or sensors 1112 integrated within the HMD 1104.

In some embodiments, the computer device also includes one or more input devices 1122 (e.g., controllers and/or hand-tracking sensors). In some embodiments, the computer device also includes a battery 1120 (e.g., for standalone headsets). In some embodiments, the input device/mechanism 1122 includes a keyboard. In some embodiments, the input device/mechanism 1122 includes a "soft" keyboard, which is displayed as needed on the display 1106, for example, to enable a user to "press keys" that appear on the display 1106. In various embodiments, the communication interface(s) 1118 includes Wi-Fi, Bluetooth, and/or wired connections.

In some embodiments, the memory 1124 includes high-speed random-access memory, such as DRAM, SRAM, DDR RAM, and/or other random-access solid state memory devices. In some embodiments, the memory 1124 includes non-volatile memory, such as one or more magnetic disk storage devices, optical disk storage devices, flash memory devices, or other non-volatile solid state storage devices. In some embodiments, the memory 1124 includes one or more storage devices remotely located from the processor(s) 1102. The memory 1124, or alternatively the non-volatile memory device(s) within the memory 1124, comprises a computer readable storage medium. Memory for headsets include, for example, Random-Access Memory (RAM), such as Low Power Double Data Rate RAM (LPDDR), used for running the operating system, applications, and/or handling real-time data processing. Memory 1124 may also include storage memory, such as flash memory, similar to smartphones (e.g., eMMC or UFS), for storing the operating system, applications, and/or user data. Video memory, often integrated with the GPU in mobile chipsets, can be used to handle graphics processing tasks. Cache memory, such as Static RAM (SRAM), can be used for high-speed memory used by the processors 1102 for quick data access.

Figure 11B:
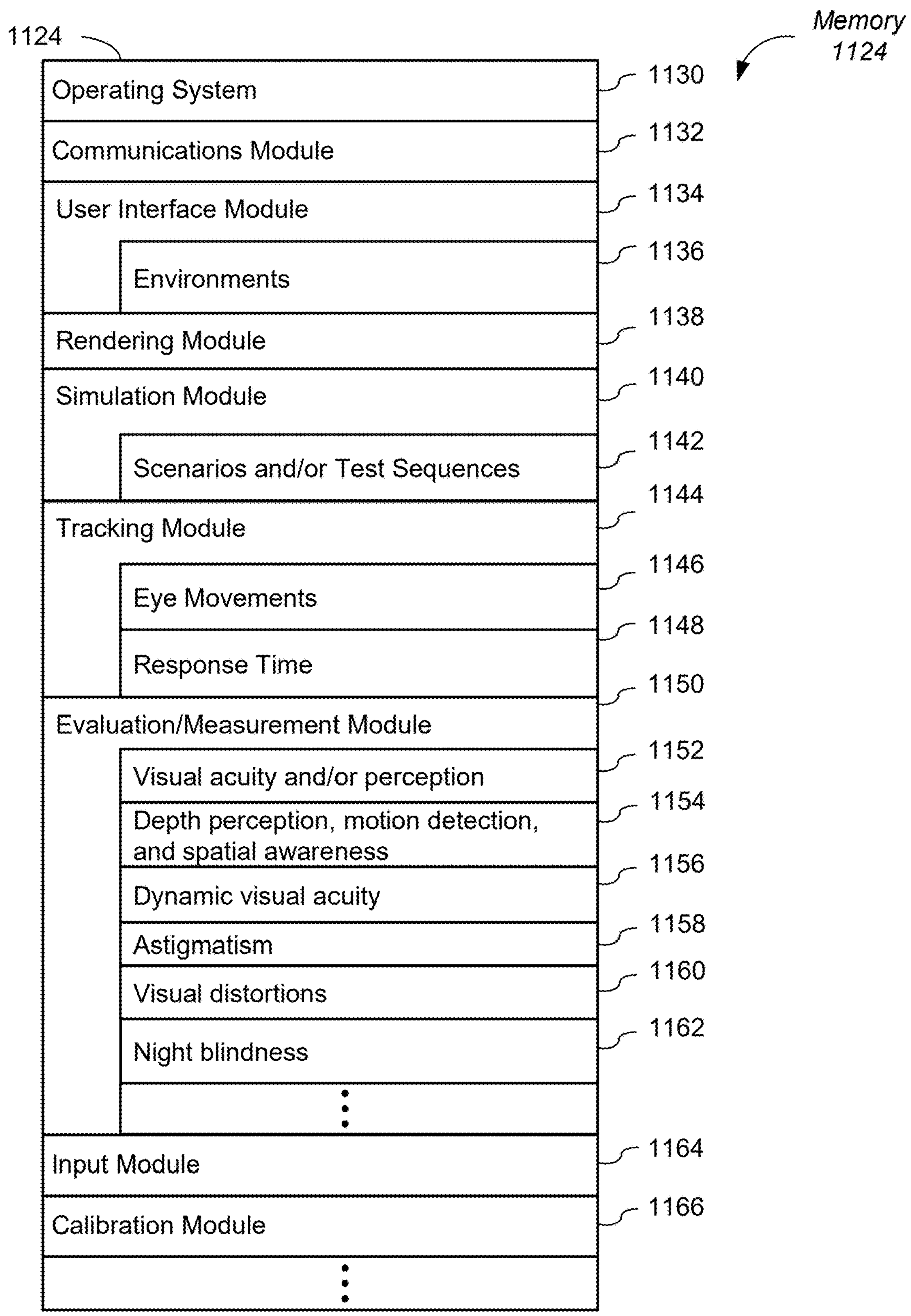

Referring to FIG. 11B, in some embodiments, the memory 1124, or the computer readable storage medium of the memory 1124, stores the following programs, modules, and data structures, or a subset thereof.

- an operating system 1130, which includes procedures for handling various basic system services and for performing hardware dependent tasks;
- a communications module 1132, which is used for connecting the computing device to other computers and devices via the one or more communication network interfaces 1118 (wired or wireless) and/or via one or more communication networks, such as the Internet, other wide area networks, local area networks, metropolitan area networks, and so on;
- a user interface module 1134 (sometimes referred to as the UI module 1134) for managing user interaction with VR/AR environments 1136 (sometimes referred to as three-dimensional virtual environments, photorealistic environments) and/or having system controls. This can include home environment, allowing users to launch apps, adjust settings, and/or navigate menus using virtual pointers or hand gestures;
- a rendering module 1138 for handling the creation and/or display of 3D graphics in real-time. This can include a rendering pipeline, for example Unity's VR rendering pipeline, for optimizing frame rates and/or reducing latency for smooth VR/AR experiences;
- a simulation module 1140 for creating and/or managing the rules, physics, and/or behaviors within the virtual environment. This can, for example, include PhysX in VR games, simulating realistic object interactions and gravity effects. The simulation module 1140 may include one or more scenarios 1142;
- a tracking module 1144 for processing sensor data to determine the position and orientation of the headset and/or controllers. The tracking module can track eye movements 1146 and/or response times 1148. In some embodiments, the eye movements 1146 includes dynamic focus adjustments;
- an evaluation and/or measurement module 1150 for analyzing user interactions and/or system performance for optimization and/or adaptation and feedback to determine and/or measure, for example, visual acuity and/or perception 1152, depth perception, motion detection, and/or spatial awareness 1154, dynamic visual acuity 1156, astigmatism 1158, and/or night blindness 1162;
- an input module 1164 for interpreting and/or processing user input from various sources (e.g., controllers, hand tracking, voice commands). This module can include hand tracking software, translating hand and finger movements into VR interactions; and/or
- a calibration module 1166 for alignment of virtual and physical elements, often including initial setup procedures, for calibrating the device and/or experimental setups based on user data, which can include setup, and/or guiding users through the process of defining their viewing and/or test area and/or calibrating controllers.

The UI module 1134 may generate interactive visual elements that allow users to navigate and interact with the highly realistic 3D virtual world. This may include creating menus and buttons that appear to exist within a 3D space, implementing gesture-based controls that feel natural in the virtual world, designing visual feedback that matches the aesthetic of the environment, and/or integrating information displays seamlessly with the surroundings. The UI module 1134 may utilize various implementation methods, such as game engines (e.g., Unity, Unreal Engine) for UI implementation and integration, and/or 3D modeling software for creating UI assets.

The processing may include processing on host computers for tethered VR headsets, may include on-device processing for standalone VR/AR headsets, and/or cloud processing for computationally intensive tasks. In various embodiments, the UI module 1134 enhances user immersion and presence by, for example, creating UI elements that look and feel like they belong in the photorealistic environment, implementing holographic displays or interactive physical objects, and/or supporting interaction through VR controllers or hand tracking. In some embodiments, the UI module 1134 adapts the UI to different types of virtual environments, ensuring consistency and usability across various scenarios. In some embodiments, the UI module 1134 also handles user input (e.g., in collaboration with an input module, described below) through multiple modalities, including hand tracking, eye tracking, and controller input, to facilitate seamless interaction with the generated UI.

In some embodiments, the rendering module 1138 integrates the VR user interface elements with the photorealistic environment, ensuring proper depth, occlusion, and lighting interactions. In some embodiments, the rendering module 1138 implements stereo rendering techniques to create a sense of depth and dimensionality for the UI elements when displayed on the HMD. In some embodiments, the rendering module 1138 applies distortion correction and lens-specific optimizations to ensure the UI is properly displayed on the HMD's optics. In some embodiments, the rendering module 1138 utilizes techniques like foveated rendering to optimize UI rendering performance, particularly for resource-intensive photorealistic environments. In some embodiments, the rendering module 1138 handles dynamic UI updates and animations in real-time, maintaining consistent frame rates crucial for comfortable VR experiences. In some embodiments, the rendering module 1138 implements anti-aliasing and other image quality enhancements specific to HMD displays to ensure crisp, readable UI elements.

In various embodiments, the one or more scenarios 1142 can include real-world scenarios, dynamic real-world visual experiences, test sequences with progressively finer details, real-world motion and target recognition visual tasks, and/or various visual scenarios (including, for example, scenarios with different lighting conditions). In some embodiments, the simulation module 1140 may be further configured to generate and manage real-world scenarios in the VR user interface, such as simulating everyday activities or specific professional environments. In some embodiments, the simulation module 1140 may be further configured to create and control testing sequences that progressively introduce finer details and objects at varying depths within the three-dimensional virtual environment, allowing for comprehensive visual acuity assessment.

In some embodiments, the simulation module 1140 may be further configured to simulate dynamic real-world visual experiences by incorporating moving objects, changing environments, and interactive elements that respond to user actions. In some embodiments, the simulation module 1140 may be further configured to implement real-world motion and target recognition tasks, such as tracking moving objects or identifying specific targets within complex visual scenes. In some embodiments, the simulation module 1140 may be further configured to generate visual scenarios that require focus adjustments, simulating the need to shift focus between near and far objects in the virtual environment.

In some embodiments, the simulation module 1140 may be further configured to create a diverse range of visual scenarios, each designed to test different aspects of vision or simulate specific real-world conditions. In some embodiments, the simulation module 1140 may be further configured to implement lighting simulation algorithms to create visual scenarios with varying lighting conditions, including daylight, twilight, indoor lighting, and challenging low-light situations. In some embodiments, the simulation module 1140 may be further configured to utilize the PhysX engine or similar physics simulation tools to ensure realistic object behavior and interactions within these scenarios, enhancing the authenticity of the simulated experiences.

In some embodiments, the simulation module 1140 may be further configured to integrate with the rendering module 1138 to ensure that simulated scenarios are accurately displayed on the HMD, maintaining the intended visual fidelity and realism. In some embodiments, the simulation module 1140 may be further configured to allow customization and parametric control of scenarios, enabling the creation of tailored visual experiences for specific testing or training purposes.

For eye testing purposes, some embodiments track eye movements and response times with high frequency and precision. In some embodiments, for eye movements, and specifically for saccades, rapid movements of the eye between fixation points are tracked at rates of at least 100-500 Hz. This high frequency helps capture the quick and brief nature of these movements accurately. For fixations, periods where the eyes are relatively stationary and focused on a single point are tracked at slightly lower rates, but typically in the range of 50-100 Hz, to ensure precise measurement of duration and stability. For smooth pursuit (e.g., movements where the eyes smoothly follow a moving object), eye movements are also tracked at high rates (100-200 Hz) to accurately capture the speed and trajectory of the eye movements. In some embodiments, for response times, specifically for reaction time (e.g., the time it takes for a person to respond to a visual stimulus, such as pressing a button when a light appears), are tracked with millisecond accuracy. This typically means using sampling rates of 1000 Hz or higher to ensure precise measurement. For decision time, which may include, for example, the duration between recognizing a visual stimulus and making a decision based on, are tracked using high-frequency tracking, typically around 500-1000 Hz, to accurately capture the cognitive processing speed.

High-frequency tracking ensures that no significant movement or response detail is missed, providing a more accurate and reliable assessment of visual function. Real-world visual tasks involve rapid and complex eye movements, and high-frequency tracking allows for a more detailed analysis of how well the eyes can handle such tasks. Subtle abnormalities in eye movements or delays in response times can be early indicators of visual or neurological problems. High-frequency tracking helps in detecting these issues at an early stage. In some embodiments, for eye testing, continuous tracking of eye movements and response times is performed at high frequencies (e.g., ranging from 50 Hz to 1000 Hz) to ensure precise and comprehensive data collection. While both eye testing and VR games benefit from eye-tracking technology, the former requires much higher precision, frequency, and reliability for clinical and diagnostic purposes. In contrast, VR games prioritize user experience and real-time interaction, allowing for lower precision and frequency in tracking (e.g., 30-120 Hz).

In some embodiments, the tracking module 1144 may be further configured to continuously track eye movements and response times to visual stimuli presented in the one or more real-world scenarios simulated in the VR user interface, using the camera at high frequencies (e.g., 100-500 Hz for saccades, 50-100 Hz for fixations). In some embodiments, the tracking module 1144 may be further configured to track eye movements and response times to visual stimuli presented in the testing sequence, capturing data throughout the progression of finer details and varying depths in the three-dimensional virtual environment. In some embodiments, the tracking module 1144 may be further configured to monitor eye movements and response times to visual stimuli presented in the dynamic real-world visual experience, adapting to changing environmental conditions and moving objects within the simulation.

In some embodiments, the tracking module 1144 may be further configured to track eye movements and response times specifically for real-world motion and target recognition visual tasks, providing detailed data on how users visually engage with moving objects and identify targets in complex scenes. In some embodiments, the tracking module 1144 may be further configured to monitor dynamic focus adjustments in response to visual stimuli presented in various visual scenarios, capturing data on how quickly and accurately users can shift focus between near and far objects in the virtual environment.

In some embodiments, the tracking module 1144 may be further configured to track user interactions and responses to visual stimuli across a range of visual scenarios, including those with different lighting conditions, providing comprehensive data on visual performance under various environmental conditions. In some embodiments, the tracking module 1144 may be further configured to integrate with the simulation module 1140 to ensure synchronized tracking of eye movements and responses with the presented visual stimuli across all types of simulated scenarios.

In some embodiments, the tracking module 1144 may be further configured to process and/or analyze the collected high-frequency data in real-time, providing immediate feedback on visual performance and enabling dynamic adjustments to the testing or training protocols as needed. These enhanced tracking capabilities ensure that the system can capture detailed, precise data on eye movements and responses across a wide range of simulated scenarios, supporting comprehensive analysis of visual function and performance in virtual reality environments. In some embodiments, the tracking module 1144 may be further configured to continuously track eye movements and response times in response to visual stimuli presented in the one or more dynamic lighting scenarios. This tracking is performed using the camera at high frequencies (e.g., 100-500 Hz for saccades, 50-100 Hz for fixations) to capture rapid eye movements in changing light conditions.

In some embodiments, the tracking module 1144 may be further configured to continuously monitor and record pupil data, including pupil dilation and constriction, in response to visual stimuli presented in the one or more dynamic lighting scenarios. This pupil tracking is performed at high frequencies (e.g., 120-250 Hz) to capture subtle and rapid changes in pupil size as lighting conditions change. In some embodiments, the tracking module 1144 may be further configured to specifically track eye movements, including saccades, fixations, and smooth pursuit, in response to visual stimuli presented in the one or more dynamic lighting scenarios. This tracking captures how the eyes adapt and respond to changing light levels, moving shadows, or shifting light sources within the virtual environment.

In some embodiments, the tracking module 1144 may be further configured to synchronize the eye tracking data with the simulated lighting conditions, allowing for precise analysis of how different lighting scenarios affect eye movements, pupil reactions, and response times. In some embodiments, the tracking module 1144 may be further configured to process and analyze the collected high-frequency eye movement, pupil, and response time data in real-time, providing immediate feedback on visual performance under varying lighting conditions.

In some embodiments, the tracking module 1144 may be further configured to integrate with the simulation module 1140 to ensure that eye tracking is precisely coordinated with the dynamic changes in lighting conditions, allowing for accurate assessment of visual adaptation to light changes. These enhancements enable the system to capture detailed, time-synced data on eye movements, pupil reactions, and/or response times, specifically in relation to changing lighting conditions in the virtual environment, supporting comprehensive analysis of visual function and/or performance under various lighting scenarios.

In some embodiments, the evaluation and/or measurement module 1150 may be further configured to analyze eye movements and response times captured by the tracking module 1144 to evaluate visual acuity and perception. This may include, for example, assessing the accuracy and speed of eye movements in response to stimuli of varying sizes and contrasts. In some embodiments, the evaluation and/or measurement module 1150 may be further configured to utilize eye movement data and response times to specifically test and evaluate visual acuity, considering factors such as the minimum resolvable detail and reaction speed to visual stimuli.

In some embodiments, the evaluation and/or measurement module 1150 may be further configured to assess depth perception, motion detection, and spatial awareness by analyzing eye movements and response times during tasks that involve tracking moving objects, judging distances, and navigating 3D environments. In some embodiments, the evaluation and/or measurement module 1150 may be further configured to measure dynamic visual acuity by evaluating eye movements and response times when tracking moving targets of varying speeds and sizes, quantifying the ability to discern details of objects in motion. In some embodiments, the evaluation and/or measurement module 1150 may be further configured to analyze dynamic focus adjustment data to measure astigmatism, examining how the eyes focus on lines and shapes at different orientations and distances.

In some embodiments, the evaluation and/or measurement module 1150 may be further configured to process user interactions and responses to visual stimuli to measure and adjust for visual distortions. This may include, for example, analyzing how users perceive and interact with potentially distorted images or environments in the VR interface. In some embodiments, the evaluation and/or measurement module 1150 may be further configured to evaluate user interactions and responses in low-light scenarios to measure night blindness, assessing visual performance and adaptation in simulated nighttime or dim lighting conditions. In some embodiments, the evaluation and/or measurement module 1150 may be further configured to integrate with the simulation module 1140 to ensure that evaluations and measurements are precisely correlated with the specific visual stimuli and environmental conditions presented in each test scenario.

In some embodiments, the evaluation and/or measurement module 1150 may be further configured to implement advanced algorithms to interpret complex eye movement patterns and response data, translating raw tracking data into meaningful metrics for each visual function being assessed. In some embodiments, the evaluation and/or measurement module 1150 may be further configured to generate comprehensive reports detailing the results of visual function assessments, including quantitative measures of visual acuity, depth perception, motion detection, astigmatism, and night vision capabilities. In some embodiments, the evaluation and/or measurement module 1150 may be further configured to provide real-time feedback during testing sessions, allowing for dynamic adjustment of test parameters based on ongoing performance and response patterns. These features enable the system to conduct thorough, quantitative evaluations of various aspects of visual function based on eye movement data and/or user responses, supporting detailed analysis and measurement of visual capabilities within the VR environment.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various embodiments. In some embodiments, the memory 1124 stores a subset of the modules and data structures identified above. Furthermore, in some embodiments, the memory 1124 stores additional modules or data structures not described above. Example details and/or operations of the modules, data structures, applications and/or procedures, are further described below, according to some embodiments.

Although FIG. 11A shows a computing device, FIG. 11A is intended more as a functional description of the various features that may be present rather than as a structural schematic of the embodiments described herein. In practice, and as recognized by those of ordinary skill in the art, items shown separately could be combined and some items could be separated.

Virtual Eye Test in a Photorealistic VR Environment

Figure 12A:
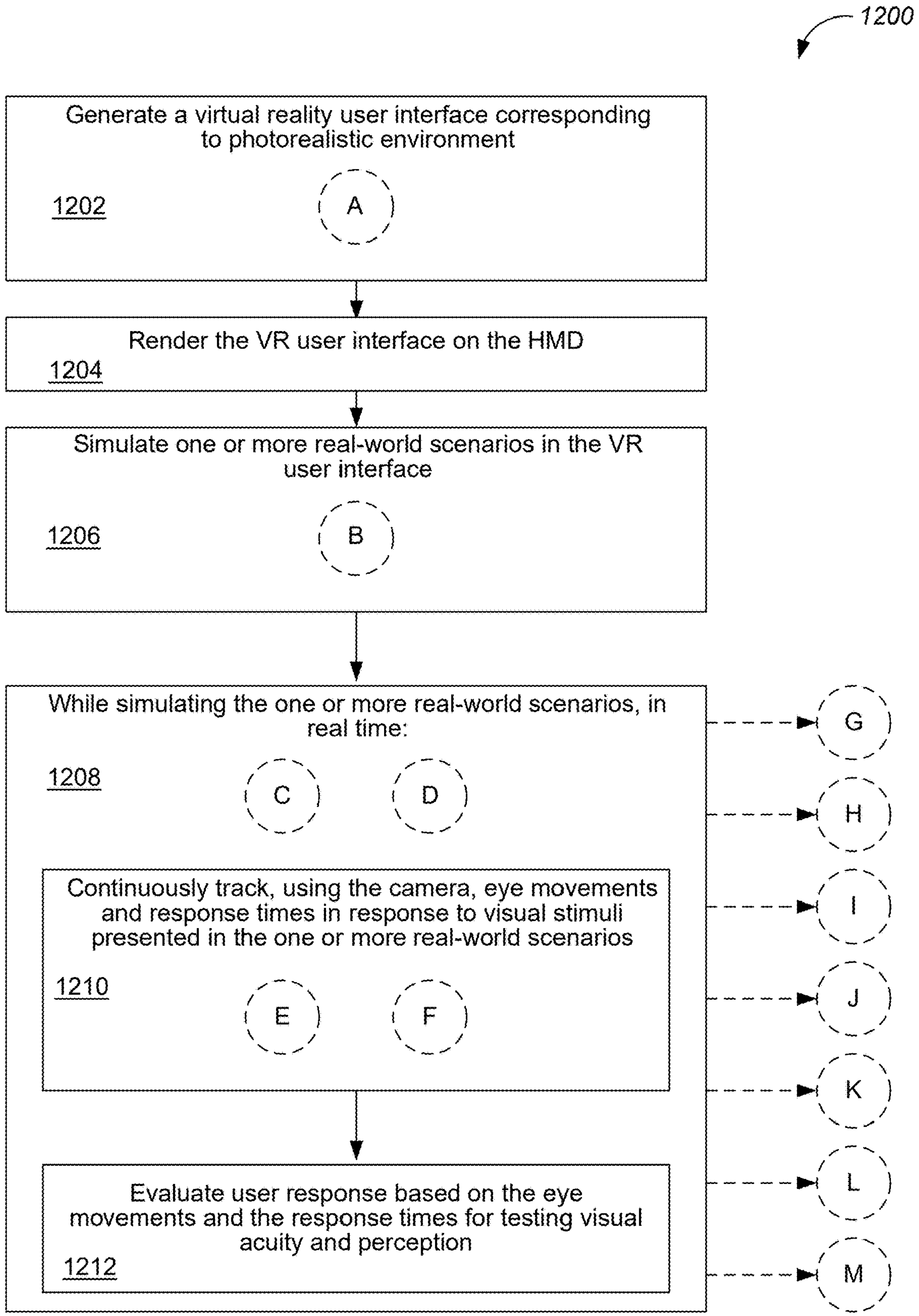
FIGS. 12A-12N show a flow diagram of an example process for implementing a virtual eye test for evaluating visual acuity and perception, according to some embodiments.
Figure 12E:
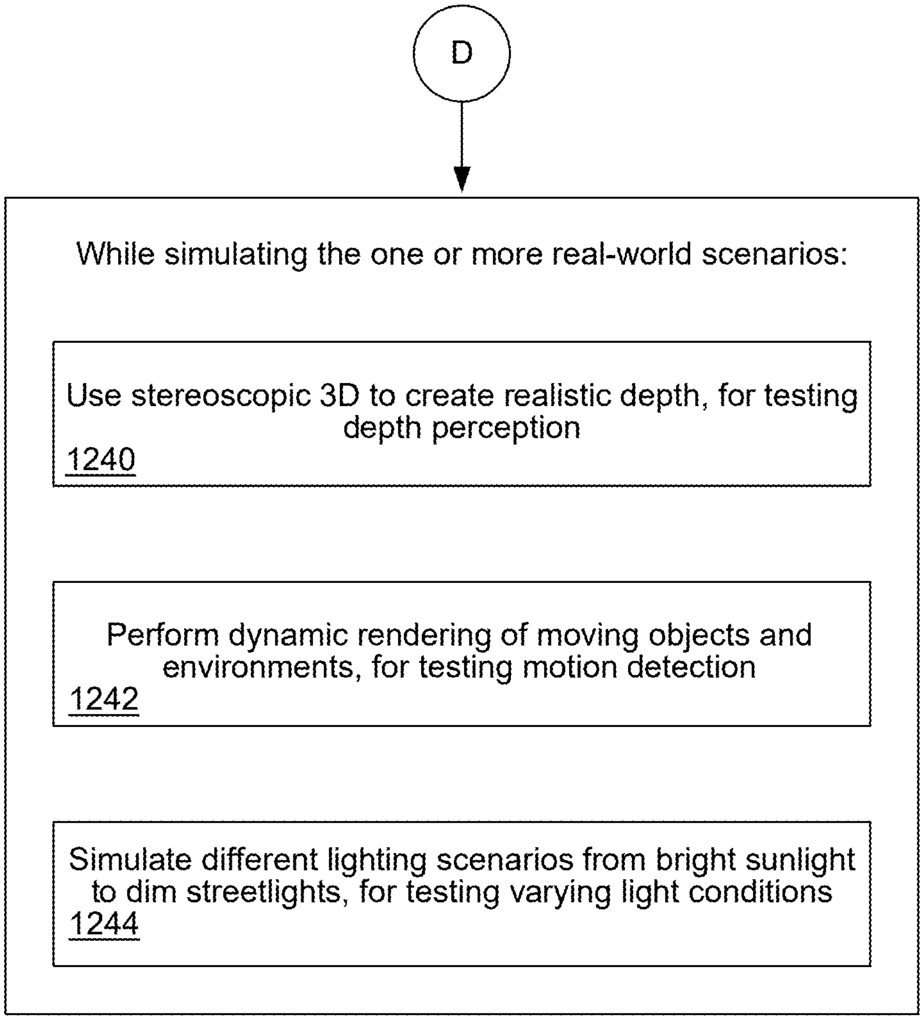

According to some embodiments, the vision test system 1100 described above is configured to implement a virtual vision test for evaluating visual acuity and perception. FIGS. 12A-12N show a flow diagram of an example process 1200 for implementing a virtual eye test for evaluating visual acuity and perception, according to some embodiments.

The computer device 140 (e.g., the computing device described above in reference to FIGS. 11A and 11B) generates (e.g., in step 1200) (e.g., using the UI module 1134) a virtual reality (VR) user interface (UI) corresponding to a photorealistic virtual environment (e.g., an environment 1136). In some embodiments, game engines (e.g., platforms like Unity or Unreal Engine) are used to implement the UI and integrate it with the virtual environment. 3D modeling software can be used for creating assets that may be part of the UI in the photorealistic environment.

In some embodiments, this step is performed on a host computer, whereby the main processing unit (CPU) and graphics card (GPU) of the computer connected to a VR/AR headset handles much of the heavy lifting for generating and rendering the UI. This can be useful for tethered VR headsets that rely on a powerful PC for processing. In some embodiments, this step is performed on the headset itself. Standalone VR/AR headsets have onboard processors that can handle some or all of the UI generation and rendering. This on-device processing provides responsive, low-latency interactions. Cloud processing can also be used for some aspects of UI generation. For example, tasks requiring heavy computation might be offloaded to cloud servers and streamed to the headset. A combination of the above, with some elements pre-baked during development, some processed on a host PC, and some handled by the headset itself, can be used in some embodiments.

In some embodiments, the step of generating a VR UI corresponding to a photorealistic environment includes creating interactive visual elements that allow users to navigate and interact with a highly realistic 3D virtual world. Photorealistic virtual environment refers to a 3D digital space that looks and behaves as close to reality as possible. Advanced graphics, lighting, textures, and/or physics simulations can be used to create a highly detailed and lifelike virtual world. VR user interface is the set of visual elements, controls, and/or interaction methods that allow users to navigate, manipulate, and/or engage with the virtual environment. In VR, these interfaces are designed to be intuitive and immersive, often blending seamlessly with the virtual world.

Generating the interface may include generating UI elements that are both functional and visually consistent with the photorealistic environment. In various embodiments, this includes menus and buttons that appear to exist within the 3D space, gesture-based controls that feel natural in the virtual world, visual feedback that matches the aesthetic of the environment, and/or information displays that integrate with the surroundings. The computer device 140 creates an interface that enhances the user's sense of presence and immersion in the virtual world. This often means making UI elements that look and feel like they belong in the photorealistic environment, such as holographic displays or physical objects that the user can interact with using VR controllers or hand tracking.

Eye testing using photorealistic environments offers several advantages compared to traditional methods. Photorealistic environments provide a more accurate and comprehensive assessment of visual function. For example, photorealistic environments provide realistic simulation, mimic real-world conditions much more accurately than traditional eye charts or simple visual tests. This allows for a more accurate assessment of how well a person can see in everyday situations. These environments can change dynamically to simulate different lighting conditions, distances, and angles, providing a more comprehensive test of visual capabilities, including peripheral vision and depth perception.

Patients, especially children or those with attention difficulties, may find photorealistic environments more engaging than standard tests, leading to more reliable results as they are more likely to fully participate in the testing process. Traditional eye tests often focus on static images and high-contrast letters. Photorealistic environments, on the other hand, can be used to present complex, real-world visual tasks that can better assess functions like motion detection, contrast sensitivity, and/or color perception. Furthermore, the photorealistic environment can be customized to the specific needs or conditions of the patient, such as simulating the individual's workplace or home setting, providing a personalized and relevant assessment of their vision.

More complex and varied testing scenarios, which photorealistic environments can help simulate, can help in the early detection of visual problems that might not be apparent in traditional tests. This includes issues related to glare, night vision, and visual processing speeds. Advanced eye-tracking technology, specific examples of which are described herein, can be used in photorealistic environments to provide objective data on eye movements, fixation points, and response times, offering a more detailed analysis of visual function. For patients undergoing vision therapy or rehabilitation, photorealistic environments can provide a controlled yet realistic setting for practicing visual skills, making the training more effective and directly applicable to real-world tasks. Overall, eye testing using photorealistic environments described herein, represents a significant advancement in optometry and vision science, offering a richer, more detailed, and accurate assessment of visual health.

The computer device 140 renders (e.g., in step 1204) (e.g., using the rendering module 1138) the VR user interface on the HMD 1102. In some embodiments, photorealistic environments are displayed by leveraging various techniques and technologies described herein, according to some embodiments. Some embodiments use photogrammetry to create highly detailed 3D models from a set of photographs. By capturing real-world objects or environments from multiple angles, photogrammetry helps reconstruct their geometry and computer textures with a high degree of realism. In some embodiments, these models are then imported into the VR environment (sometimes referred to as the photorealistic environment or three-dimensional virtual environment).

Some embodiments provide 360-degree photography and videography. In some embodiments, VR devices display panoramic 360-degree photos and videos, which provide an immersive and photorealistic representation of real-world environments. In some embodiments, these are captured using specialized camera rigs or stitched together from multiple camera feeds. Some embodiments use real-time ray tracing. Modern graphics hardware and rendering techniques like real-time ray tracing help simulate the behavior of light in a physically accurate manner. By accurately modeling the interaction of light with materials, surfaces, and objects, ray tracing produces highly photorealistic images and environments in real-time. Some embodiments provide high-resolution textures and models. VR devices leverage high-resolution textures and detailed 3D models to create environments that closely resemble reality.

In some embodiments, the environments are created using techniques like photogrammetry, 3D scanning, or manually by artists and designers. Some embodiments use physically based rendering (PBR). PBR includes simulating the behavior of materials and their interactions with light based on real-world physics principles. By accurately modeling materials and their properties, such as roughness, metallic properties, and reflectance, PBR produces highly realistic visuals in VR environments. Some embodiments use image-based rendering, which includes using real-world photographs or video footage as the basis for rendering virtual environments. In some embodiments, by projecting and blending these images onto 3D geometry, a highly photorealistic environment is created. In some embodiments, VR devices capture real-world lighting information using techniques like light probes or environmental capture. This data can then be used to accurately simulate and recreate realistic lighting conditions within the virtual environment. By combining the techniques described herein and leveraging the latest advancements in graphics hardware and rendering algorithms, VR devices can provide highly immersive and photorealistic virtual experiences that closely resemble real-world environments.

Photorealistic environments used for eye testing can differ significantly from those used in VR games in several aspects, including design, functionality, and application. Photorealistic environments for eye testing are designed for precision, control, and repeatability to assess visual functions accurately, while those for VR games focus on creating immersive, interactive, and enjoyable experiences for entertainment. In contrast to VR games, eye testing requires clinical precision. Accordingly, some embodiments provide highly controlled and repeatable conditions for accurate diagnosis and assessment of visual functions. In some embodiments, specific scenarios are tailored to simulate real-world conditions that are relevant for visual testing, such as different lighting conditions, contrast levels, and visual tasks like reading or recognizing objects. Environments are kept consistent across tests to ensure reliable results. This includes controlled variations in visual stimuli to test specific aspects of vision.

Eye testing also requires precision tracking. Accordingly, some embodiments utilize high-precision eye-tracking to measure fine details of eye movements, fixations, and/or response times. Some embodiments collect accurate data for clinical analysis, including metrics, such as saccadic latency, fixation stability, and smooth pursuit accuracy. Some embodiments can include standardized visual tests, such as visual acuity tests, contrast sensitivity tests, and visual field tests.

Referring next to FIG. 12B, in some embodiments, the photorealistic virtual environment prioritizes (e.g., in step 1214) precision, control, repeatability and/or data collection over immersion, interaction, variety and/or user experience to assess visual functions accurately.

For example, a photorealistic environment for eye testing that includes a simulated driving environment can include a controlled simulation of driving conditions at night or in fog, designed to assess visual acuity, peripheral vision, and reaction times. The environment would include standardized visual stimuli, such as road signs, other vehicles, and pedestrians, which appear in predetermined patterns and intervals. For repeatability, each test is consistent, with the same conditions and stimuli presented in the same manner each time. This ensures that results can be reliably compared across different sessions or subjects. As another example, a photorealistic environment for eye testing that includes reading and office tasks can include a photorealistic simulation of an office environment with various reading tasks. This could include reading text on a computer screen, paper documents, and recognizing icons or objects on a cluttered desk.

For repeatability, text size, font, contrast, and lighting conditions are kept constant across tests. This allows precise measurement of reading speed, accuracy, and visual fatigue under standardized conditions. As yet another example, a supermarket simulation can include a virtual supermarket where patients are asked to locate and identify products on shelves. The environment would include standardized lighting, product placement, and visual clutter. For repeatability, the position and appearance of products remain the same in each test, ensuring that any changes in performance are due to the patient's vision and not variations in the environment. Eye testing environments prioritize controlled and repeatable conditions to ensure accurate measurement of visual functions instead of, or in addition to, focusing on creating immersive and interactive experiences that engage and entertain players. Eye testing environments are standardized to eliminate variables that could affect the results. A goal of eye testing environments, such as the ones described herein, is to collect precise data for clinical analysis, more than merely providing enjoyable user experience.

In the context of a photorealistic virtual environment designed for precise visual function assessment, qualities, such as precision, control, repeatability, and data collection, may be quantified or measured using the following methodologies. Precision may be quantified by measuring the variance in visual acuity scores or reaction times when the same stimuli are presented multiple times under identical conditions. A lower variance would indicate higher precision. Additionally, the spatial resolution of the visual stimuli may be quantified by the pixel density in the VR environment, where higher pixel density corresponds to higher precision in visual representation.

Control may be measured by assessing the fidelity of the virtual environment to real-world parameters. For instance, in a simulated driving environment, control may be quantified by how accurately the speed, direction, and lighting conditions match predefined standards. Metrics, such as frame rate stability, latency in rendering, and synchronization with real-world physics (e.g., gravity, friction) may serve as quantitative measures of control.

Repeatability may be quantified by the consistency of test results across multiple sessions. Statistical methods, such as calculating the intraclass correlation coefficient (ICC), may be used to measure the reliability of visual function assessments over time. A high ICC value may indicate that the VR environment consistently produces similar outcomes, highlighting strong repeatability. The effectiveness of data collection may be measured by the amount and quality of data points gathered during each session. This may include the resolution of eye-tracking data, the accuracy of response time measurements, and the granularity of physiological data (e.g., pupil dilation, heart rate). The completeness of data collection, indicated by minimal data loss or artifacts, may also be used.

In some embodiments, the photorealistic virtual environment corresponds to an environment selected (e.g., in step 1216) from the group consisting of: urban streets, natural landscapes, indoor settings (e.g., living rooms, offices), and crowded public spaces (e.g., malls, transportation hubs). The system may define, store, and/or use scenarios with a level of detail and movement similar to busy intersections or trails by leveraging advanced computer graphics techniques and/or a robust database architecture.

For example, each environment, such as a busy intersection or a forest trail, may be defined by its unique set of visual and interactive elements. For a busy intersection, the system may include parameters, such as traffic density, pedestrian flow, vehicle speeds, traffic light cycles, and/or ambient noise levels. For a forest trail, the environment may include varying terrain textures, dynamic lighting based on time of day, and/or movement of flora and fauna.

Optionally, scenarios may be stored as modular data sets within the system's database. Each scenario may include 3D models, textures, lighting maps, and/or behavioral scripts that dictate how objects in the environment interact with the user.

For example, a busy intersection scenario may store detailed vehicle models, pedestrian avatars, and/or algorithms controlling their movement patterns. The storage system may be optimized for quick retrieval and modification, allowing scenarios to be adapted based on user requirements or testing protocols. The system may use these scenarios by dynamically loading them into the VR environment during testing.

The criteria for what constitutes each environment can include various factors. For example, the criteria can include a Level of Detail (LOD). For busy intersections, for example, the LOD may include high-resolution textures for vehicles, road surfaces, and buildings, alongside complex shadowing and/or reflection effects. For trails, for example, the LOD may emphasize realistic foliage, ground textures, and/or subtle environmental movements like wind in the trees. The criteria can also include a movement complexity. In busy intersections, movement complexity may involve multiple objects (e.g., vehicles, pedestrians) moving at varying speeds and/or trajectories.

For trails, movement complexity may include the swaying of trees, shifting light through the canopy, and/or the user's interaction with uneven terrain; (iii) interactivity: The degree to which the user can interact with the environment may also define its complexity. In an intersection, users may respond to traffic signals, navigate around obstacles, and/or follow a vehicle's trajectory. In a trail scenario, interaction may include avoiding obstacles, tracking wildlife, and/or responding to changes in terrain.

In some embodiments, the photorealistic virtual environment corresponds (e.g., in step 1218) to an environment with varied lighting conditions (e.g., transitioning from daylight to twilight, using texture mapping techniques) and/or scenarios with a level of detail and movement similar to busy intersections or forest trails. Some embodiments use texture mapping, a technique used in computer graphics and 3D rendering, to add detailed surface information to 3D models. Texture mapping can be used for handling varying lighting conditions.

For example, light mapping includes pre-computing and storing lighting information in texture maps. Light maps capture the way light interacts with the geometry of a scene, including shadows, color bleeding, and other global illumination effects. By baking this information into texture maps, the lighting can be applied efficiently during real-time rendering without costly re-computation. Normal maps store per-pixel surface normal information in a texture. This allows the renderer to calculate accurate lighting by taking into account the high-frequency details captured in the normal map, even if the underlying geometry is relatively low-resolution. Normal mapping enhances the appearance of surface details and their interaction with light.

Ambient occlusion textures store pre-computed accessibility information, which approximates how exposed each surface point is to ambient lighting. This allows the renderer to apply physically based ambient shadowing effects without costly real-time calculations. Specular maps modulate the intensity and color of specular highlights on a surface. This allows for accurate representation of different material properties and their interactions with light sources in the scene. Self-shadowing and horizon mapping involve pre-computing and storing shadow information in textures, which can then be used to apply self-shadowing and atmospheric effects to objects in a consistent manner under varying lighting conditions. By combining these texture mapping techniques, in some embodiments, real-time rendering engines efficiently approximate complex lighting interactions, even in scenarios with dynamic lighting conditions. The pre-computed textures allow the renderer to produce realistic results while maintaining high performance, which is crucial for applications such as games, architectural visualization, and virtual reality.

In some embodiments, the VR user interface allows (e.g., in step 1220) a user to navigate through virtual environments using natural head and eye movements, mimicking real-world interactions and responses. Natural head and eye movements in the context of a VR environment may be defined and/or measured using several parameters that reflect the typical behavior of these movements in real-world scenarios. For definition of natural movements, natural head movements may be characterized by the range, speed, and/or smoothness with which users typically move their heads when engaging with their environment. This may include nodding, turning the head left or right, tilting, and/or the combination of these movements during tasks, such as scanning a room or focusing on different objects in the VR environment.

Natural eye movements may be defined by saccades (quick jumps of the eye between fixation points), fixations (periods where the eyes are stationary and focused on a single point), and/or smooth pursuit (the eye's ability to track a moving object). The parameters may include saccadic velocity, fixation duration, and/or the accuracy of smooth pursuit. Head movements may be measured using gyroscopes and accelerometers embedded in the VR headset. The system may record the angular velocity and acceleration of the head in three axes (pitch, yaw, and roll) and/or compare these metrics against established norms for natural head movements. Eye movements may be measured using infrared eye-tracking technology that monitors the position and movement of the eyes within the VR headset. The system may capture data on saccadic movements, including their amplitude, velocity, and frequency, as well as fixation stability and duration. Smooth pursuit may be measured by tracking the eye's ability to follow a moving target with minimal lag or deviation.

Referring back to FIG. 12A, the computer device 140 simulates (e.g., in step 1206) (e.g., using the simulation module 1140) one or more real-world scenarios (e.g., the scenarios 1142) in the VR user interface. Referring to FIG. 12E, in some embodiments, the computer device 140 simulates the one or more real-world scenarios (i) using (e.g., in step 1240) stereoscopic three-dimensional (3D) to create realistic depth, for testing depth perception; performing dynamic rendering (e.g., in step 1242) of moving objects and environments, for testing motion detection, and/or (ii) simulating (e.g., in step 1244) different lighting scenarios from bright sunlight to dim streetlights, for testing varying light conditions.

The computer device 140 may provide precision and consistency of visual stimuli. Several advanced techniques and technologies may be integrated for ensuring precision, consistency, and accurate tracking in a VR environment designed for visual assessments requires. For precision, high-resolution displays, for example using VR headsets with high pixel density and low sub-pixel variance, may help ensure that visual stimuli are presented with maximum clarity and detail. This may reduce the chances of aliasing or blurring, which can affect the accuracy of visual tests. Sub-millimeter accuracy tracking using advanced tracking systems, such as those employing multiple cameras or external sensors, may help ensure that head and eye movements are captured with sub-millimeter accuracy. This level of precision may be used for detecting even the smallest deviations in eye movement, which can be indicative of underlying visual impairments. For consistency, standardized scenarios may be used.

For example, all visual stimuli and scenarios within the VR environment may be standardized, meaning that each test presents the same conditions (lighting, object placement, timing) regardless of when or where the test is conducted. This consistency may be used for comparing results across different sessions or subjects. Maintaining a high and stable frame rate (e.g., 90 FPS or higher) may help ensure that the VR environment remains fluid and responsive, preventing motion blur or jitter, which could introduce inconsistencies in test results.

Calibrated eye-tracking systems may be used. For example, eye-tracking systems may be calibrated for each user to account for individual differences in eye physiology, such as interpupillary distance (IPD) and eye dominance. Calibration may help ensure that the system accurately tracks the user's gaze direction, fixation points, and saccadic movements. In environments where high accuracy is paramount, redundant tracking systems (e.g., combining inside-out tracking with external cameras) may be employed. This redundancy may help cross-verify data and correct any potential inaccuracies caused by a single tracking method. The VR system may continuously monitor the tracking data in real time to detect and/or correct any anomalies. For example, if the system detects a sudden, unrealistic jump in eye movement, the system may prompt a recalibration or discard the aberrant data to maintain the accuracy of the test results.

Referring to FIG. 12C, in some embodiments, the computer device 140 simulates the one or more real-world scenarios 1106 by simulating (e.g., in step 1222) one or more daily activities selected from the group consisting of: walking through a park, driving, or navigating through a busy city street, where the user must respond to visual stimuli corresponding to moving vehicles, pedestrians, and/or changing light conditions. In some embodiments, the computer device 140 simulates the one or more real-world scenarios by real-time rendering (e.g., in step 1224) of dynamic weather changes, day-night cycles, and/or varying traffic conditions, to test visual acuity in different contexts.

In the context of a VR environment used for visual function assessments, the minimum refresh rate that may be considered real-time is generally 90 Hz. This is because a refresh rate of 90 Hz or higher helps ensure smooth, fluid motion and to reduce motion sickness, which can occur at lower refresh rates. A 90 Hz refresh rate means that the display updates 90 times per second. This is useful for creating a seamless and immersive experience, especially when the user is interacting with dynamic environments that require real-time responses. A lower refresh rate may introduce latency, leading to visual artifacts or lag, which could compromise the accuracy of the visual tests.

Example parameters for dynamic weather changes include day-night cycle, rain simulation, fog density, and/or wind effects. For example, the VR environment may simulate the transition from daylight to twilight, and eventually to night. The transition is smooth and occurs over a defined period, such as 10 minutes, with gradual changes in light intensity and/or color temperature to mimic real-world conditions. Further, the VR environment may include a dynamic rain simulation where raindrops fall at varying intensities. Parameters may include drop size, fall speed (adjustable between 9-15 m/s), and the density of rain per square meter. The simulation may also affect visibility and the behavior of other environmental elements, such as reflective surfaces or water pooling on roads. Furthermore, the VR environment may adjust fog density dynamically, simulating conditions where visibility is reduced to a specified distance (e.g., 100 meters down to 10 meters). The fog's opacity, color, and/or thickness may be controlled based on weather conditions and user interactions. Further optionally, wind speed and direction may be dynamically adjusted to create effects such as swaying trees, moving debris, or changes in the trajectory of raindrops or snowflakes. The wind speed may vary between 0-20 m/s, and the direction may shift to simulate gusts or changing weather patterns.

In some embodiments, the computer device 140 simulates the one or more real-world scenarios by using (e.g., in step 1226) stereoscopic 3D and head tracking to create a realistic depth perception. Stereoscopic 3D and head tracking are used together to create a realistic depth perception in virtual reality (VR) and other immersive experiences. Stereoscopic 3D refers to the technique of presenting slightly different images to each eye, mimicking how our binocular vision works in the real world. This creates a sense of depth and 3D perception by exploiting the way our brains process and combine the two slightly offset images. In VR, stereoscopic 3D is achieved by rendering two separate images, one for each eye, with a horizontal offset that corresponds to the interpupillary distance (the distance between the eyes). These images are then displayed separately to the respective eyes through the VR headset's lenses or displays.

Head tracking includes, for example, tracking the position and orientation of the user's head in real-time. This is typically done using sensors (e.g., gyroscopes, accelerometers, and sometimes external tracking systems) built into the VR headset. Head tracking data is used to update the rendered stereoscopic 3D images, accordingly, adjusting the viewpoint and perspective based on the user's head movements. This creates a sense of immersion, as the virtual environment shifts and responds naturally to the user's head movements, just like in the real world.

By combining stereoscopic 3D and head tracking, in some embodiments, VR systems create a realistic depth perception and a sense of presence in the virtual environment. Stereoscopic 3D provides the initial depth cues by presenting slightly different images to each eye, mimicking binocular vision. Head tracking ensures that as the user moves their head, the rendered stereoscopic images update accordingly, maintaining the correct perspective and depth cues based on the new viewpoint. This combination tricks the brain into perceiving the virtual environment as a three-dimensional space with real depth, just like in the physical world. In some embodiments, additionally, other depth cues like motion parallax (e.g., objects at different depths appear to move at different speeds), occlusion (e.g., objects can block or be blocked by other objects), and atmospheric effects (e.g., fog or haze) are simulated in the virtual environment to further enhance the sense of realistic depth perception. By accurately replicating the way human visual system perceives depth in the real world, stereoscopic 3D and head tracking work together to create a convincing and immersive 3D experience in VR applications.

In some embodiments, the computer device 140 simulates the one or more real-world scenarios by simulating (e.g., in step 1228) driving at night, reading signs in varying light conditions, identifying objects in peripheral vision while walking, or responding to moving objects in a busy environment.

In some embodiments, the computer device 140 simulates the one or more real-world scenarios 1106 by simulating (e.g., in step 1230) entering a tunnel while driving.

Referring next to FIG. 12D, in some embodiments, the computer device 140, while simulating the one or more real-world scenarios, dynamically adjusts (e.g., in step 1232) the photorealistic environment based on real-time monitoring of eye movements, pupil dilation, and neural responses, to adapt visual scenarios, such as changing object speed or light intensity.

In some embodiments, the computer device 140, while simulating the one or more real-world scenarios 1106, personalizes (e.g., in step 1234) one or more testing sequences for a user by customizing the one or more real-world scenarios based on the user's daily activities, workplace, common travel route, preferences, and/or specific visual challenges. In some embodiments, the computer device 140, while simulating the one or more real-world scenarios, personalizes (e.g., in step 1236) one or more testing sequences for a user by customizing the one or more real-world scenarios based on the user's demography (e.g., age, gender, disabilities) or the user's prior vision performance. In some embodiments, the computer device 140 simulates the one or more real-world scenarios 1106 by personalizing (e.g., in step 1238) one or more testing sequences for a user by customizing the one or more real-world scenarios based on the user's prior vision performance.

Anti-aliasing and other graphical techniques may be used for ensuring precise control and measurement in a VR environment designed for vision testing. Some embodiments use Unity, a popular game engine, which offers basic anti-aliasing options. In some embodiments, more advanced techniques may be used for the highest level of precision in visual assessments. This may include anti-aliasing techniques. Super Sampling Anti-Aliasing (SSAA) is an effective anti-aliasing technique, where the image is rendered at a higher resolution and then downscaled to the display resolution. This reduces the jagged edges (aliasing) and provides a smoother, more detailed image, crucial for tests where fine visual details are essential. Temporal Anti-Aliasing (TAA) may be used. TAA blends information from multiple frames to reduce aliasing over time. This technique may be particularly useful in dynamic environments with lots of movement, as it helps maintain smooth edges even when the camera or objects are moving.

Some embodiments use Multi-Sample Anti-Aliasing (MSAA), which reduces aliasing at the edges of objects by sampling multiple points within each pixel and averaging the results. MSAA tends to be less performance-intensive than SSAA but still offers significant improvements over basic anti-aliasing methods. Other techniques may be used for precise control and/or measurement.

For example, sub-pixel rendering takes advantage of the individual color elements within each pixel (typically red, green, and blue) to increase the apparent resolution of text and fine details. This may be used for tests involving reading or identifying small objects, for better clarity.

High Dynamic Range (HDR) Rendering may be used, and allows for a greater range of luminance and color levels, which may be used in scenarios that involve varying lighting conditions. This may help ensure that both very bright and very dark areas of the environment are rendered accurately, providing a more realistic and detailed visual experience. Physically Based Rendering (PBR) may be used for simulating the physical behavior of light to create more realistic textures and materials. This may be used for accurately representing real-world surfaces and objects in the VR environment, which can affect how light interacts with the user's eyes.

By simulating the way cameras or human eyes focus on objects at different distances, depth of field adjustments may be used to control which parts of the scene are in sharp focus and which are blurred. This technique may be used for testing depth perception and focus adjustments. Anisotropic filtering technique may be used to improve the clarity of textures viewed at oblique angles, for ensuring that surface details remain sharp and clear regardless of the viewer's perspective. In addition to, or instead of Unity, a combination of these methods may be implemented for precision and control. Specialized rendering engines may be used for more advanced graphical features.

Referring back to FIG. 12A, the computer device 140, while simulating (e.g., in step 1208) the one or more real-world scenarios, in real time, continuously tracks (e.g., in step 1210) (e.g., using the tracking module 1144), using the camera, eye movements (e.g., the eye movements 1146) and response times (e.g., the response times 1148) to visual stimuli presented in the one or more real-world scenarios.

Figure 12F:
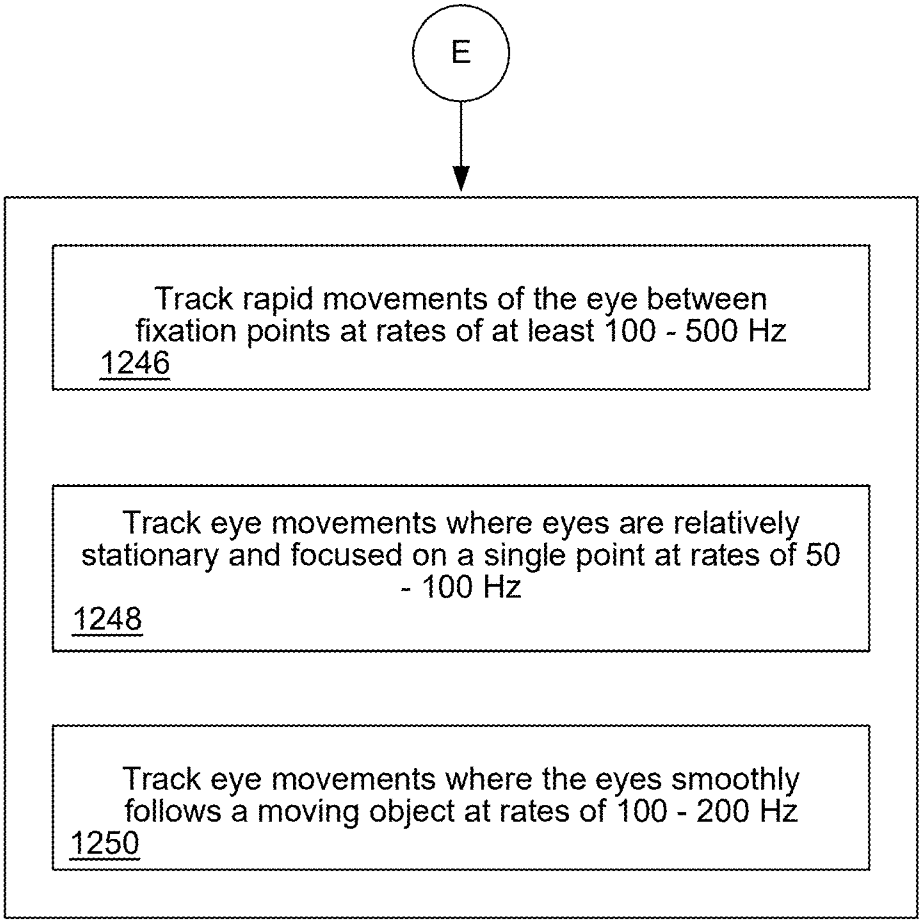
Figure 12G:
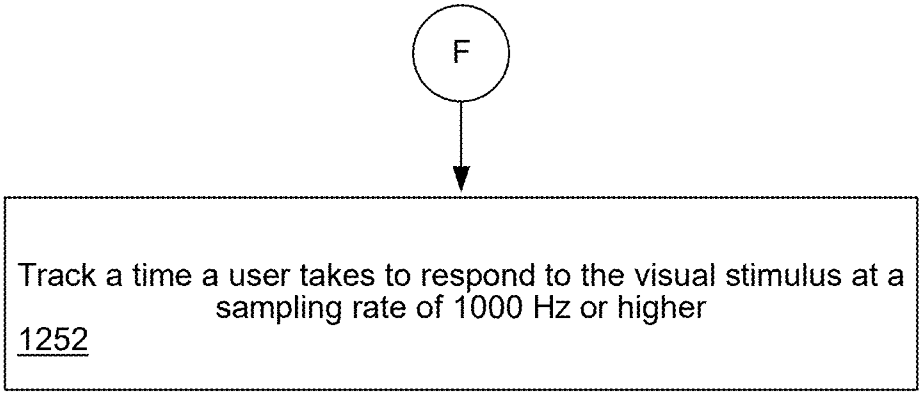
Figure 12K:
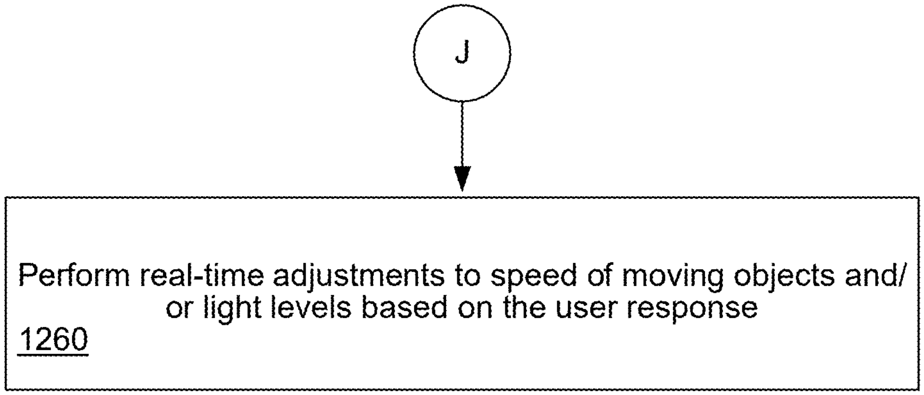
Figure 12L:
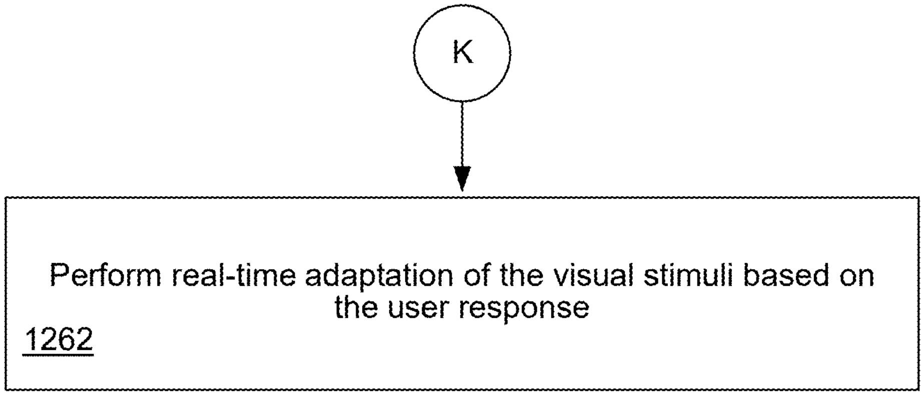

Referring to FIG. 12F, in some embodiments, the computer device 140 continuously tracks eye movements 1108 by (i) tracking (e.g., in step 1246) rapid movements of the eye between fixation points at rates of at least 100-500 Hz, (ii) tracking (e.g., in step 1248) eye movements where eyes are relatively stationary and focused on a single point at rates of 50-100 Hz, and/or (iii) tracking (e.g., in step 1250) eye movements where the eyes smoothly follows a moving object at rates of 100-200 Hz. Referring to FIG. 12G, in some embodiments, continuously tracking response times 1108 includes tracking (e.g., in step 1252) a time a user takes to respond to the visual stimulus at a sampling rate of 1000 Hz or higher.

Figure 12M:
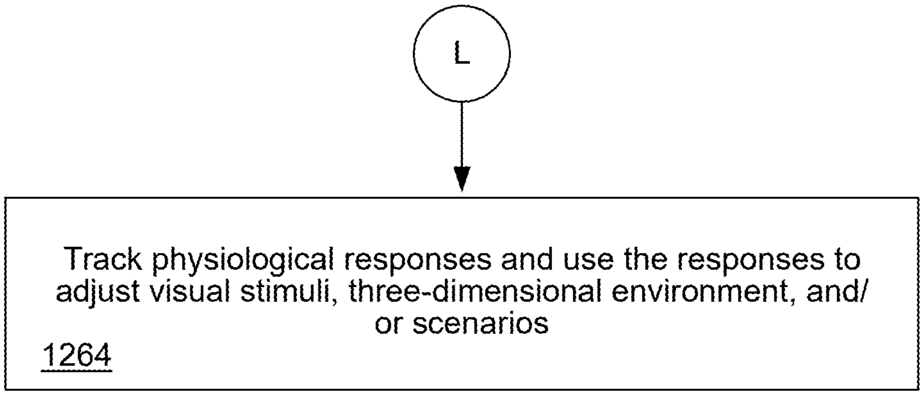
Figure 12N:
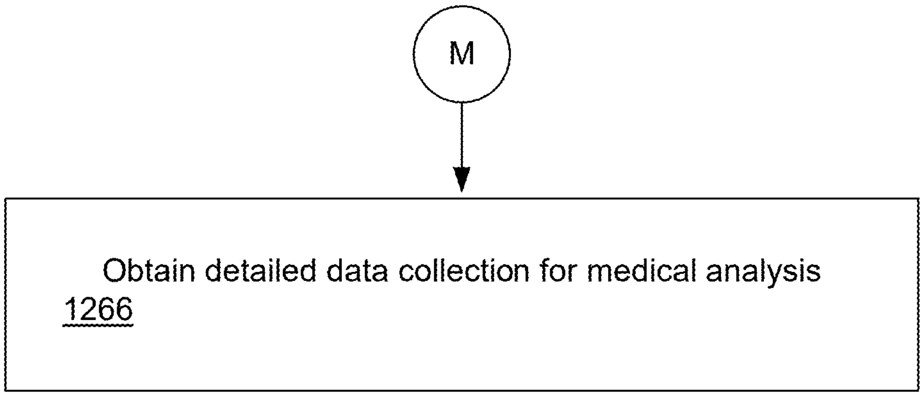
Figure 13A:
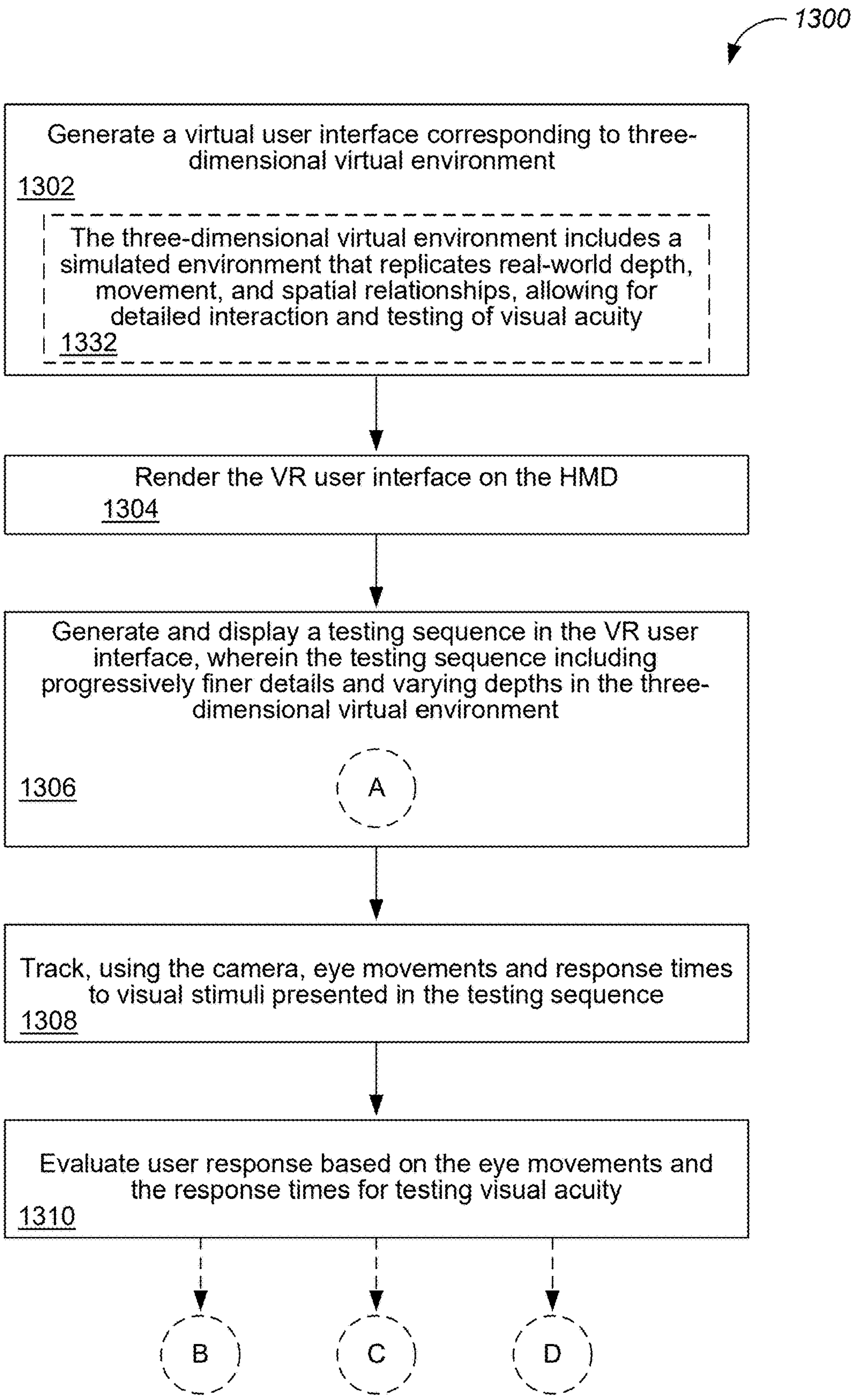
Figure 14A:
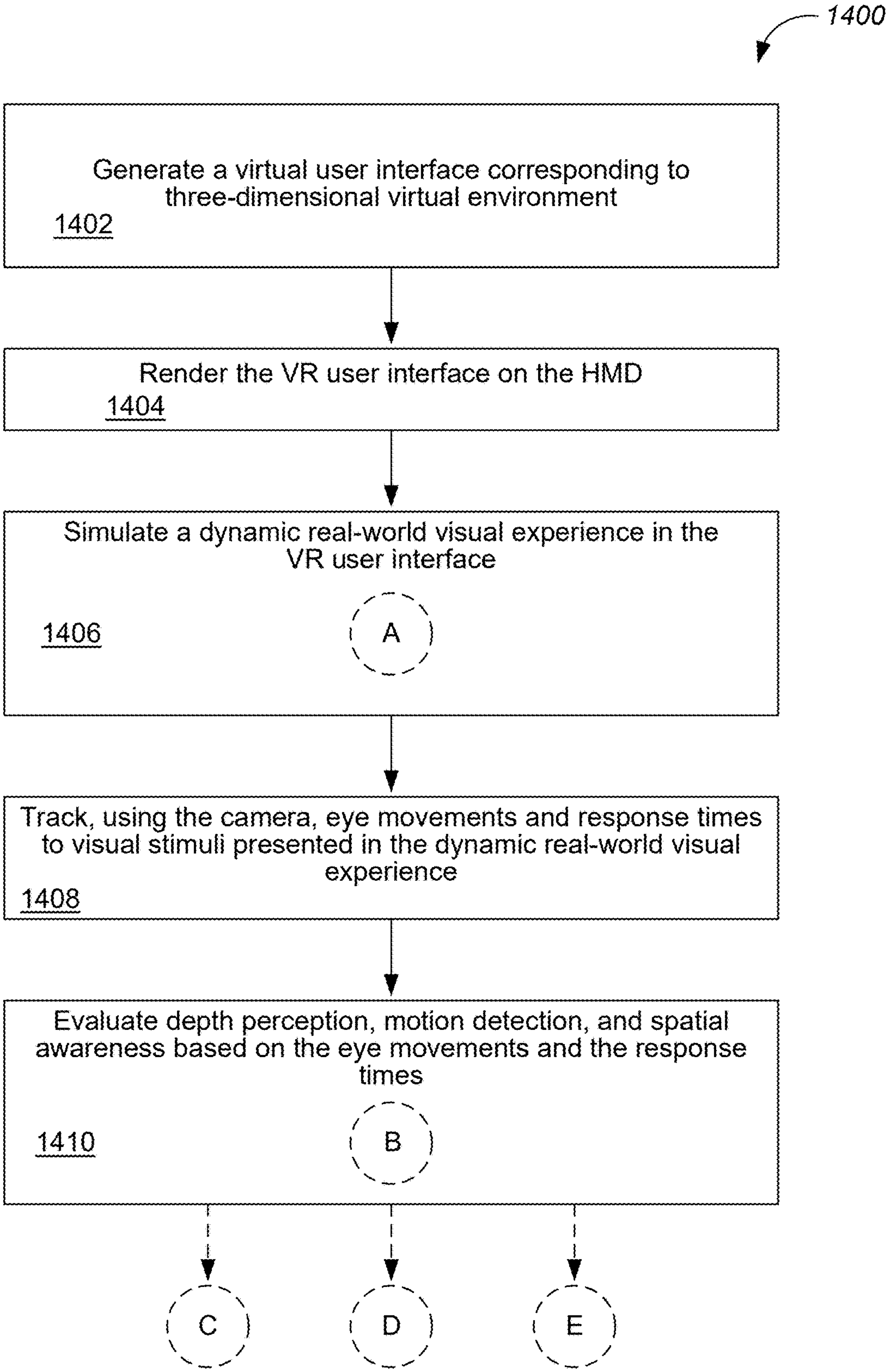

Referring to FIG. 12M, in some embodiments, the computer device 140 continuously tracks (e.g., in step 1264) physiological responses (e.g., heart rate, breathing rate, sweating around the eyes) and use the data to adjust visual stimuli, three-dimensional environment, and/or scenarios.

In some embodiments, the method further includes performing perception test to track eye movements and response times, in addition to tracking using the camera.

Referring back to FIG. 12A, the computer device 140, while simulating the one or more real-world scenarios, in real time, evaluates (e.g., in step 1212) (e.g., using the evaluation/measurement module 1150) user response based on the eye movements and the response times for testing visual acuity and perception (e.g., the visual acuity and perception 1152). Referring to FIG. 12J, in some embodiments, the computer device 140 detects (e.g., in step 1258) a visual impairment for adapting to a sudden change in light conditions and/or tracking moving objects. Referring to FIG. 12I, in some embodiments, the method further includes simultaneously evaluating (e.g., in step 1256) the user response for depth perception, motion detection, and light adaptation.

Referring to FIG. 12H, in some embodiments, the computer device 140 collects data (e.g., in step 1254) (e.g., using the tracking module 1144) for clinical analysis, including metrics comprising saccadic latency, fixation stability, and smooth pursuit accuracy. Referring to FIG. 12N, in some embodiments, the computer device 140 obtains (e.g., in step 1266) detailed data collection for medical analysis. This may include raw data, such as sizing of different characters; calibrated later based on responses from different users. In some embodiments, machine learning algorithms use physiological data for a user and/or data collected and/or calibrated across several users.

Referring to FIG. 12K, in some embodiments, the computer device 140 performs (e.g., in step 1260) real-time adjustments to speed of moving objects and/or light levels based on the user response.

Referring to FIG. 12L, in some embodiments, the computer device 140 performs (e.g., in step 1262) real-time adaptation of the visual stimuli based on the user response.

In some embodiments, testing visual acuity and perception includes detecting a visual impairment for adapting to a sudden change in light conditions or tracking moving objects.

Progressive Virtual Eye Test in a 3D VR Environment

According to some embodiments, the vision test system 1100 described above is configured to implement a virtual eye test for evaluating vision acuity test using progressively finer details in a 3D space. FIGS. 13A-13E show a flow diagram of an example process 1300 for implementing a virtual eye test for evaluating visual acuity and perception, according to some embodiments.

The computer device 140 (e.g., the computing device described above in reference to FIGS. 11A and 11B) generates (e.g., in step 1302) (e.g., using the UI module 1134) a VR user interface corresponding to a three-dimensional virtual environment. In some embodiments, the three-dimensional virtual environment includes (e.g., in step 1332) a simulated environment that replicates real-world depth, movement, and spatial relationships, allowing for detailed interaction and testing of visual acuity.

The computer device 140 also renders (e.g., in step 1304) (e.g., using the rendering module 1138) the VR user interface on the HMD 312A. Example details of the three-dimensional virtual environment and rendering the VR user interface are described above in reference to FIG. 12B, according to some embodiments.

The computer device 140 also generates and displays (e.g., in step 1302) (e.g., using the simulation module 1140) a testing sequence (e.g., the test sequences 1142) in the VR user interface 1204. The testing sequence includes progressively finer details and varying depths in the three-dimensional virtual environment (3D VR environment). In a 3D VR environment, progressively finer details can be shown for eye testing by employing various techniques, as described herein, according to some embodiments.

For example, Level of Detail (LOD) rendering includes creating multiple versions of 3D models with varying levels of detail. The less detailed versions are rendered when the object is far away from the viewer, and as the viewer gets closer, more detailed versions are swapped in. This allows for efficient rendering while still providing high-quality visuals when needed.

In some embodiments, mipmapping is used for texture mapping, where multiple versions of a texture are pre-filtered and stored at different resolutions. As the viewer moves closer to a surface, higher-resolution versions of the texture are used, providing finer details. In some embodiments, geometry instancing and tessellation is used to dynamically generate and render finer geometric details on surfaces as the viewer gets closer. Tessellation subdivides polygons into smaller pieces, allowing for smoother surfaces and more intricate details. In some embodiments, by integrating eye-tracking technology into the VR headset, the system can determine the user's point of gaze and prioritize rendering finer details in that area. This can be achieved by dynamically adjusting the LOD, tessellation levels, or even rendering resolutions based on the user's gaze direction.

In some embodiments, building upon eye tracking, foveated rendering techniques render the area around the user's gaze point at the highest resolution and quality, while progressively reducing the resolution and detail in the peripheral regions. This can significantly improve performance while maintaining a high level of detail where it matters most for eye testing. In some embodiments, for large and detailed 3D models or textures, progressive transmission techniques are employed, where the data is transmitted and rendered in a coarse-to-fine fashion. The initial low-detail version is displayed first, and as more data is received, finer details are progressively added. The techniques described herein can be combined and/or adjusted based on the specific requirements of the eye testing scenario, allowing for efficient rendering while maintaining the necessary level of detail for accurate visual assessments.

Referring next to FIG. 13B, in some embodiments, the testing sequence 1206 includes (e.g., in step 1312) gradual reduction of object size (e.g., depending on angle, pixelation density, in VR context) and increased complexity of visual tasks as the test progresses, thereby requiring increased focus and clarity as the test progresses. In some embodiments, the testing sequence includes (e.g., in step 1314) depth testing by having objects appear at different distances and requiring identification or interaction.

In some embodiments, the testing sequence includes (e.g., in step 1316) testing scenarios selected from the group consisting of: driving through varying weather conditions, reading signs at different distances, and navigating through crowded areas. In some embodiments, the testing sequence includes (e.g., in step 1318) one or more tests for testing nuances of depth perception, spatial awareness, and varying visual stimuli, for vision testing.

In some embodiments, the one or more tests includes (e.g., in step 1320) at least one scenario with realistic depth cues, varying object distances, or diverse visual elements, for vision testing. In some embodiments, the at least one scenario includes (e.g., in step 1322) moving pedestrians or fluctuating light levels, to mimic everyday challenges. In some embodiments, the progressively finer details correspond (e.g., in step 1324) to increasing granularity of vision performance testing.

Referring next to FIG. 13C, in some embodiments, the method further includes optimizing (e.g., in step 1326) the testing sequence for individual needs using one or more AI algorithms that adapt the three-dimensional virtual environment in real-time 1220 based on user responses and physiological data. Some embodiments optimize vision testing sequences for individual needs using AI algorithms that adapt a 3D virtual environment in real-time based on user responses and physiological data can be achieved through various techniques. Some embodiments perform gaze-contingent rendering and foveated rendering. Some embodiments use eye-tracking data to determine the user's gaze point and focal area within the virtual environment.

Some embodiments use foveated rendering techniques to render the highest quality visuals in the user's focal area, while reducing rendering quality in the peripheral areas. Some embodiments dynamically adjust the level of detail, resolution, and visual complexity based on the user's gaze patterns and attentional focus. Some embodiments perform adaptive stimulus presentation. Some embodiments utilize machine learning algorithms to analyze the user's physiological data (e.g., pupil dilation, eye movements, brain activity) and behavioral responses (e.g., reaction times, accuracy) in real-time.

Some embodiments adjust the parameters of the visual stimuli, such as size, contrast, color, or spatial frequency, to adapt to the user's visual capabilities and current state, based on the analyzed data.

For example, if the user shows signs of visual fatigue or difficulty in perceiving certain stimuli, the algorithm modifies the stimuli to be more easily perceived. Some embodiments perform adaptive test sequence and task difficulty, for example, using AI algorithms that continuously assess the user's performance and physiological responses during the vision testing sequence. Based on the assessment, some embodiments dynamically modify the order, complexity, or difficulty of the vision tests or tasks presented in the virtual environment.

For instance, if the user struggles with a particular test, the algorithm simplifies the task or provide additional training examples before proceeding to more challenging tests. Some embodiments perform personalized environmental rendering. Some embodiments collect and analyze data on a user's visual preferences, comfort levels, and/or physiological responses to different environmental conditions (e.g., lighting, contrast, depth cues), and subsequently use AI algorithms to generate personalized virtual environments that optimize visual comfort, clarity, and perception based on the user's individual needs and responses. Some embodiments continuously adapt the virtual environment in real-time by adjusting lighting, depth cues, color schemes, or other visual elements based on the user's ongoing physiological data and feedback.

Some embodiments provide multi-modal adaptive stimuli. Some embodiments incorporate auditory, tactile, or other sensory modalities in addition to visual stimuli within the virtual environment. Some embodiments analyze the user's physiological responses and cross-modal interactions to determine the most effective combination of sensory stimuli for vision testing. Some embodiments use AI algorithms to dynamically adjust the balance and synchronization of different sensory modalities, enhancing the user's overall perception and engagement. Some embodiments perform collaborative filtering and/or user profiling. Some embodiments collect and analyze data from multiple users to identify patterns and commonalities in visual preferences, capabilities, and physiological responses.

Some embodiments use collaborative filtering techniques and machine learning algorithms to create user profiles and predict optimal testing sequences and environmental conditions for new users based on similarities with existing user data. In some embodiments, by leveraging these AI-driven techniques, vision testing sequences and virtual environments are optimized in real-time to cater to individual needs, improving the accuracy, efficiency, and user experience of vision testing procedures. Some embodiments collect and analyze data on the user's visual preferences, comfort levels, and/or physiological responses to different environmental conditions (e.g., lighting, contrast, depth cues).

Some embodiments use Artificial Intelligence (AI) algorithms to generate personalized virtual environments that optimize visual comfort, clarity, and perception based on the user's individual needs and responses. Some embodiments continuously adapt the virtual environment in real-time by adjusting lighting, depth cues, color schemes, or other visual elements based on the user's ongoing physiological data and feedback. AI algorithms may include Reinforcement Learning (RL). In an RL framework, the AI learns to adapt the VR environment based on the user's interactions and feedback. The AI receives rewards or penalties based on the success of the visual tests, allowing it to optimize the environment for more effective assessments over time. Convolutional Neural Networks (CNNs) may be used for image and pattern recognition within the VR environment.

For instance, a CNN may analyze the user's gaze patterns to identify areas where the user struggles to focus, and subsequently adjust the visual stimuli to enhance those areas. Bayesian optimization may be used to fine-tune the parameters of the VR environment in real-time, based on the user's performance data. Bayesian optimization may be used to determine the optimal settings for lighting, object speed, and/or contrast levels to achieve the most accurate test results.

The 3-D virtual environment may be adapted and/or changed in various ways. Dynamic object placement may be used. Based on the user's previous interactions, the AI may rearrange objects in the virtual environment to focus on specific visual challenges.

For example, if a user has difficulty tracking fast-moving objects, the AI may introduce slower-moving objects initially and gradually increase the speed as the user's tracking improves. Some embodiments use adaptive lighting conditions whereby the AI adjusts lighting conditions in real-time to challenge the user's visual acuity under varying light levels. If the AI detects that a user performs well in bright light but struggles in dim light, the AI may gradually reduce the lighting to identify the exact threshold where the user's performance begins to decline.

Custom test sequences may be implemented based on user responses. For example, if the user's response times are consistently slower in certain scenarios, the AI may customize the test sequences to focus more on those challenging areas.

Optionally, the AI may create a series of progressively difficult visual tasks that are tailored to improving the user's speed and accuracy in responding to specific types of stimuli. The AI may continuously monitor the user's accuracy and/or reaction times. If the user consistently achieves high scores, the AI may increase the difficulty by adding more complex visual elements or reducing the time allowed for each task.

Custom test sequences may be implemented on physiological data. For example, AI may use data on pupil dilation to infer cognitive load and visual strain. If the AI detects that the user's pupils are dilating significantly, the AI may interpret this as a sign of visual stress and adjust the environment to reduce strain, such as by decreasing brightness or contrast. Heart Rate Variability (HRV) data may be used by the AI to assess the user's stress levels. If the AI detects high stress, it might introduce calming visual elements or reduce the intensity of the tests temporarily to avoid overwhelming the user. Neural activity monitoring, such as EEG or fNIRS data, may be used to assess the user's engagement and focus levels. If the AI detects reduced neural activity associated with attention, the AI may adjust the visual stimuli to re-engage the user, such as by introducing more interactive or visually stimulating elements.

Referring next to FIG. 13D, in some embodiments, the method further includes generating (e.g., in step 1328) a personalized and dynamic testing environment 1222 by adjusting visual stimuli including object speed and lighting, based on eye movement and pupil response, using real-time AI adaptation.

Referring next to FIG. 13E, in some embodiments, the method further includes performing (e.g., in step 1330) personalized adaptive testing by customizing one or more scenarios of the testing sequence and/or the three-dimensional virtual environment, to match a user's visual profile 1224, ensuring that each test is relevant to their specific vision challenges and daily experiences.

Referring back to FIG. 13A, the method also includes tracking (e.g., in step 1308) (e.g., using the tracking module 1144), using the camera, eye movements and response times to visual stimuli presented in the testing sequence.

The method also includes evaluating (e.g., in step 1310) (e.g., using the evaluation/measurement module 1150) user response based on the eye movements and the response times for testing visual acuity (e.g., the visual acuity 1152).

Dynamic Real-World Virtual Eye Test

According to some embodiments, the vision test system 1100 described above is configured to implement a virtual eye test for evaluating dynamic vision acuity during virtual movement scenarios. FIGS. 14A-14F show a flow diagram of an example process 1400 for implementing a virtual eye test for evaluating dynamic visual acuity, according to some embodiments.

The computer device 140 (e.g., the computing device described above in reference to FIGS. 11A and 11B) generates (e.g., in step 1402) (e.g., using the UI module 1134) a VR user interface corresponding to a three-dimensional virtual environment (e.g., the environment 1136). In some embodiments, the three-dimensional virtual environment includes a simulated environment that replicates real-world depth, movement, and spatial relationships, allowing for detailed interaction and testing of visual acuity.

The computer device 140 also renders (e.g., in step 1404) (e.g., using the rendering module 1138) the VR user interface on the HMD 312A. Example details of the three-dimensional virtual environment and rendering the VR user interface are described above in reference to FIG. 12B, according to some embodiments.

The computer device 140 also simulates (e.g., in step 1406) (e.g., using the simulation module 1140) a dynamic real-world visual experience (e.g., the scenario 1142) in the VR user interface. Referring to FIG. 14B, in some embodiments, simulating the dynamic real-world visual experience includes simulating (e.g., in step 1412) one or more scenarios where a user physically moves through virtual spaces, encountering changing perspectives and/or environments (e.g., walking through a city or driving).

In some embodiments, simulating the dynamic real-world visual experience includes simulating (e.g., in step 1414) one or more scenarios that allow a user to navigate virtual environments, interact with moving objects, and adjust to changing viewpoints. In some embodiments, simulating the dynamic real-world visual experience includes dynamic adjustment (e.g., in step 1416) of visual stimuli comprising performing real-time changes in visual elements based on user movements. In some embodiments, performing real-time changes includes altering (e.g., in step 1418) a speed of one or more moving objects. In some embodiments, performing (e.g., in step 1420) real-time changes includes altering a direction of an incoming stimuli.

Referring next to FIG. 14E, in some embodiments, the computer device 140 further uses (e.g., in step 1428) an AI-driven adaptive testing environment 1316 uses AI to modify one or more VR scenarios in real-time based on a user's performance and physiological feedback, for a personalized assessment.

Referring next to FIG. 14F, in some embodiments, the method further includes tailoring (e.g., in step 1430) the dynamic real-world visual experience to a user's specific vision needs and daily activities 1320 providing relevant and practical assessment results for the user.

Referring back to FIG. 14A, the computer device 140 also tracks (e.g., in step 1408) (e.g., using the tracking module 1144), using the camera, eye movements (e.g., the eye movements 1146) and response times (e.g., the response time 1148) to visual stimuli presented in the dynamic real-world visual experience.

The computer device 140 also evaluates (e.g., in step 1410) depth perception, motion detection, and spatial awareness (e.g., the depth perception, motion detection, and spatial awareness 1154) based on the eye movements and the response times. Referring to FIG. 14C, in some embodiments, evaluating depth perception, motion detection, and spatial awareness includes (e.g., in step 1422) (i) assessing how a user perceives and responds to objects at varying distances and speeds, and (ii) assessing the user's ability to navigate through complex environments. In some embodiments, detection of motion sensitivity issues includes (e.g., in step 1424) identifying difficulties in tracking moving objects or adjusting to rapid changes in the visual scene.

Referring to FIG. 14D, in some embodiments, the computer device 140 also uses (e.g., in step 1426) one or more biometric sensors to monitor physiological responses (e.g., heart rate, pupil dilation, and eye tracking) to gather data on visual performance under dynamic conditions.

Dynamic Visual Acuity Test in VR

According to some embodiments, the vision test system 1100 described above is configured to measure and improve dynamic visual acuity with target recognition challenges. FIGS. 15A-15J show a flow diagram of an example process 1500 for implementing a virtual eye test for measure and improve dynamic visual acuity with target recognition challenges, according to some embodiments.

The computer device 140 (e.g., the computing device described above in reference to FIGS. 11A and 11B) generates (e.g., in step 1502) (e.g., using the UI module 1134) a VR user interface corresponding to a three-dimensional virtual environment (e.g., the environment 1136). Referring to FIG. 15F, in some embodiments, the method further includes controlling and/or customizing (e.g., in step 1522) the virtual environment based on manipulation of target speed, background complexity, and/or lighting. Referring to FIG. 15D, in some embodiments, the three-dimensional virtual environment includes (e.g., in step 1518) varying environments selected from the group consisting of: city streets, sports fields, and natural landscapes, wherein the varying environments include diverse visual elements and movement.

Referring back to FIG. 15A, the computer device 140 also renders (e.g., in step 1504) (e.g., using the rendering module 1138) the VR user interface on the HMD 312A. Example details of the three-dimensional virtual environment and rendering the VR user interface are described above in reference to FIG. 12B, according to some embodiments.

The computer device 140 also simulates (e.g., in step 1506) (e.g., using the simulation module 1140) real-world motion and target recognition visual tasks (e.g., the scenarios 1142) in the VR user interface 1404. Referring to FIG. 15B, in some embodiments, the real-world motion and target recognition visual tasks include (e.g., in step 1512) activities that require identifying and tracking moving objects. In some embodiments, the activities are selected (e.g., in step 1514) from the group consisting of: driving, sports, and navigating through crowded places. Referring to FIG. 15E, in some embodiments, simulating real-world motion and target recognition visual tasks includes (e.g., in step 1520) simulating one or more scenarios that require identification and tracking of progressively finer details and varying speeds of moving targets.

Referring back to FIG. 15A, the computer device 140 also tracks (e.g., in step 1508) (e.g., using the tracking module 1144), using the camera, eye movements (e.g., the eye movements 1146) and response times (e.g., the response times 1148) to visual stimuli presented in the real-world motion and target recognition visual tasks.

The computer device 140 also measures (e.g., in step 1510) (e.g., using the evaluation/measurement module 1150) dynamic visual acuity (e.g., the dynamic visual acuity 1156) based on the eye movements and the response times. Referring to FIG. 15C, in some embodiments, measuring dynamic visual acuity includes (e.g., in step 1516) assessing the user's ability to maintain focus and accurately identify targets in motion, under different lighting and background conditions.

Referring to FIG. 15G, in some embodiments, the computer device 140 also provides (e.g., in step 1524) exercises for improving visual acuity comprising repeated exposure to adaptive difficulty levels 1422 in VR scenarios to enhance visual tracking and recognition skills. Referring to FIG. 15H, in some embodiments, the computer device 130 also includes (e.g., in step 1526) providing exercises for improving visual acuity comprising interactive tasks 1424 that progressively increase in complexity and speed.

Referring to FIG. 15I, in some embodiments, the computer device 140 further uses (e.g., in step 1528) one or more biometric feedback systems for real-time adjustments 1426 to difficulty of challenges based on eye tracking and neural response measurements, thereby ensuring optimal engagement and training. Referring to FIG. 15J, in some embodiments, the computer device 140 uses (e.g., in step 1530) machine learning for personalization 1428, including using one or more algorithms that analyze user performance and physiological data to customize training regimen and optimize visual acuity improvement over time.

VR Astigmatism Assessment

According to some embodiments, the vision test system 1100 described above is configured to assess astigmatism by simulating visual scenarios requiring focus adjustments. FIGS. 16A-16G show a flow diagram of an example process 1600 for assessing astigmatism by simulating visual scenarios requiring focus adjustments, according to some embodiments.

Figure 16A:
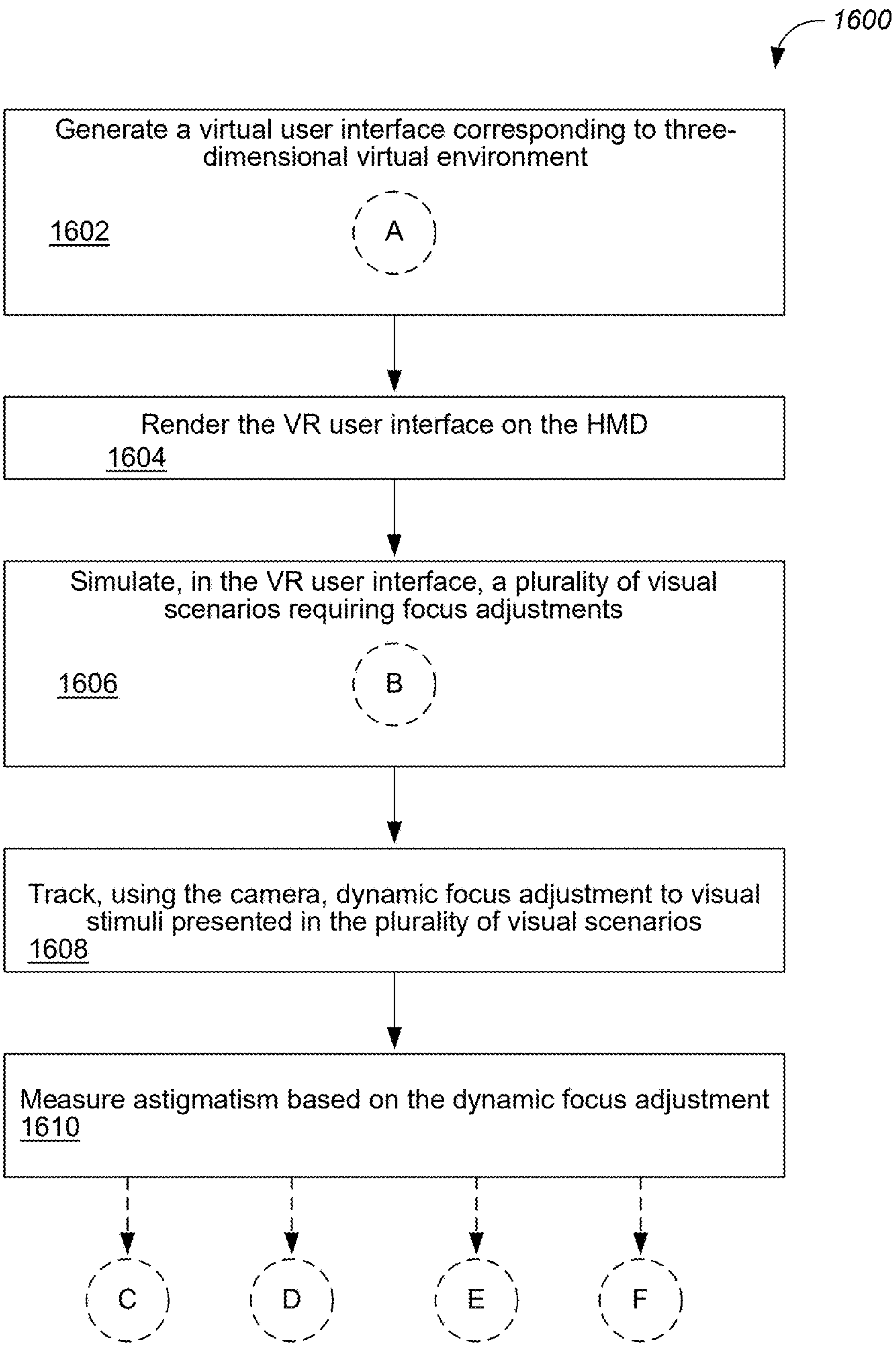
Figure 16B:
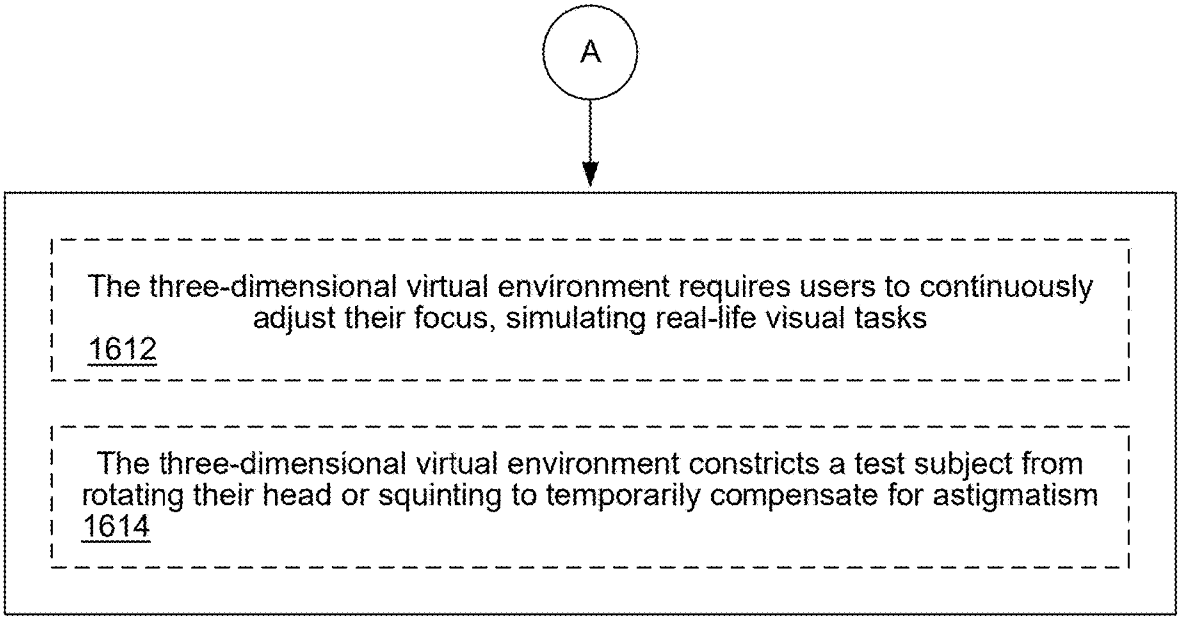

The computer device 140 (e.g., the computing device described above in reference to FIGS. 11A and 11B) generates (e.g., in step 1602) (e.g., using the UI module 1134) a VR user interface corresponding to a three-dimensional virtual environment (e.g., the environment 1136). Referring to FIG. 16B, in some embodiments, the three-dimensional virtual environment requires (e.g., in step 1612) users to continuously adjust their focus, simulating real-life visual tasks. In some embodiments, the three-dimensional virtual environment constricts (e.g., in step 1614) a test subject from rotating their head or squinting to temporarily compensate for astigmatism.

Referring back to FIG. 16A, the computer device 140 also renders (e.g., in step 1604) (e.g., using the rendering module 1138) the VR user interface on the HMD 312A. Example details of the three-dimensional virtual environment and rendering the VR user interface are described above in reference to FIG. 12B, according to some embodiments.

The computer device 140 also simulates (e.g., in step 1606) (e.g., using the simulation module 1140), in the VR user interface, a plurality of visual scenarios (e.g., the scenarios 1142) requiring focus adjustments. In some embodiments, Virtual Reality (VR) interfaces leverage depth cues and stereoscopic rendering to create immersive 3D environments that require users to adjust their focus, similar to how humans perceive depth and focus in the real world. In some embodiments, a VR interface is used to show scenarios that require adjusting focus.

Some embodiments perform stereoscopic rendering. VR headsets display two slightly different images, one for each eye, creating a stereoscopic 3D effect. This allows objects at different virtual distances to be rendered, forcing the user's eyes to converge and focus at different depths. In some embodiments, VR environments incorporate various depth cues, such as occlusion, relative size, perspective, shadows, and motion parallax. These cues provide spatial information that prompts the user's eyes to adjust focus as they would in the real world.

In some embodiments, VR headsets use variable focus displays, which can dynamically adjust the focal plane to match the virtual distance of objects being viewed. This simulates natural accommodation (e.g., the eye's ability to change focus) and provides a more realistic depth perception. Some embodiments use foveated rendering, which optimizes rendering by providing the highest resolution and detail in the area where the user is directly focusing, while reducing resolution and detail in the peripheral areas. This encourages users to actively adjust their focus to perceive details clearly. Some embodiments provide interactive scenarios. In some embodiments, VR experiences create scenarios where users need to shift their attention and focus between objects or elements at different virtual distances.

For example, a training simulation might require users to inspect machinery components up close and then switch focus to read instructions or monitor displays. Some embodiments use eye-tracking technologies. By tracking the user's gaze and focus point, in some embodiments, VR systems dynamically adjust the rendering and depth cues to further enhance the perception of depth and focus adjustments.

Referring next to FIG. 16C, in some embodiments, the plurality of visual scenarios includes (e.g., in step 1616) scenarios that require rapidly shifting focus between distant and near objects. In some embodiments, the plurality of visual scenarios includes (e.g., in step 1618) scenarios that require adjusting focus while tracking moving objects.

In some embodiments, the plurality of visual scenarios replicates (e.g., in step 1620) real-world viewing conditions by presenting targets at multiple distances and angles. In some embodiments, the plurality of visual scenarios test (e.g., in step 1622) perception of depth, curvature and dimensionality using 3D shapes and contours. In some embodiments, the plurality of visual scenarios can dynamically introduce or manipulate (e.g., in step 1624) cylindrical and other complex lens powers to precisely map the degree and axis of astigmatic errors.

Figure 16D:
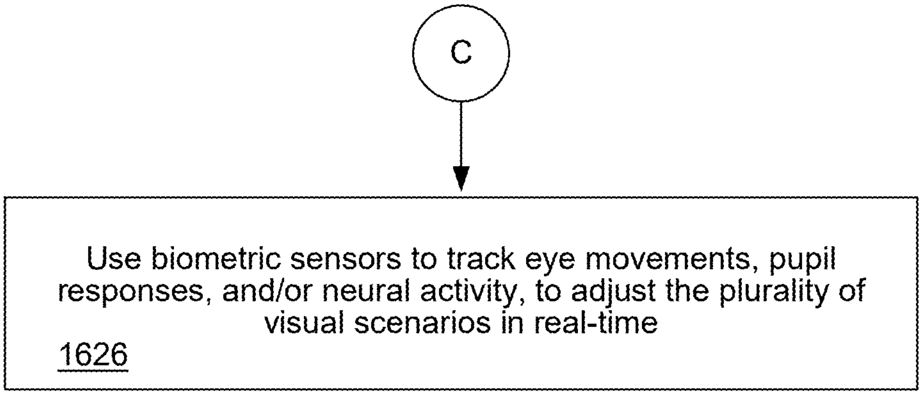
Figure 16E:
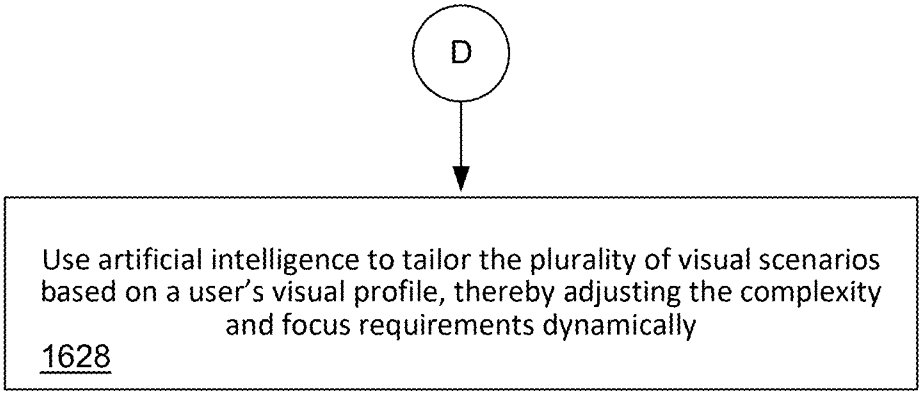
Figure 17A:
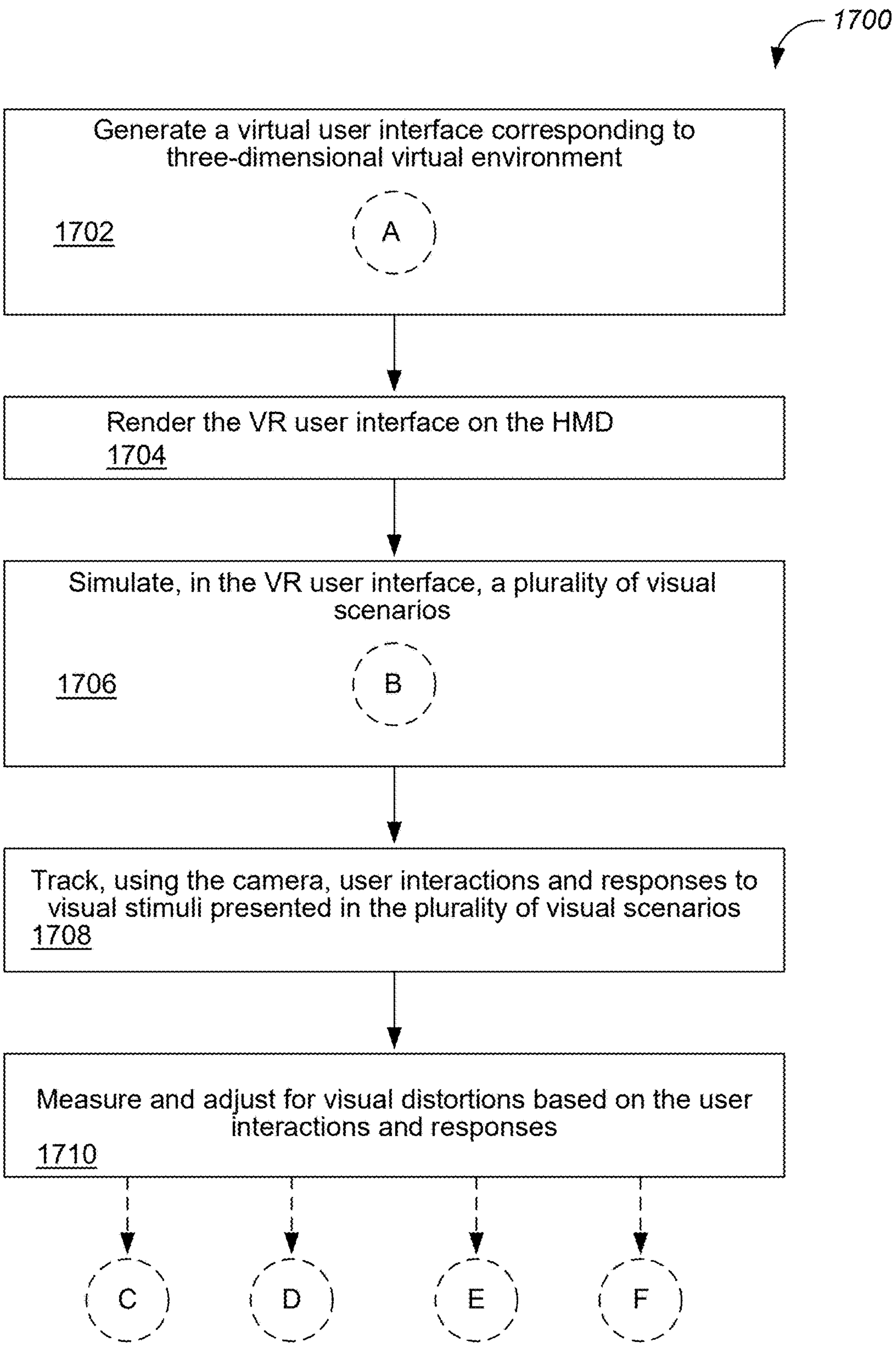

Referring next to FIG. 16D, in some embodiments, the computer device 140 further uses (e.g., in step 1626) biometric sensors 1520 to track eye movements, pupil responses, and/or neural activity, to adjust the plurality of visual scenarios in real-time. Referring next to FIG. 16E, in some embodiments, the computer device 140 further uses (e.g., in step 1628) artificial intelligence to tailor the plurality of visual scenarios based on a user's visual profile 1522, thereby adjusting the complexity and focus requirements dynamically.

Referring back to FIG. 16A, the computer device 140 also tracks (e.g., in step 1608) (e.g., using the tracking module 1144), using the camera, dynamic focus adjustment to visual stimuli presented in the plurality of visual scenarios. Some embodiments measure user focus in a Virtual Reality (VR) environment for understanding user engagement, attention, and/or cognitive load. Example techniques for measuring user focus in VR are described below, according to some embodiments.

In some embodiments, VR headsets are equipped with eye-tracking sensors, which can accurately measure where the user is looking within the virtual environment. By analyzing gaze patterns, fixations, and/or saccades (rapid eye movements), some embodiments determine the user's focus of attention and cognitive processing. Some embodiments use pupillometry.

For example, the size of the pupil can provide insights into cognitive load and attentional state. Pupil dilation is often associated with increased mental effort and focus. Some VR headsets have pupil-tracking capabilities that can be used for pupillometry analysis. Some embodiments use Electroencephalography (EEG), which measures the electrical activity of the brain and is used to detect patterns associated with attentional states and cognitive workload. In some embodiments, portable EEG devices are used in conjunction with VR setups.

Some embodiments use Functional Near-Infrared Spectroscopy (fNIRS), which is a non-invasive optical neuroimaging technique that measures changes in blood oxygenation levels in the brain, which are related to neural activity. In some embodiments, similar to EEG, fNIRS is used to provide insights into cognitive processes and attentional focus. In some embodiments, in task-based VR scenarios, measuring user performance, reaction times, and accuracy indicate their level of focus and engagement with the task. Some embodiments provide subjective measures. User self-reports, such as rating scales or questionnaires, provide subjective assessments of their perceived focus and cognitive load during the VR experience.

In some embodiments, trained observers (e.g., humans and/or AI systems and/or algorithms) monitor and code user behaviors, such as head movements, body posture, and/or verbal utterances, which may indicate attentional states and focus levels. In some embodiments, one or more techniques described herein are combined. Multiple measurement techniques provide a more comprehensive understanding of user focus in VR, as each method has its strengths and limitations.

The computer device 140 also measures (e.g., in step 1610) (e.g., using the evaluation/measurement module 1150) astigmatism (e.g., the astigmatism 1158) based on the dynamic focus adjustment. Referring next to FIG. 16F, in some embodiments, the computer device 140 further generates (e.g., in step 1630) one or more insights into visual environment interaction including data on how individuals with astigmatism interact with various visual elements, including how quickly they can refocus between objects at different distances or under different lighting conditions.

Referring next to FIG. 16G, in some embodiments, the computer device 140 further provides (e.g., in step 1632) targeted treatments and corrective measures utilizing insights based on the measurement of astigmatism to recommend treatments and corrective measures, including customized corrective lenses or specific vision therapy exercises that address the unique challenges faced by each patient.

VR Astigmatism Distortion Assessment and Correction

According to some embodiments, the vision test system 1100 described above is configured for measuring and adjusting for visual distortions caused by astigmatism. FIGS. 17A-17G show a flow diagram of an example process 1700 for assessing astigmatism by simulating visual scenarios requiring focus adjustments, according to some embodiments.

The computer device 140 (e.g., the computing device described above in reference to FIGS. 11A and 11B) generates (e.g., in step 1702) (e.g., using the UI module 1134) a VR user interface corresponding to a three-dimensional virtual environment (e.g., the environment 1136). Referring to FIG. 17B, in some embodiments, the three-dimensional virtual environment includes (e.g., in step 1712) one or more environments where users encounter various visual scenarios designed to reveal specific distortions caused by astigmatism. In some embodiments, the three-dimensional virtual environment allows (e.g., in step 1714) for manipulation of visual stimuli including adjusting text size, distance, and lighting conditions.

Referring back to FIG. 17A, the computer device 140 also renders (e.g., in step 1704) (e.g., using the rendering module 1138) the VR user interface on the HMD 312A. Example details of the three-dimensional virtual environment and rendering the VR user interface are described above in reference to FIG. 12B, according to some embodiments.

The computer device 140 also simulates (e.g., in step 1706) (e.g., using the simulation module 1140), in the VR user interface, a plurality of visual scenarios (e.g., the scenarios 1142). Referring to FIG. 17C, in some embodiments, the plurality of visual scenarios includes (e.g., in step 1716) at least one scenario with blurring of lines, ghosting, or irregular focus. In some embodiments, the plurality of visual scenarios includes (e.g., in step 1718) reading text at different distances or identifying objects in motion.

Referring back to FIG. 17A, the computer device 140 also tracks (e.g., in step 1708) (e.g., using the tracking module 1144), using the camera, user interactions and responses (e.g., the eye movements 1146 and the response time 1148) to visual stimuli presented in the plurality of visual scenarios.

The computer device 140 also measures and adjusts (e.g., in step 1710) (e.g., using the evaluation/measurement module 1150) for visual distortions (e.g., the visual distortions 1160) based on the user interactions and responses.

Referring next to FIG. 17D, in some embodiments, the computer device 140 also provides (e.g., in step 1720) a description of a patient's condition comprising detailed maps of visual distortions, highlighting areas where the patient experiences the most significant difficulties.

Referring next to FIG. 17E, in some embodiments, the computer device 140 also uses (e.g., in step 1722) adaptive optics for simulating corrective lenses in real-time, thereby allowing users to experience immediate adjustments to their visual distortions, to provide feedback on the effectiveness of different corrections.

Referring next to FIG. 17F, in some embodiments, the method further includes using (e.g., in step 1724) one or more machine learning algorithms to analyze visual responses, thereby continuously optimizing the plurality of visual scenarios for personalized assessment and correction.

Referring next to FIG. 17F, in some embodiments, the computer device 140 further provides (e.g., in step 1726) personalized corrective measures comprising customizing vision correction strategies based on detailed assessments, ensuring that treatments and corrective lenses are tailored to an individual's specific visual needs.

VR Night Blindness Assessment

According to some embodiments, the vision test system 1100 described above is configured to implement a virtual eye test for evaluating vision acuity test using progressively finer details in a 3D space. FIGS. 18A-18F show a flow diagram of an example process 1800 for implementing a virtual eye test for evaluating visual acuity and perception, according to some embodiments.

The computer device 140 (e.g., the computing device described above in reference to FIGS. 11A and 11B) generates (e.g., in step 1802) (e.g., using the UI module 1134) a VR user interface corresponding to a three-dimensional virtual environment (e.g., the environment 1136). In some embodiments, the three-dimensional virtual environment allows (e.g., in step 1838) manipulation of light levels and visual challenges in real-time.

The computer device 140 also renders (e.g., in step 1804) (e.g., using the rendering module 1138) the VR user interface on the HMD 312A. Example details of the three-dimensional virtual environment and rendering the VR user interface are described above in reference to FIG. 12B, according to some embodiments.

Figure 18A:
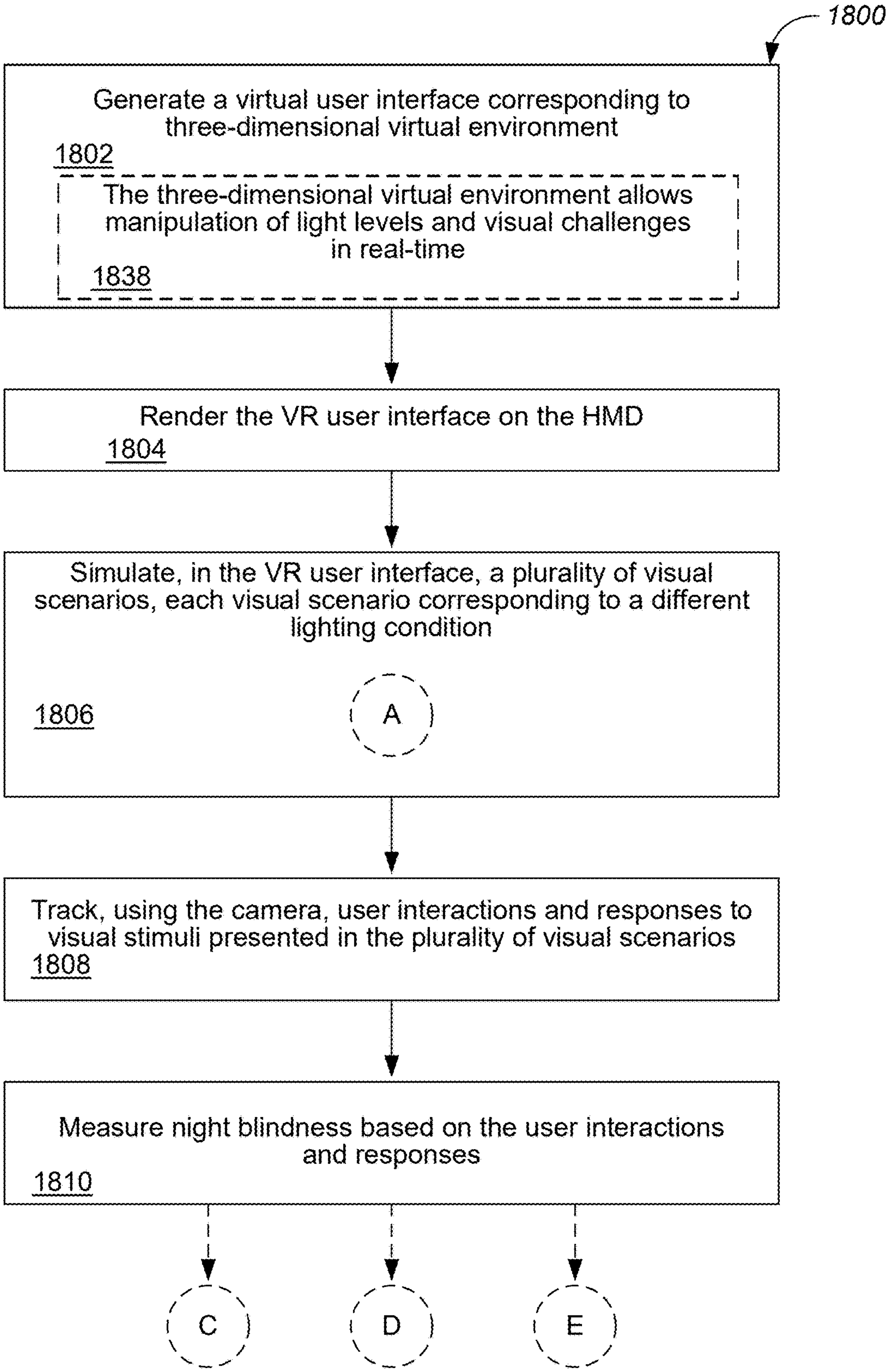
Figure 18B:
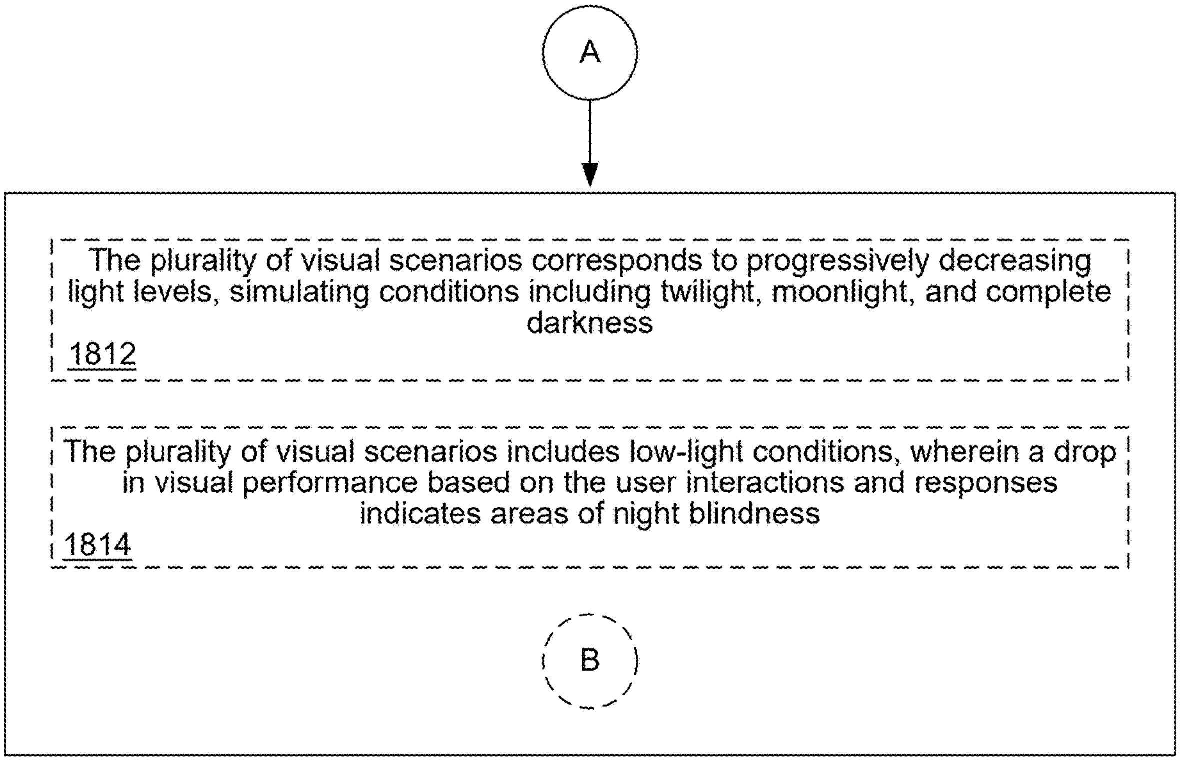

The computer device 140 also simulates (e.g., in step 1206) (e.g., using the simulation module 1140), in the VR user interface, a plurality of visual scenarios (e.g., the scenarios 1142). Each visual scenario corresponds to a different lighting condition. Referring next to FIG. 18B, in some embodiments, the plurality of visual scenarios corresponds (e.g., in step 1812) to progressively decreasing light levels, simulating conditions including twilight, moonlight, and complete darkness. In some embodiments, the plurality of visual scenarios includes (e.g., in step 1814) low-light conditions. A drop in visual performance based on the user interactions and responses indicates areas of night blindness.

Referring next to FIG. 18C, in some embodiments, the plurality of visual scenarios can include: a baseline visual acuity test (e.g., in step 1816) for testing a patient's visual acuity under normal, well-lit conditions to establish a baseline; a dark adaptation test (e.g., in step 1818) where the patient is placed in a dark room or environment for an extended period to allow the patient's eyes to adapt to the darkness; a night vision simulation test (e.g., in step 1820) to immerse the patient in the three-dimensional virtual environment simulating night-time or low-light conditions; a visual acuity testing (e.g., in step 1822) in low light using standard eye charts, objects, or other visual targets presented at various distances and contrasts under controlled lighting conditions; a dynamic testing (e.g., in step 1824) where the three-dimensional virtual environment introduces dynamic elements, including moving objects or changes in lighting conditions, to assess the patient's ability to perceive and react to visual stimuli in low light; a night vision tasks testing (e.g., in step 1826) where the patient is asked to perform simulated tasks that require good night vision, including navigating through a dimly lit environment, identifying objects, or reading signs/labels; a subjective assessment (e.g., in step 1828) where the patient is asked to report their subjective experience, including any difficulties or discomfort experienced during the low-light simulation; and/or repeat testing (e.g., in step 1830) where the entire sequence may be repeated multiple times, with varying levels of illumination or different three-dimensional virtual environments, to fully assess the severity and consistency of the night blindness.

Referring back to FIG. 18A, the computer device 140 also tracks (e.g., in step 1808) (e.g., using the tracking module 1144), using the camera, user interactions and responses (e.g., the eye movements 1146 and the response times 1148) to visual stimuli presented in the plurality of visual scenarios.

The computer device 140 also measures (e.g., in step 1810) (e.g., using the evaluation/measurement module 1150) night blindness (e.g., the night blindness 1162) based on the user interactions and responses. Referring next to FIG. 18D, in some embodiments, measuring night blindness includes (e.g., in step 1832) evaluation of visual performance based on assessing a user's ability to navigate and identify objects in low-light conditions, evaluating their adaptation to different lighting scenarios.

Referring next to FIG. 18E, in some embodiments, the computer device 140 also uses (e.g., in step 1834) one or more biometric feedback mechanisms including sensors to track pupil dilation, eye movement, and retinal response, allowing real-time adjustments to low-light simulations based on physiological feedback.

Referring next to FIG. 18F, in some embodiments, the computer device 140 also uses (e.g., in step 1836) artificial intelligence to adapt the plurality of visual scenarios for an individual for tailoring difficulty and nature of visual tasks based on the individual's visual performance, to provide a personalized assessment for the individual.

Example Vision Test Process

Figure 19:
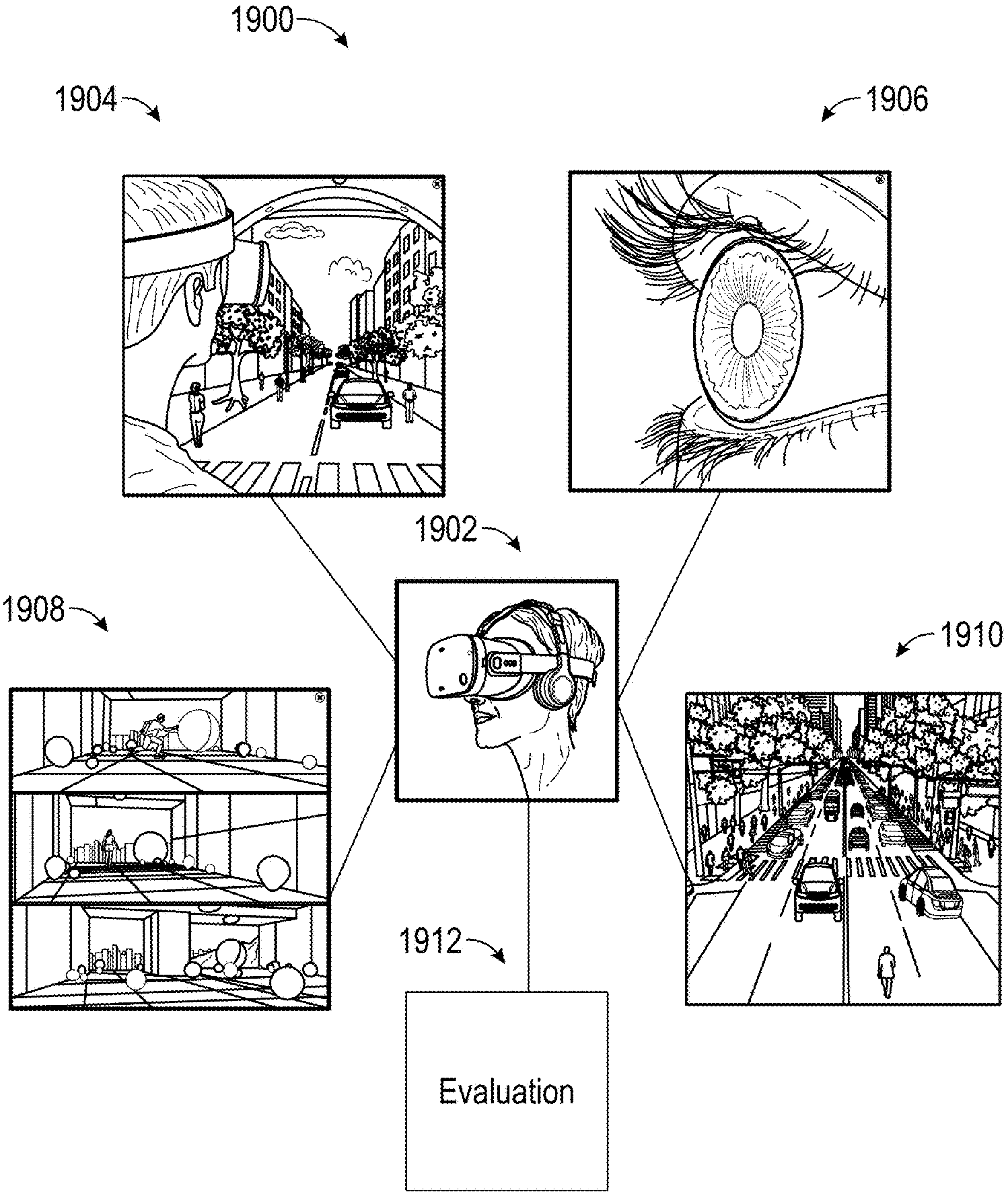
FIG. 19 is a schematic diagram showing an example vision test, in accordance with some embodiments.

FIG. 19 is a schematic diagram showing an example vision test 1900, in accordance with some embodiments. The illustration 1902 shows a person wearing a VR headset (HMD). The VR headset may include eye-tracking cameras. As shown in the illustration 1904, the user's view through the HMD may show a photorealistic virtual environment. The environment may be a busy urban street scene with pedestrians, vehicles, and varying light conditions, an example of which is shown in the illustration 1910. The illustration 1906 shows a close-up of an eye that may be tracked by the eye-tracking cameras, which may track eye movements, such as saccades, fixations, and smooth pursuit. The illustration 1908 shows example scenarios that may be displayed in the HMD for evaluation response. Based on responses, the system may perform various evaluations (e.g., in step 1912).

Example Virtual Eye Test in a Photorealistic VR Environment

Figure 20A:
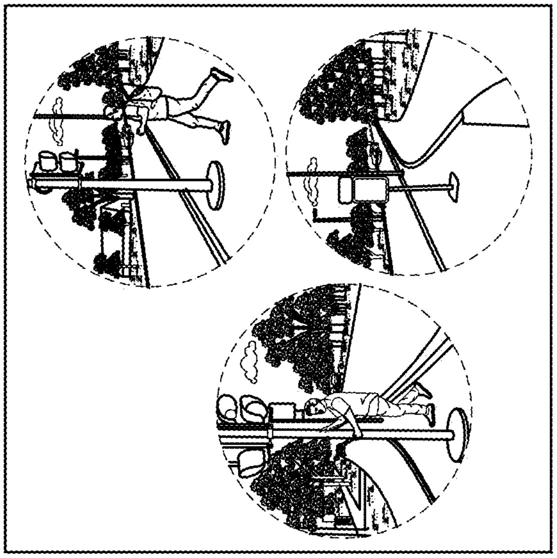
FIGS. 20A-20C show a series of illustrations for an example virtual eye test, in accordance with some embodiments.
Figure 20B:
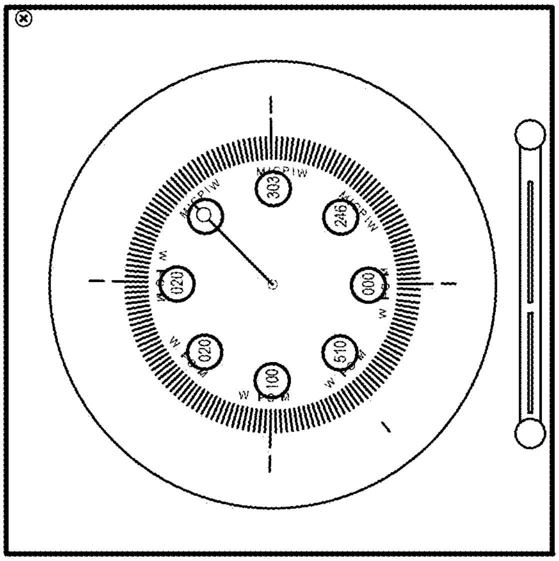
Figure 20C:
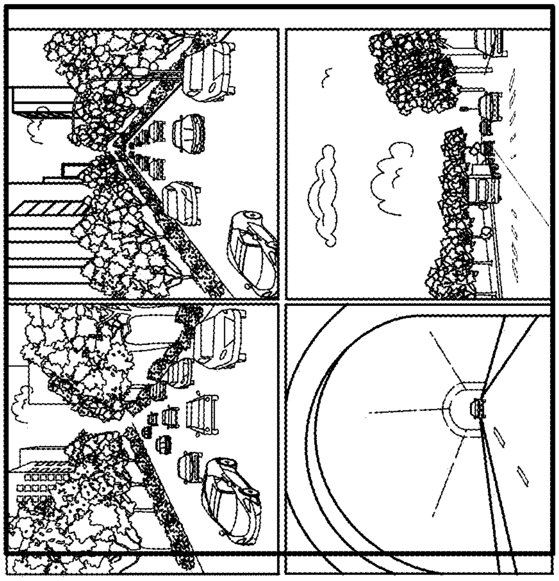

FIGS. 20A-20C show a series of illustrations 2000 for an example virtual eye test, in accordance with some embodiments. A user's view through a HMD may show a photorealistic environment. Examples for the environment include busy urban street, a scene with pedestrians and/or vehicles.

The environment may include varying lighting conditions. FIG. 20A shows an illustration 2002 of different views for a pedestrian suddenly stepping into a road, which is an example of a specific visual stimuli that a user may need to respond to. A street scene, for example may show different visual stimuli that the user might need to respond to, such as a traffic light changing colors, a pedestrian suddenly stepping onto the road, and/or road sign that needs to be read at a distance.

FIG. 20B shows an illustration 2004 of a real-time data readout, representing tracking of eye movements and response times. Tracked eye movements may include saccades, fixations, and smooth pursuit. FIG. 20C shows example illustrations 2006 for changes in the environment. Top two panels in the illustration show day turning to night, bottom left panel shows entering a tunnel while driving, and the bottom right panel shows changing weather conditions.

Example Progressive Virtual Eye Test in a 3D VR Environment

Figure 21A:
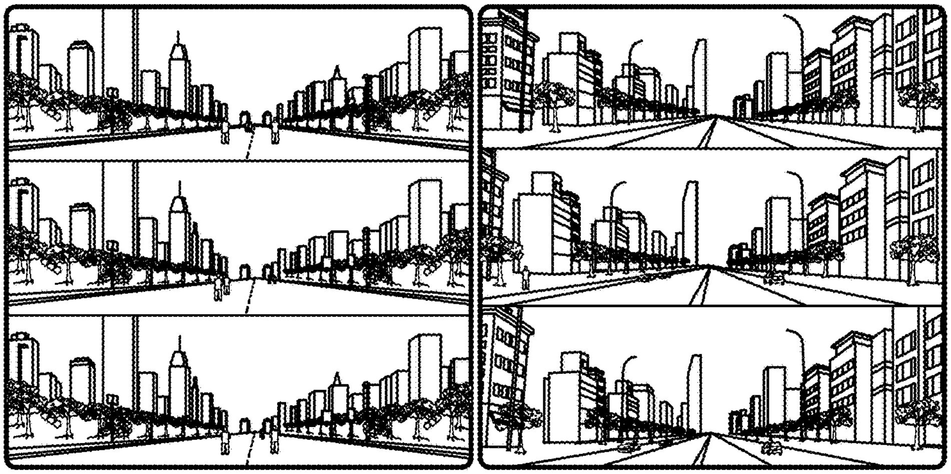
FIGS. 21A-21E show a series of illustrations for an example progressive virtual eye test, in accordance with some embodiments.

FIGS. 21A-21E show a series of illustrations for an example progressive virtual eye test, in accordance with some embodiments. A user's view through a HMD may show test scenarios that are progressive in nature. FIG. 21A shows an illustration 2100 where a cityscape is shown (in the panels on the left) with large, clear objects in the foreground. In a next stage or as a progression (in the panels shown on the right), the same cityscape is shown with smaller objects and more detail. A close-up view may be shown with fine details, like small text on a distant sign.

Figure 21B:
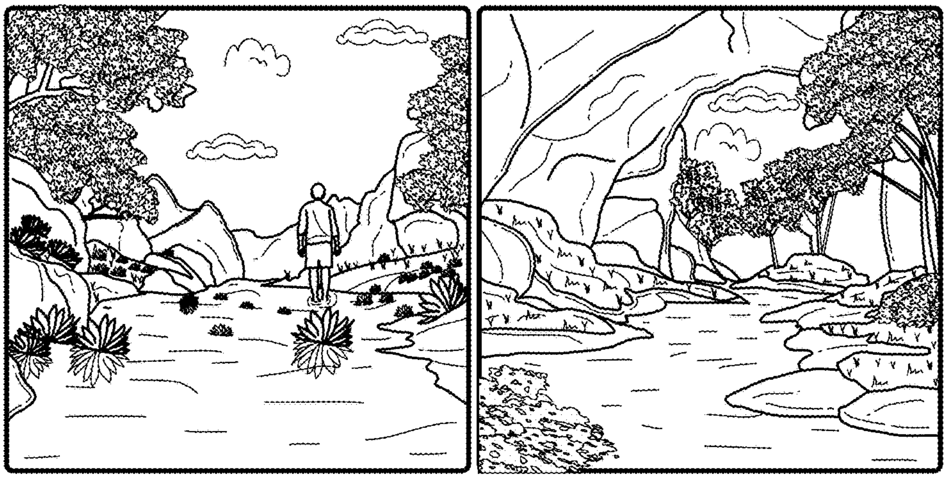

FIG. 21B shows an illustration 2102 of depth perception test visualization. Objects may be shown at varying distances in a virtual environment (a natural landscape in the example shown). Some objects may be highlighted to show they require interaction.

Figure 21C:
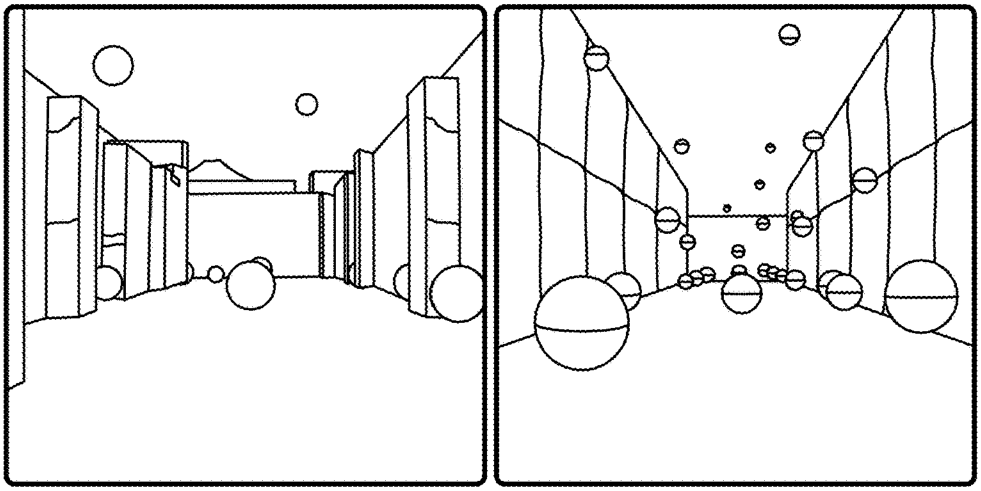

A split-screen may show two testing scenarios, as shown in the illustration 2104 in FIG. 21C. Example visual scenario includes driving through changing weather conditions (e.g., sunny to rainy. As the user responds to visual stimuli, eye movements and/or pupil dilation response may be tracked.

Figure 21D:
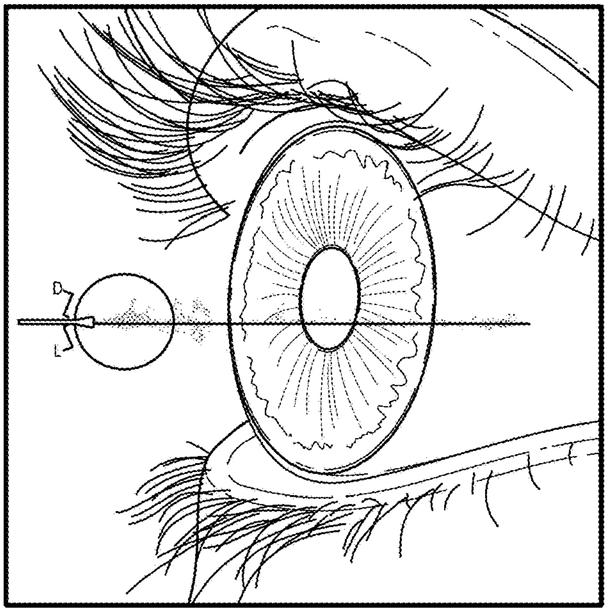
Figure 21E:

FIG. 21D shows an illustration 2106 of real-time data readout, representing eye movement patterns, which may include, for example, response times to visual stimuli. FIG. 21E shows an illustration 2108 of driving through a crowded area with moving pedestrians, which may be another visual scenario. The left and right panels in the illustration show moving objects, such as pedestrians. Some embodiments can include AI-driven adjustments to the test difficulty.

Figure 21F:
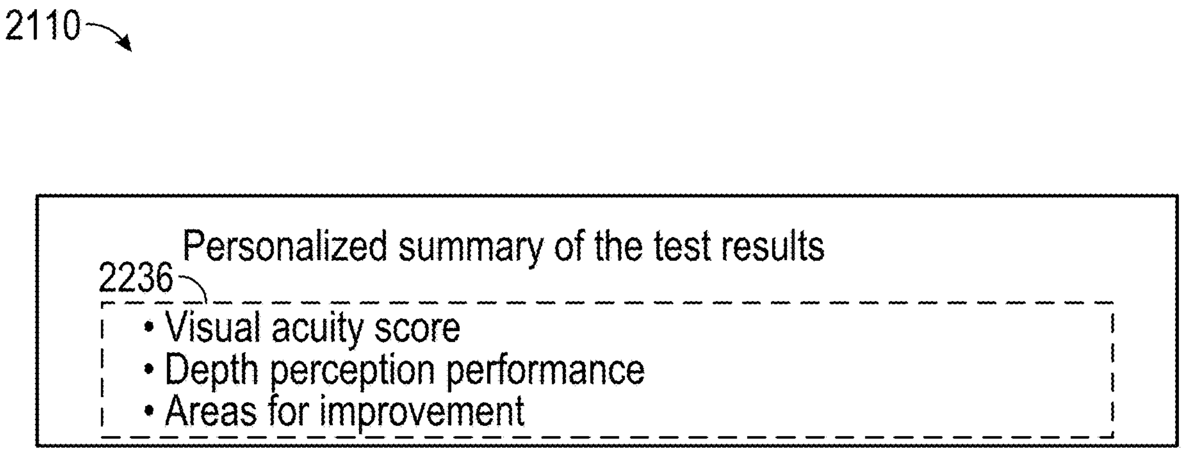
FIG. 21F shows an example personalized summary of test results, according to some embodiments.

FIG. 21F shows an example personalized summary 2110 of test results, which may include, for example, (e.g., in step 2112) visual acuity score, depth perception performance, and/or areas for improvement.

Example Dynamic Real-World Virtual Eye Test

Figure 22A:
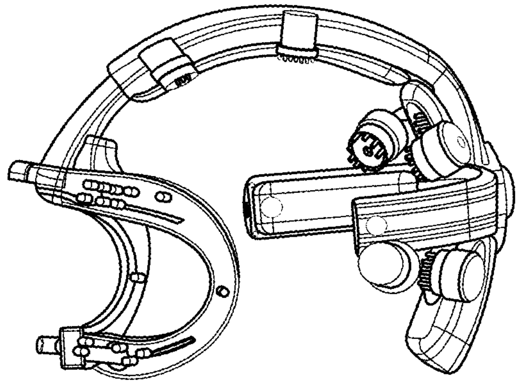
FIGS. 22A-22C show illustrations of VR headset with eye-tracking cameras and additional biometric sensors, in accordance with some embodiments.
Figure 22B:
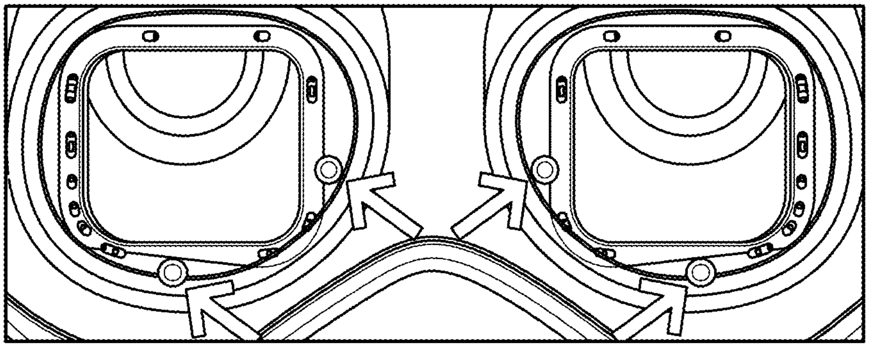
Figure 22C:
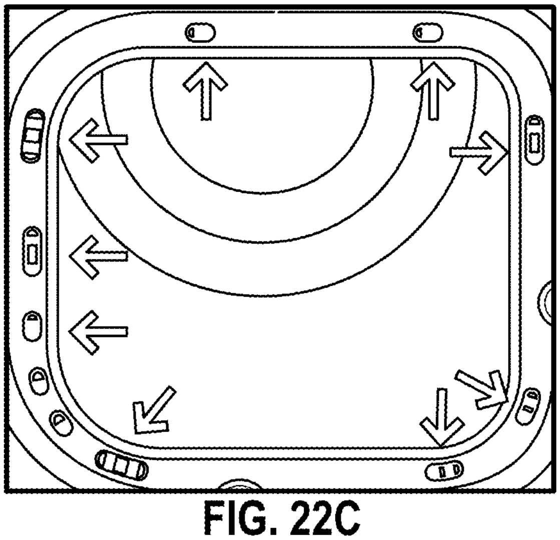

FIGS. 22A-22C show illustrations of VR headset with eye-tracking cameras and additional biometric sensors, in accordance with some embodiments. FIG. 22A is an illustration 2200 of an example skeleton of a VR headset. FIG. 22B shows an illustration 2202 of a view of the inside of the VR headset. Arrows show eye tracking sensors. FIG. 22C shows another illustration 2204 of a view of the inside of the VR headset. Arrows show biometric sensors (e.g., sensors for heart rate, skin conductance).

Figure 22D:
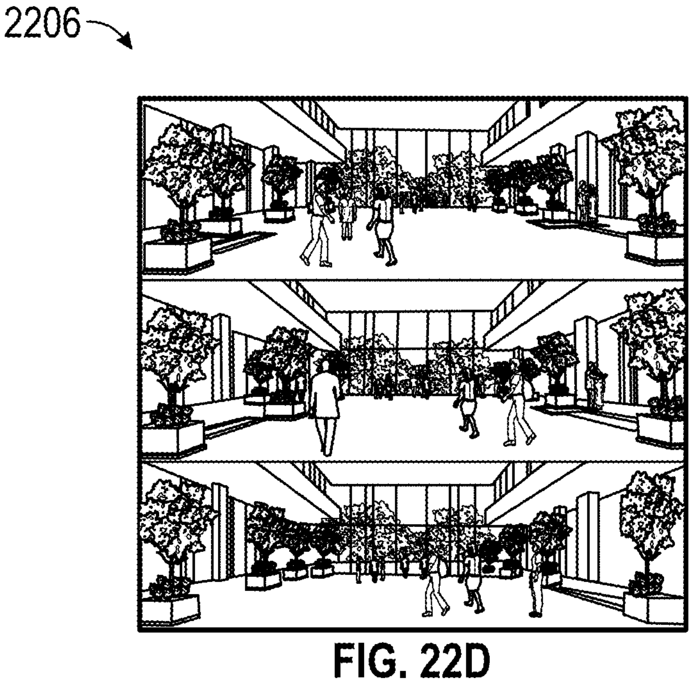
FIGS. 22D-22E show illustrations of example visual scenarios for dynamic real-world virtual eye testing, according to some embodiments.
Figure 22E:
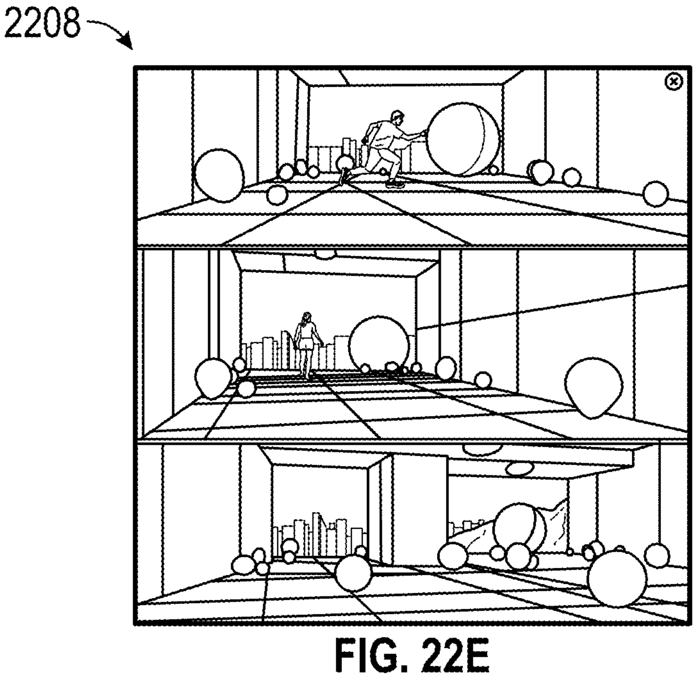

FIGS. 22D-22E show illustrations of example visual scenarios for dynamic real-world virtual eye testing, according to some embodiments. FIG. 22D shows an illustration 2206 of progression of a scenario where a user is interacting with moving persons. FIG. 22E shows an illustration 2208 of a progression of a scenario where a user is interacting with moving objects.

Figure 22F:
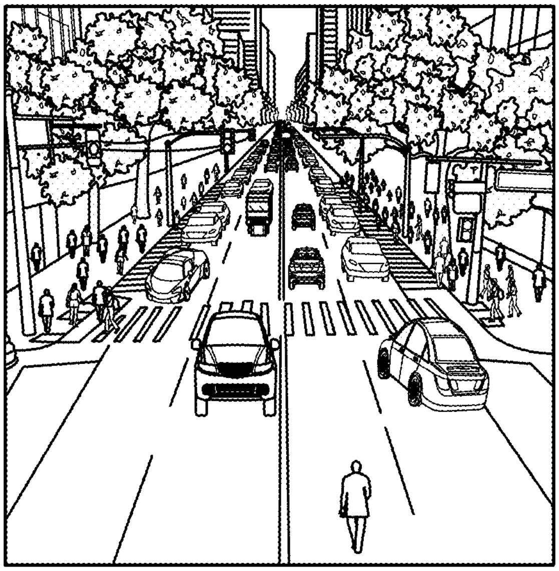
FIG. 22F is an illustration of an example scenario, according to some embodiments.

FIG. 22F is an illustration 2210 of a scenario for a bustling city intersection with moving vehicles, pedestrians, and changing traffic lights. Objects may be shown at varying distances to test depth perception. Moving objects may be shown at different speeds to test motion detection. Complex spatial layouts may be shown to test spatial awareness. Environment may change based on user movement.

Figure 22G:
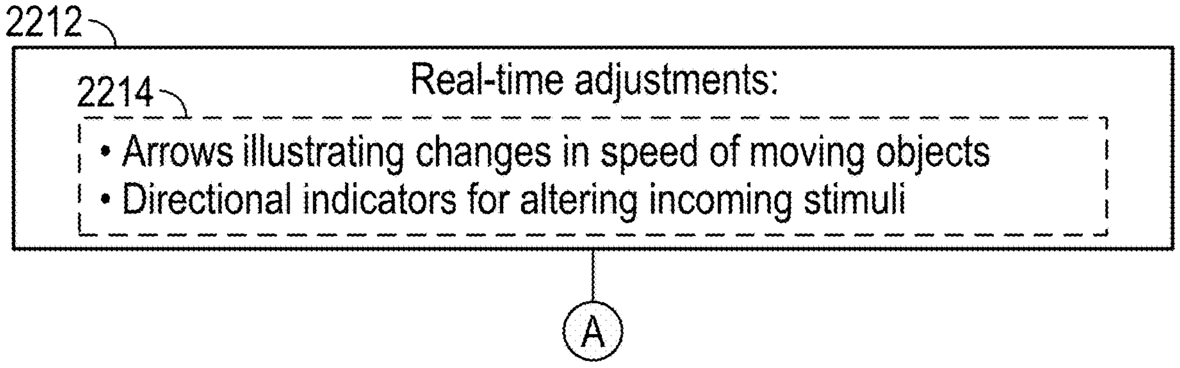
FIG. 22G is a block diagram for example real-time adjustments, according to some embodiments.

FIG. 22G is a block diagram for example real-time adjustments 2212, which may be shown in an UI 2214 using arrows showing changes in speed of moving objects, and/or directional indicators for altering incoming stimuli.

Figure 22H:
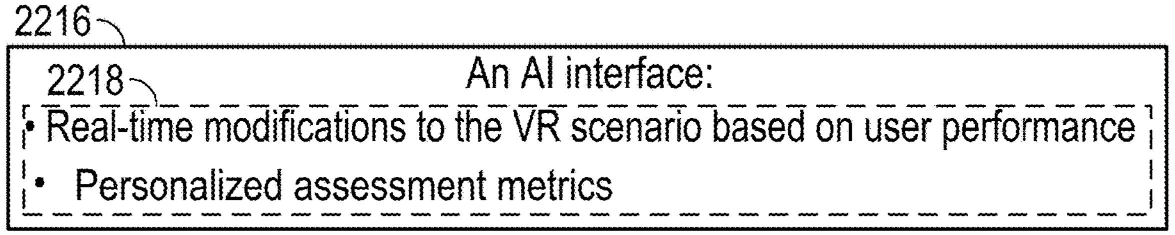
FIG. 22H is a block diagram of an example AI interface, according to some embodiments.

FIG. 22H is a block diagram of an example AI interface 2216, which may include, for example, real-time modifications to a VR scenario based on user performance, and/or personalized assessment metrics.

Figure 22I:
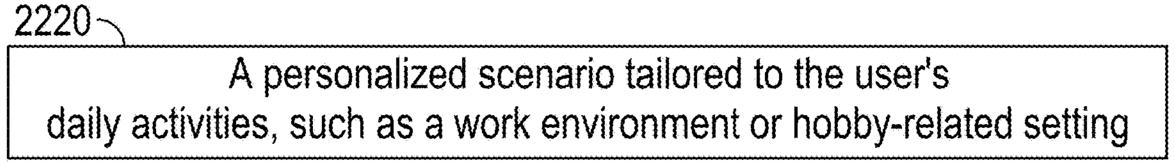
FIG. 22I is a block diagram of an example personalized scenario, according to some embodiments.

FIG. 22I is a block diagram of an example personalized scenario 2220 tailored to a user's daily activities, such as a work environment or hobby-related setting.

Example Dynamic Visual Acuity Test in VR

Figure 23A:
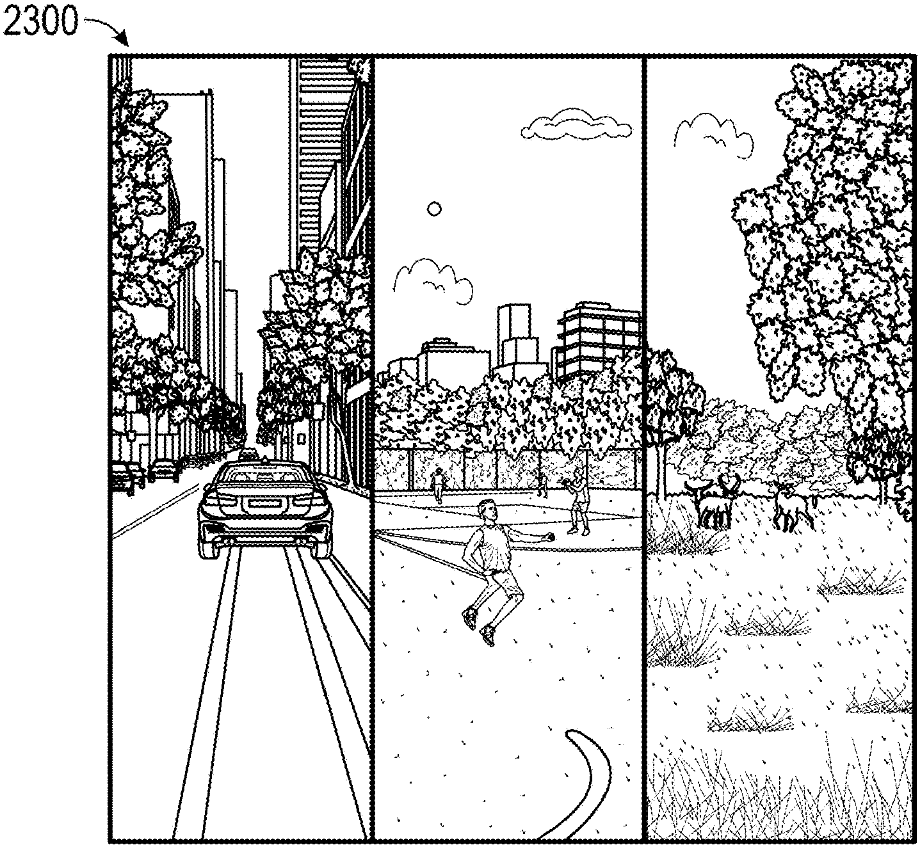
FIGS. 23A and 23B show illustrations of example visual scenarios, for dynamic visual acuity testing in VR, according to some embodiments.
Figure 23B:
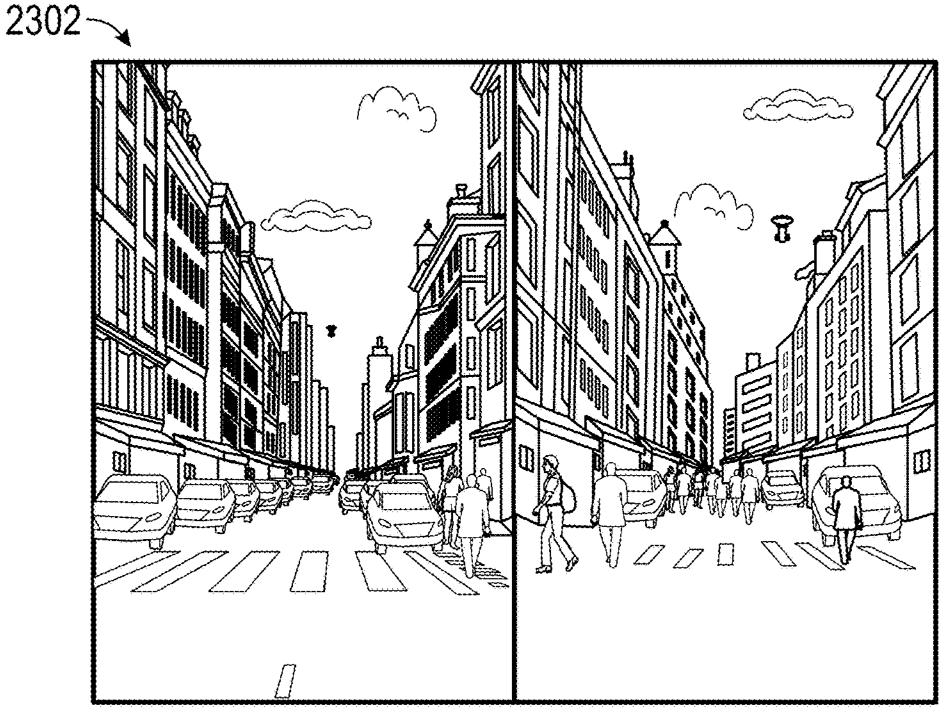

FIGS. 23A and 23B show illustrations of example visual scenarios, for dynamic visual acuity testing in VR, according to some embodiments. FIG. 23A is an illustration 2300 that shows three panels. The left panel shows a city street with moving vehicles and pedestrians. The center panel shows a ports field with players in motion and a ball in flight. The right panel shows a natural landscape with animals moving through vegetation.

Some embodiments show, for example overlaid on each section or panel, targets of varying sizes and/or speeds that the user needs to identify and track. One or both eyes may be tracked and/or a readout of response times to various visual stimuli may be obtained. Biometric data feedback (e.g., heart rate, neural responses) may also be obtained from biometric sensors. Simple, slow-moving targets may be shown in some scenarios. More complex, faster-moving targets may be shown in other scenarios. Multiple targets with varying speeds and sizes may be shown in yet another scenario.

Figure 23C:
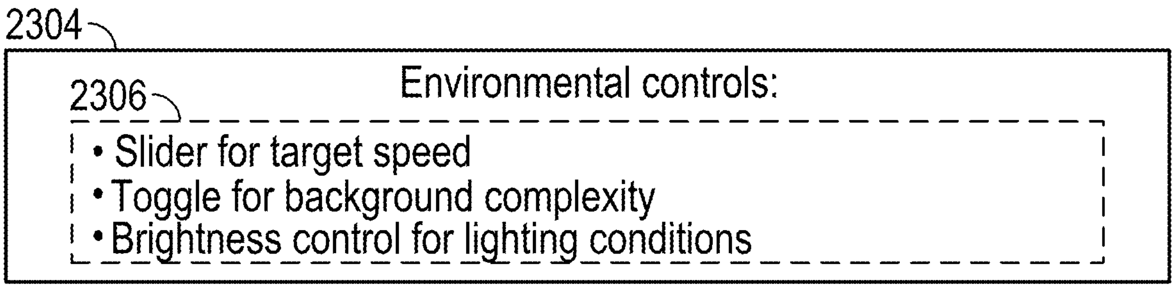
FIG. 23C is a block diagram of environment controls, according to some embodiments.

In some instances, a user's view may show a moving target under normal conditions. The same view may be shown with altered lighting and increased background complexity. Examples of these scenarios are shown in the panels in the illustration 2302 in FIG. 23B. FIG. 23C is a block diagram of environment controls 2304, examples of which may include a slider for target speed, toggle for background complexity, ands brightness control for lighting conditions 2306.

Figure 23D:
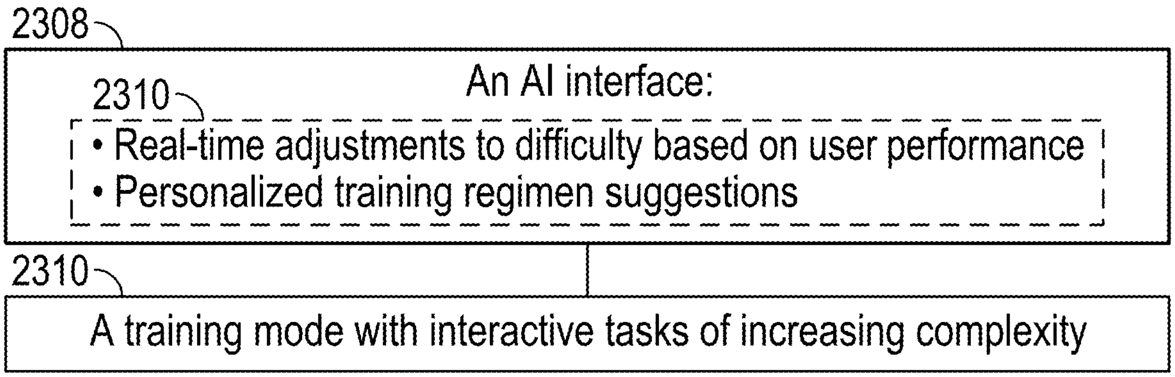
FIG. 23D is a block diagram of an AI interface, according to some embodiments.

FIG. 23D is a block diagram of an AI interface 2308, according to some embodiments. The AI interface may include, for example, real-time adjustments to difficulty based on user performance, and/or personalized training regimen suggestions 2310. Some embodiments can include a training mode 2310 with interactive tasks of increasing complexity.

Example VR Astigmatism Assessment

Figure 24A:
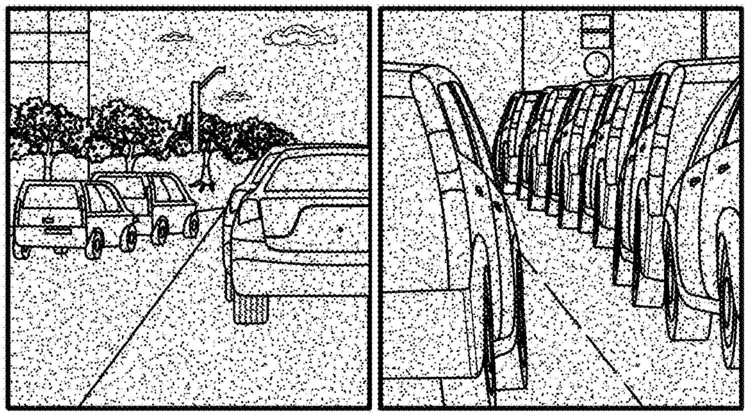
FIGS. 24A-24C show illustrations of example visual scenarios for VR astigmatism assessment, according to some embodiments.
Figure 24B:
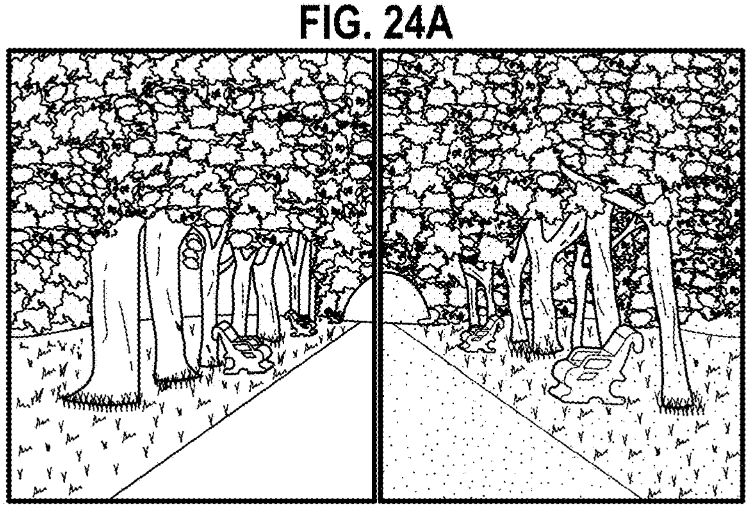
Figure 24C:
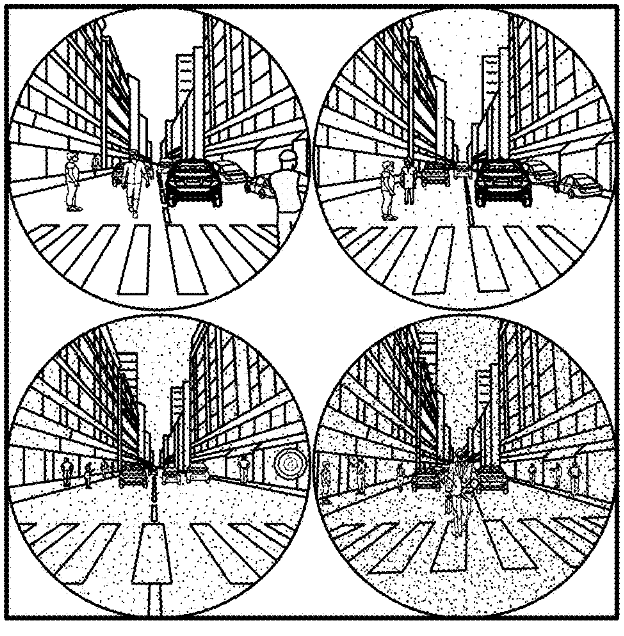

FIGS. 24A-24C show illustrations of example visual scenarios for VR astigmatism assessment, according to some embodiments. FIG. 24A is an illustration 2400 with two panels. The panel on the left shows a scene as may be viewed by someone with normal vision, and the panel on the right shows the same scene as may be viewed by someone with astigmatism.

FIG. 24B is an illustration 2402 of a visual scenario, the left panel shows how a natural scene may appear to someone with normal vision, and the panel on the right shows how the same scenario may appear to someone with astigmatism. Different progressive visual scenarios may be shown, for example, scenarios that may require simple focus adjustment task, more complex scenario with multiple focus points, and/or an advanced test with moving objects and varying depths.

FIG. 24C is an illustration 2404 of four different visual scenarios (shown in the respective panels). The top left view or panel shows a scene requiring rapid focus shifts between near and far objects, the top right view shows moving objects at various depths requiring focus tracking, the bottom left shows 3D shapes and contours for testing depth and curvature perception, and the bottom right shows a real-world-like scenario with targets at multiple distances and angles.

Figure 24D:
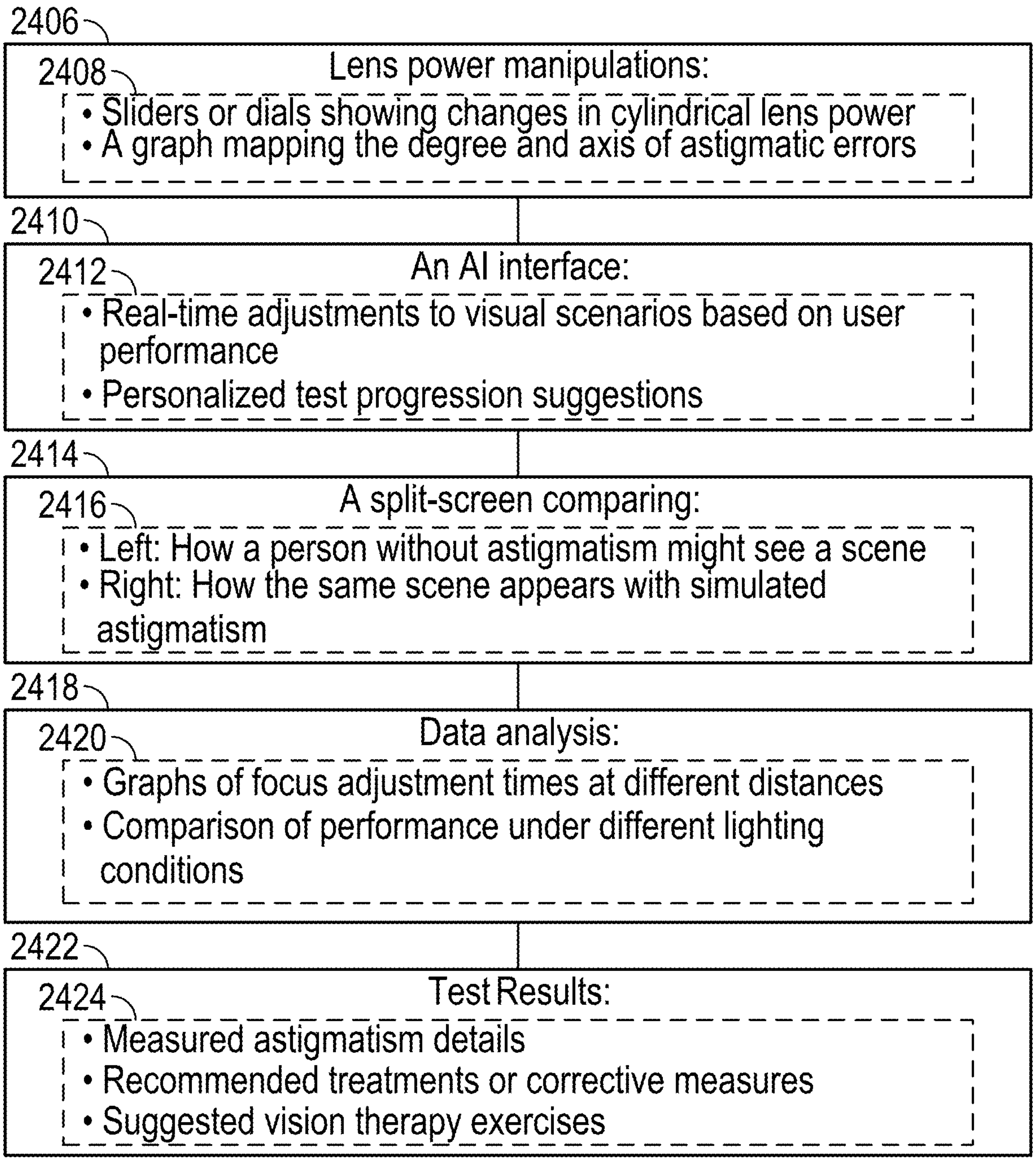
FIG. 24D is a block diagram of example components for VR astigmatism assessment, according to some embodiments.

FIG. 24D is a block diagram of example components for VR astigmatism assessment, according to some embodiments. Some embodiments can include lens power manipulations 2406, which may include, for example, sliders or dials showing changes in cylindrical lens power, and/or a graph mapping the degree and axis of astigmatic errors 2408. Some embodiments can include an AI interface 2410, which may include, for example, real-time adjustments to visual scenarios based on user performance, and/or personalized test progression suggestions 2412.

Some embodiments show a split screen 2414 for comparison. The split screens may show how a person without astigmatism might see a scene and how the same scene appears with simulated astigmatism. Some embodiments show results of data analysis 2418, which may include, for example, graphs of focus adjustment times at different distances, and/or comparison of performance under different lighting conditions 2420. Some embodiments show a results panel 2422 for test results. The test results may include measured astigmatism details, recommended treatments or corrective measures, and/or suggested vision therapy exercises.

Example VR Astigmatism Distortion Assessment and Correction

Figure 25A:
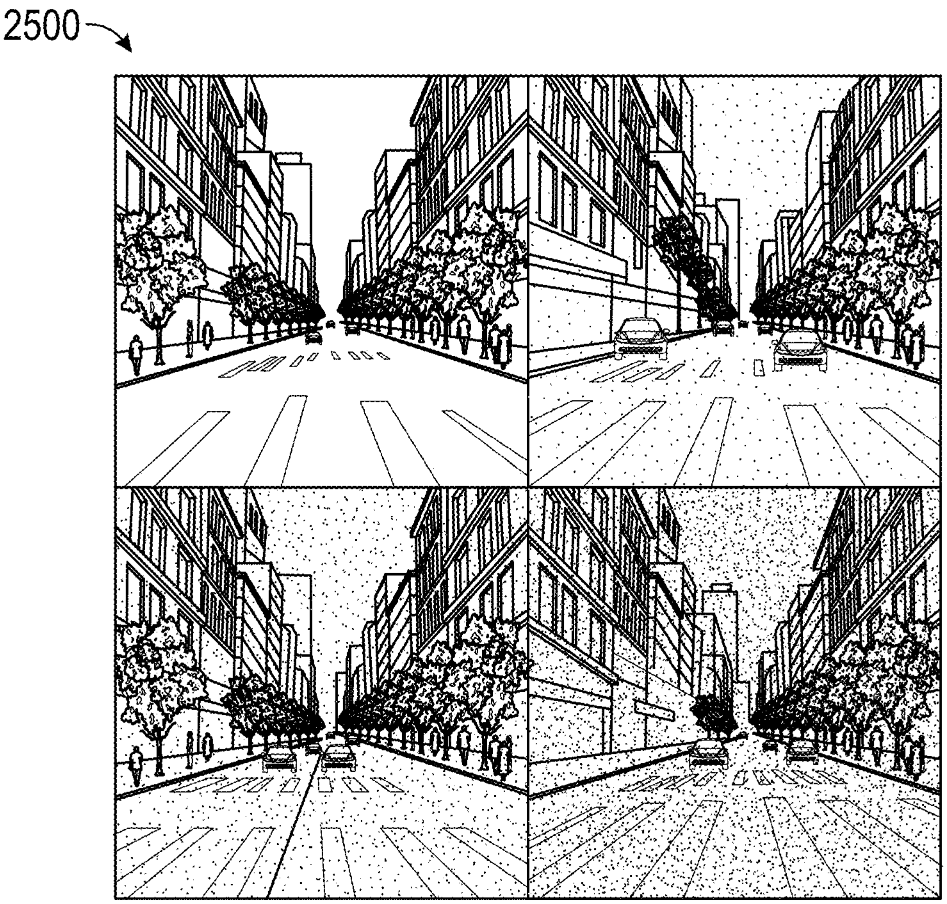
FIG. 25A shows an illustration of example visual scenarios for VR astigmatism distortion assessment and correction, according to some embodiments.

FIG. 25A shows an illustration of example visual scenarios 2500 for VR astigmatism distortion assessment and correction, according to some embodiments. FIG. 25A shows four panels. The top left panel includes text at various distances and size. Top right shows moving objects with ghosting effects. Bottom left shows lines with varying degrees of blur. Bottom right shows a complex scene with irregular focus areas. A test may progress as follows. An initial view may be shown with visible distortions. Adaptive optics may be applied for corrections. This may result in an improved view after corrections.

Figure 25B:
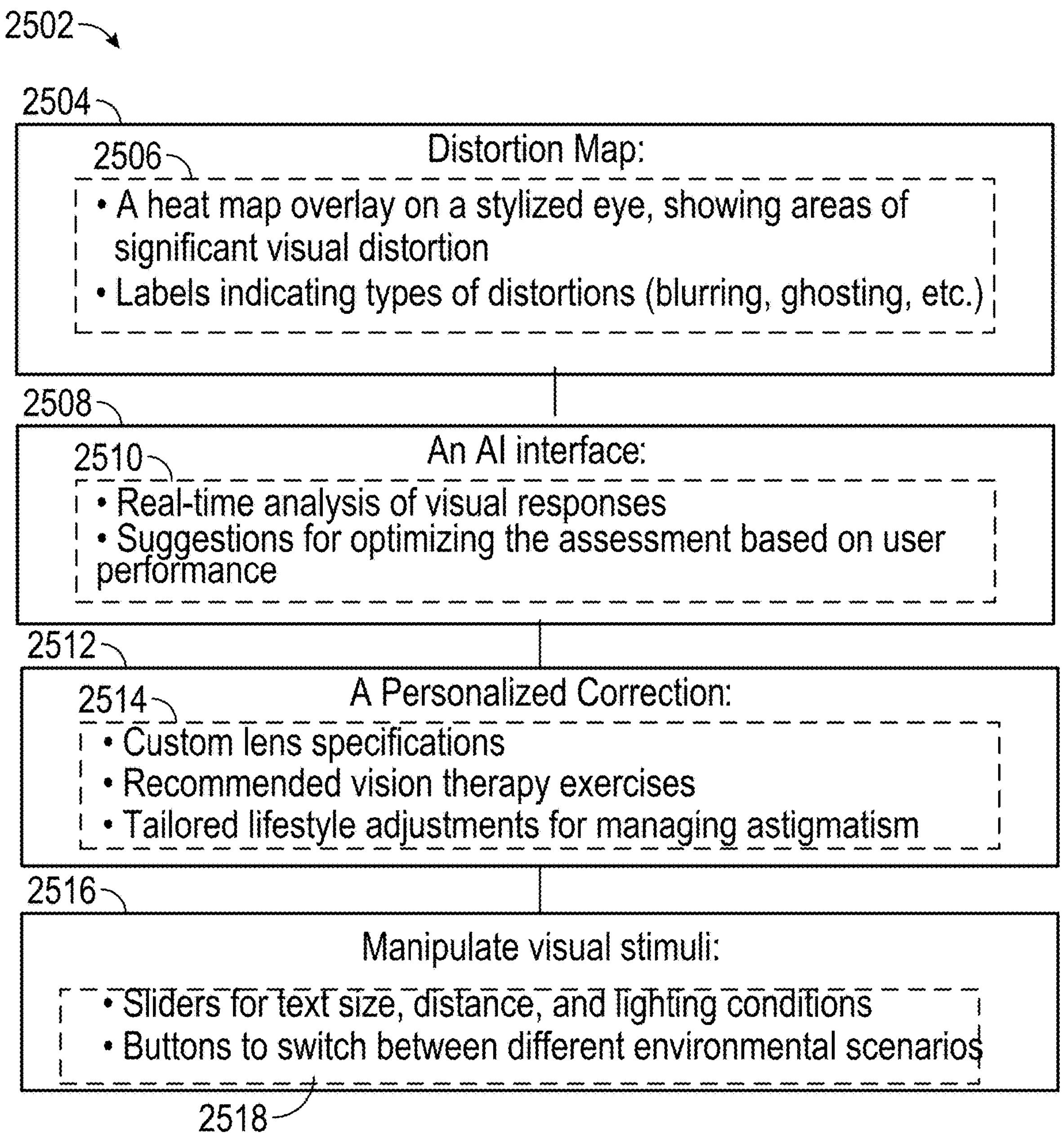
FIG. 25B is a block diagram of example components for VR astigmatism distortion assessment and correction, according to some embodiments.

FIG. 25B is a block diagram of example components 2502 for VR astigmatism distortion assessment and correction, according to some embodiments. Some embodiments show a distortion map panel 2504, which may include, for example, a heat map overlay on a stylized eye, showing areas of significant visual distortion, and/or labels indicating types of distortions (blurring, ghosting, etc.) 2506. Some embodiments can include an AI interface 2508, which may include, for example, real-time analysis of visual responses, and/or suggestions for optimizing the assessment based on user performance 2510.

Some embodiments can include personalized correction 2512, which may include, for example, custom lens specifications, recommended vision therapy exercises, and/or tailored lifestyle adjustments for managing astigmatism 2514. Some embodiments can include an interactive element representing the ability to manipulate visual stimuli 2516, which may include, for example, sliders for text size, distance, and lighting conditions, and/or buttons to switch between different environmental scenarios 2518.

Example VR Night Blindness Assessment

Figure 26A:
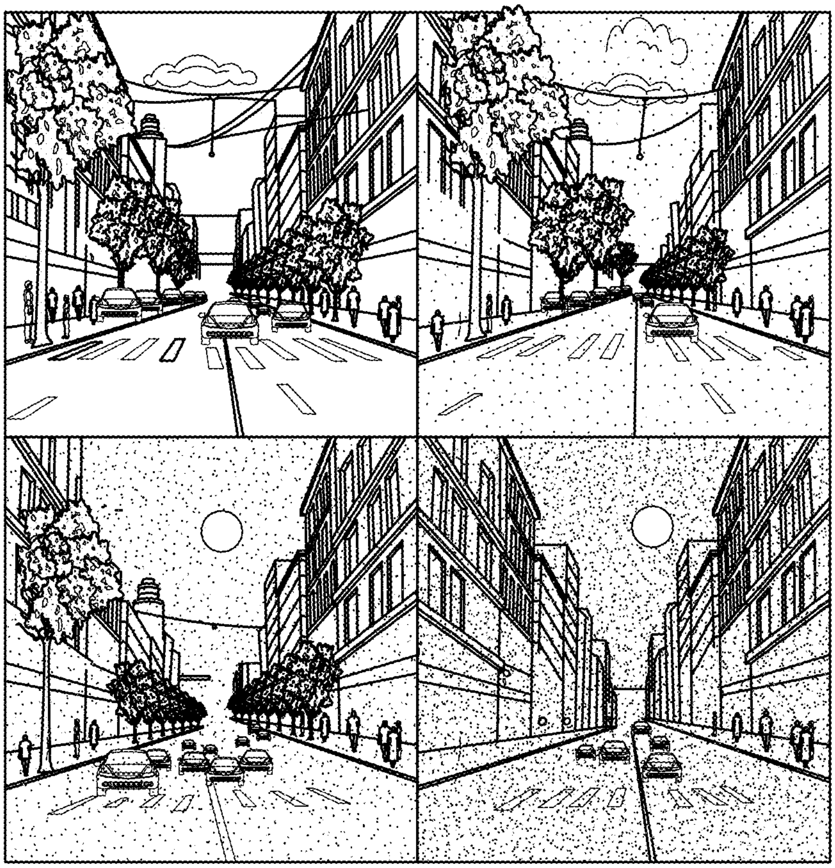
FIG. 26A shows an illustration of example visual scenarios for VR night blindness assessment, according to some embodiments.

FIG. 26A shows an illustration of example visual scenarios 2600 for VR night blindness assessment, according to some embodiments. FIG. 26A shows four panels. The top left panel includes well-lit daytime scene (baseline, the top right panel shows a twilight scene, the bottom left panel shows a moonlit scene, and the bottom right shows near-completeness darkness. Visual stimuli, such as objects, may be shown, for example, to identify or navigate around. Different panels, views and/or scenarios may correspond to baseline visual acuity test in well-lit conditions, dark adaptation period night vision simulation test, visual acuity testing in low light, dynamic testing with moving objects, and/or night vision tasks (e.g., navigating a dimly lit maze).

FIG. 26B is a block diagram of example components 2602 for VR night blindness assessment, according to some embodiments. Some embodiments can include an interactive element 2604 representing real-time manipulation of light levels, which may include, for example, a slider or dial controlling ambient light in the virtual environment, and/or buttons to switch between different visual challenges 2606.

Some embodiments can include a performance graph 2608, which may include, for example, an X-axis showing decreasing light levels, a Y-axis showing visual performance metrics, and/or a line graph demonstrating the drop in visual performance as light decreases 2610.

Some embodiments can include an AI interface panel 2612, which may include, for example, real-time analysis of user performance, and/or suggestions for adapting the test difficulty based on individual results 2614.

Some embodiments can include biometric feedback 2616, which may include, for example, real-time displays of pupil dilation, eye movement patterns, and/or retinal response data 2618.

Some embodiments can include a results summary 2620, which may include, for example, overall night blindness assessment, breakdown of performance in different lighting conditions, and/or recommendations for further testing or treatment 2622.

Illustration of Subject Technology as Clauses

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A method of implementing a virtual eye test for evaluating visual acuity and perception, comprising: at an electronic device including a head-mounted display (HMD) and a camera: generating a virtual reality (VR) user interface corresponding to a photorealistic virtual environment; rendering the VR user interface on the HMD; simulating one or more real-world scenarios in the VR user interface; and while simulating the one or more real-world scenarios, in real time: continuously tracking, using the camera, eye movements and response times to visual stimuli presented in the one or more real-world scenarios; and evaluating user response based on the eye movements and the response times for testing visual acuity and perception.

Clause 2. The method of Clause 1, wherein the photorealistic virtual environment prioritizes precision, control, repeatability and/or data collection over immersion, interaction, variety and/or user experience to assess visual functions accurately.

Clause 3. The method of Clause 1 or 2, wherein continuously tracking eye movements comprises: tracking rapid movements of the eye between fixation points at rates of at least 100-500 Hz; tracking eye movements where eyes are relatively stationary and focused on a single point at rates of 50-100 Hz; and tracking eye movements where the eyes smoothly follow a moving object at rates of 100-200 Hz.

Clause 4. The method of any of Clauses 1-3, wherein continuously tracking response times comprises tracking a time a user takes to respond to the visual stimulus at a sampling rate of at least 1000 Hz.

Clause 5. The method of any of Clauses 1-4, further comprises collecting data for clinical analysis, including metrics comprising saccadic latency, fixation stability, and smooth pursuit accuracy.

Clause 6. The method of any of Clauses 1-5, further comprising performing perception test to track eye movements and response times, in addition to tracking using the camera.

Clause 7. The method of any of Clauses 1-6, further comprising simultaneously evaluating the user response for depth perception, motion detection, and light adaptation.

Clause 8. The method of any of Clauses 1-7, further comprising: while simulating the one or more real-world scenarios: using stereoscopic 3D to create realistic depth, for testing depth perception; performing dynamic rendering of moving objects and environments, for testing motion detection; and simulating different lighting scenarios from bright sunlight to dim streetlights, for testing varying light conditions.

Clause 9. The method of any of Clauses 1-8, further comprising providing precision and consistency of visual stimuli.

Clause 10. The method of any of Clauses 1-9, further comprising tracking of physiological responses.

Clause 11. The method of any of Clauses 1-10, further comprising obtaining detailed data collection for medical analysis.

Clause 12. The method of any of Clauses 1-11, wherein the photorealistic virtual environment corresponds to an environment selected from the group consisting of: urban streets, natural landscapes, indoor settings, and crowded public spaces.

Clause 13. The method of any of Clauses 1-12, wherein the photorealistic virtual environment corresponds to an environment with varied lighting conditions or scenarios with a level of detail and movement similar to busy intersections or forest trails.

Clause 14. The method of any of Clauses 1-13, wherein simulating the one or more real-world scenarios comprises simulating one or more daily activities selected from the group consisting of: walking through a park, driving, or navigating through a busy city street, where the user must respond to visual stimuli corresponding to moving vehicles, pedestrians, and/or changing light conditions.

Clause 15. The method of any of Clauses 1-14, wherein simulating the one or more real-world scenarios comprises real-time rendering of dynamic weather changes, day-night cycles, and/or varying traffic conditions, to test visual acuity in different contexts.

Clause 16. The method of any of Clauses 1-15, wherein simulating the one or more real-world scenarios comprises using stereoscopic three-dimensional (3D) and head tracking to create a realistic depth perception.

Clause 17. The method of any of Clauses 1-16, wherein simulating the one or more real-world scenarios comprises simulating driving at night, reading signs in varying light conditions, identifying objects in peripheral vision while walking, or responding to moving objects in a busy environment.

Clause 18. The method of any of Clauses 1-17, further comprising performing real-time adjustments to speed of moving objects and/or light levels based on the user response.

Clause 19. The method of any of Clauses 1-18, further comprising performing real-time adaptation of the visual stimuli based on the user response.

Clause 20. The method of any of Clauses 1-19, wherein the VR user interface allows a user to navigate through virtual environments using natural head and eye movements, mimicking real-world interactions and responses.

Clause 21. The method of any of Clauses 1-21, wherein testing visual acuity and perception comprises detecting a visual impairment for adapting to a sudden change in light conditions or tracking moving objects.

Clause 22. The method of any of Clauses 1-21, wherein simulating the one or more real-world scenarios comprises simulating entering a tunnel while driving.

Clause 23. The method of any of Clauses 1-22, further comprising: while simulating the one or more real-world scenarios, dynamically adjusting the photorealistic environment based on real-time monitoring of eye movements, pupil dilation, and neural responses, to adapt visual scenarios, such as changing object speed or light intensity.

Clause 24. The method of any of Clauses 1-23, further comprising: while simulating the one or more real-world scenarios, personalizing one or more testing sequences for a user by customizing the one or more real-world scenarios based on the user's daily activities, workplace, common travel route, preferences, and/or specific visual challenges.

Clause 25. The method of any of Clauses 1-24, further comprising: while simulating the one or more real-world scenarios, personalizing one or more testing sequences for a user by customizing the one or more real-world scenarios based on the user's demography or the user's prior vision performance.

Clause 26. The method of any of Clauses 1-25, further comprising: while simulating the one or more real-world scenarios, personalizing one or more testing sequences for a user by customizing the one or more real-world scenarios based on the user's prior vision performance.

Clause 27. A method of implementing a virtual eye test for evaluating visual acuity, comprising: at an electronic device including a head-mounted display and a camera: generating a virtual reality (VR) user interface corresponding to a three-dimensional virtual environment; rendering the VR user interface on the HMD; generating and displaying a testing sequence in the VR user interface, wherein the testing sequence including progressively finer details and varying depths in the three-dimensional virtual environment; tracking, using the camera, eye movements and response times to visual stimuli presented in the testing sequence; and evaluating user response based on the eye movements and the response times for testing visual acuity.

Clause 28. The method of Clause 27, wherein the testing sequence comprises gradual reduction of object size and increased complexity of visual tasks as the test progresses, thereby requiring increased focus and clarity as the test progresses.

Clause 29. The method of Clause 27 or 28, wherein the testing sequence comprises depth testing by having objects appear at different distances and requiring identification or interaction.

Clause 30. The method of any of Clauses 27-29, wherein the testing sequence comprises testing scenarios selected from the group consisting of: driving through varying weather conditions, reading signs at different distances, and navigating through crowded areas.

Clause 31. The method of any of Clauses 27-30, wherein the testing sequence comprises one or more tests for testing nuances of depth perception, spatial awareness, and varying visual stimuli, for vision testing.

Clause 32. The method of any of Clauses 27-31, wherein the one or more tests comprises at least one scenario with realistic depth cues, varying object distances, or diverse visual elements, for vision testing.

Clause 33. The method of any of Clauses 27-32, wherein the at least one scenario comprises moving pedestrians or fluctuating light levels, to mimic everyday challenges.

Clause 34. The method of any of Clauses 27-33, wherein the progressively finer details correspond to increasing granularity of vision performance testing.

Clause 35. The method of any of Clauses 27-34, wherein the three-dimensional virtual environment comprises a simulated environment that replicates real-world depth, movement, and spatial relationships, allowing for detailed interaction and testing of visual acuity.

Clause 36. The method of any of Clauses 27-35, further comprising optimizing the testing sequence for individual needs using one or more AI algorithms that adapt the three-dimensional virtual environment in real-time based on user responses and physiological data.

Clause 37. The method of any of Clauses 27-36, further comprising generating a personalized and dynamic testing environment by adjusting visual stimuli including object speed and lighting, based on eye movement and pupil response, using real-time AI adaptation.

Clause 38. The method of any of Clauses 27-37, further comprising performing personalized adaptive testing by customizing one or more scenarios of the testing sequence and/or the three-dimensional virtual environment, to match a user's visual profile, ensuring that each test is relevant to their specific vision challenges and daily experiences.

Clause 39. The method of any of Clauses 27-38, further comprising dynamically adjusting the granularity of progressively finer details in the testing sequence based on real-time analysis of the user's performance.

Clause 40. The method of any of Clauses 27-39, wherein the testing sequence includes tasks requiring rapid shifts in focus between objects at different depths in the three-dimensional virtual environment, and wherein tracking eye movements includes monitoring the speed and accuracy of focus adjustments.

Clause 41. The method of any of Clauses 27-40, further comprising quantifying stereopsis and depth perception abilities by measuring the user's accuracy in identifying relative positions of objects at varying depths in the three-dimensional virtual environment.

Clause 42. The method of any of Clauses 27-41, wherein the testing sequence includes presenting visual stimuli at varying angles from the user's central focus point, and wherein tracking eye movements includes monitoring the user's ability to detect and respond to peripheral stimuli.

Clause 43. The method of any of Clauses 27-42, wherein the testing sequence includes assessing the user's ability to distinguish between different levels of contrast in various simulated lighting conditions within the three-dimensional virtual environment.

Clause 44. The method of any of Clauses 27-43, wherein the testing sequence includes scenarios requiring simultaneous performance of multiple visual tasks, including tracking moving objects and reading text at varying depths and detail levels in the three-dimensional virtual environment.

Clause 45. A method of implementing a virtual eye test for evaluating visual acuity, comprising: at an electronic device including a head-mounted display and a camera: generating a virtual reality (VR) user interface corresponding to a three-dimensional virtual environment; rendering the VR user interface on the HMD; simulating a dynamic real-world visual experience in the VR user interface; tracking, using the camera, eye movements and response times to visual stimuli presented in the dynamic real-world visual experience; and evaluating depth perception, motion detection, and spatial awareness based on the eye movements and the response times.

Clause 46. The method of Clause 45, wherein simulating the dynamic real-world visual experience comprises simulating one or more scenarios where a user physically moves through virtual spaces, encountering changing perspectives and/or environments.

Clause 47. The method of any of Clauses 45 or 46, wherein simulating the dynamic real-world visual experience comprises simulating one or more scenarios that allow a user to navigate virtual environments, interact with moving objects, and adjust to changing viewpoints.

Clause 48. The method of any of Clauses 45-47, wherein simulating the dynamic real-world visual experience comprises dynamic adjustment of visual stimuli comprising performing real-time changes in visual elements based on user movements.

Clause 49. The method of Clause 48, wherein performing real-time changes comprises altering a speed of one or more moving objects.

Clause 50. The method of Clause 49, wherein performing real-time changes comprises altering a direction of an incoming stimuli.

Clause 51. The method of any of Clauses 45-50, wherein evaluating depth perception, motion detection, and spatial awareness comprises (i) assessing how a user perceives and responds to objects at varying distances and speeds, and (ii) assessing the user's ability to navigate through complex environments.

Clause 52. The method of any of Clauses 45-51, wherein detection of motion sensitivity issues comprises identifying difficulties in tracking moving objects or adjusting to rapid changes in the visual scene.

Clause 53. The method of any of Clauses 45-52, further comprising using one or more biometric sensors to monitor physiological responses to gather data on visual performance under dynamic conditions.

Clause 54. The method of any of Clauses 45-53, further comprising using an AI-driven adaptive testing environment that uses AI to modify one or more VR scenarios in real-time based on a user's performance and physiological feedback, for a personalized assessment.

Clause 55. The method of any of Clauses 45-54, further comprising tailoring the dynamic real-world visual experience to a user's specific vision needs and daily activities providing relevant and practical assessment results for the user.

Clause 56. The method of any of Clauses 45-55, further comprising simulating variable lighting conditions within the dynamic real-world visual experience, wherein the variable lighting conditions include transitions between day and night, indoor and outdoor environments, and sudden changes in illumination.

Clause 57. The method of any of Clauses 45-56, wherein evaluating depth perception, motion detection, and spatial awareness comprises quantifying a user's ability to estimate distances and speeds of moving objects in the virtual environment.

Clause 58. The method of any of Clauses 45-57, wherein rendering the VR user interface on the HMD comprises gaze-contingent rendering that adjusts a level of detail in the virtual environment based on a user's point of focus, simulating natural visual acuity variations across a field of view.

Clause 59. The method of any of Clauses 45-58, further comprising simulating balance and vision conflicts by introducing virtual motion that differs from a user's actual physical movement, and evaluating the user's ability to maintain visual acuity during these conflicts.

Clause 60. The method of any of Clauses 45-59, wherein tracking eye movements includes monitoring saccades and smooth pursuit movements, and correlating these movements with a user's ability to maintain focus on moving objects in the virtual environment.

Clause 61. The method of any of Clauses 45-60, further comprising generating a three-dimensional map of a user's visual field, including areas of reduced acuity or blind spots, based on a user's performance in the dynamic real-world visual experience.

Clause 62. The method of any of Clauses 45-61, further comprising simulating scenarios that require a user to divide attention between central and peripheral visual tasks, and evaluating the impact on visual acuity and reaction times in each visual field region.

Clause 63. A method of implementing a virtual eye test for evaluating visual acuity, comprising: at an electronic device including a head-mounted display and a camera: generating a virtual reality (VR) user interface corresponding to a three-dimensional virtual environment; rendering the VR user interface on the HMD; simulating real-world motion and target recognition visual tasks in the VR user interface; tracking, using the camera, eye movements and response times to visual stimuli presented in the real-world motion and target recognition visual tasks; and measuring dynamic visual acuity based on the eye movements and the response times.

Clause 64. The method of Clause 63, wherein the real-world motion and target recognition visual tasks comprise activities that require identifying and tracking moving objects.

Clause 65. The method of Clause 64, wherein the activities are selected from the group consisting of: driving, sports, and navigating through crowded places.

Clause 66. The method of any of Clauses 63-65, wherein measuring dynamic visual acuity comprises assessing the user's ability to maintain focus and accurately identify targets in motion, under different lighting and background conditions.

Clause 67. The method of any of Clauses 63-66, further comprising controlling and customizing the virtual environment based on manipulation of target speed, background complexity, and lighting.

Clause 68. The method of any of Clauses 63-67, wherein the three-dimensional virtual environment comprises varying environments selected from the group consisting of: city streets, sports fields, and natural landscapes, wherein the varying environments include diverse visual elements and movement.

Clause 69. The method of any of Clauses 63-68, wherein simulating real-world motion and target recognition visual tasks comprises simulating one or more scenarios that require identification and tracking of progressively finer details and varying speeds of moving targets.

Clause 70. The method of any of Clauses 63-69, further comprising providing exercises for improving visual acuity comprising repeated exposure to adaptive difficulty levels in VR scenarios to enhance visual tracking and recognition skills.

Clause 71. The method of any of Clauses 63-70, further comprising providing exercises for improving visual acuity comprising interactive tasks that progressively increase in complexity and speed.

Clause 72. The method of any of Clauses 63-71, further comprising using one or more biometric feedback systems for real-time adjustments to difficulty of challenges based on eye tracking and neural response measurements, thereby ensuring optimal engagement and training.

Clause 73. The method of any of Clauses 63-72, further comprising using machine learning for personalization, including using one or more algorithms that analyze user performance and physiological data to customize training regimen and optimize visual acuity improvement over time.

Clause 74. The method of any of Clauses 63-73, further comprising simulating depth perception challenges by presenting moving targets at various distances and requiring a user to judge their relative positions accurately.

Clause 75. The method of any of Clauses 63-74, wherein measuring dynamic visual acuity includes assessing a user's ability to maintain visual focus during simulated head movements in the three-dimensional virtual environment.

Clause 76. The method of any of Clauses 63-75, further comprising implementing a gaze-based interaction system where users select or interact with moving targets using eye movements alone, to assess and improve eye-tracking precision.

Clause 77. The method of any of Clauses 63-76, further comprising presenting secondary visual tasks in a peripheral field of view while a user engages with primary moving targets, and measuring the impact on target recognition accuracy and response times.

Clause 78. The method of any of Clauses 63-77, wherein simulating real-world motion includes creating scenarios with multiple moving targets that intersect or overlap, requiring a user to maintain tracking of specific objects.

Clause 79. The method of any of Clauses 63-78, further comprising gradually reducing the contrast between moving targets and their backgrounds to assess and improve contrast sensitivity in dynamic situations.

Clause 80. The method of any of Clauses 63-79, further comprising providing performance feedback after each task, including visual replays of eye movements and target trajectories.

Clause 81. A method of implementing a virtual eye test for assessing astigmatism, comprising: at an electronic device including a head-mounted display and a camera: generating a virtual reality (VR) user interface corresponding to a three-dimensional virtual environment; rendering the VR user interface on the HMD; simulating, in the VR user interface, a plurality of visual scenarios requiring focus adjustments; tracking, using the camera, dynamic focus adjustment to visual stimuli presented in the plurality of visual scenarios; and measuring astigmatism based on the dynamic focus adjustment.

Clause 82. The method of Clause 81, wherein the plurality of visual scenarios comprises scenarios that require rapidly shifting focus between distant and near objects.

Clause 83. The method of any of Clauses 81 or 82, wherein the plurality of visual scenarios comprises scenarios that require adjusting focus while tracking moving objects.

Clause 84. The method of any of Clauses 81-83, wherein the three-dimensional virtual environment requires users to continuously adjust their focus, simulating real-life visual tasks.

Clause 85. The method of any of Clauses 81-84, further comprising using biometric sensors to track eye movements, pupil responses, and/or neural activity, to adjust the plurality of visual scenarios in real-time.

Clause 86. The method of any of Clauses 81-85, further comprising using artificial intelligence to tailor the plurality of visual scenarios based on a user's visual profile, thereby adjusting the complexity and focus requirements dynamically.

Clause 87. The method of any of Clauses 81-86, further comprising generating one or more insights into visual environment interaction including data on how individuals with astigmatism interact with various visual elements, including how quickly they can refocus between objects at different distances or under different lighting conditions.

Clause 88. The method of any of Clauses 81-87, further comprising providing targeted treatments and corrective measures utilizing insights based on the measurement of astigmatism to recommend treatments and corrective measures, including customized corrective lenses or specific vision therapy exercises that address the unique challenges faced by each patient.

Clause 89. The method of any of Clauses 81-88, wherein the plurality of visual scenarios replicates real-world viewing conditions by presenting targets at multiple distances and angles.

Clause 90. The method of any of Clauses 81-89, wherein the plurality of visual scenarios test perception of depth, curvature and dimensionality using 3D shapes and contours.

Clause 91. The method of any of Clauses 81-90, wherein the three-dimensional virtual environment constricts a test subject from rotating their head or squinting to temporarily compensate for astigmatism.

Clause 92. The method of any of Clauses 81-91, wherein the plurality of visual scenarios dynamically introduce or manipulate cylindrical and other complex lens powers to precisely map the degree and axis of astigmatic errors.

Clause 93. The method of any of Clauses 81-92, further comprising displaying a split screen for comparison, showing how a scene appears with and without simulated astigmatism.

Clause 94. The method of any of Clauses 81-93, The method of claim 1, wherein measuring astigmatism includes analyzing focus adjustment times at different distances and comparing performance under different lighting conditions.

Clause 95. The method of any of Clauses 81-94, further comprising using foveated rendering to optimize the detail and resolution in the area where the user is directly focusing, encouraging active focus adjustments during the visual scenarios.

Clause 96. The method of any of Clauses 81-95, wherein the plurality of visual scenarios includes interactive scenarios requiring users to shift attention and focus between objects or elements at different virtual distances.

Clause 97. The method of any of Clauses 81-96, further comprising using variable focus displays to dynamically adjust the focal plane to match the virtual distance of objects being viewed, simulating natural accommodation.

Clause 98. The method of any of Clauses 81-97, wherein tracking dynamic focus adjustment includes analyzing gaze patterns, fixations, and saccades to determine the user's focus of attention and cognitive processing during the visual scenarios.

Clause 99. A method of implementing a virtual eye test for measuring and adjusting for visual distortions caused by astigmatism, comprising: at an electronic device including a head-mounted display and a camera: generating a virtual reality (VR) user interface corresponding to a three-dimensional virtual environment; rendering the VR user interface on the HMD; simulating, in the VR user interface, a plurality of visual scenarios; tracking, using the camera, user interactions and responses to visual stimuli presented in the plurality of visual scenarios; and measuring and adjusting for visual distortions based on the user interactions and responses.

Clause 100. The method of Clause 99, wherein the plurality of visual scenarios includes at least one scenario with blurring of lines, ghosting, or irregular focus.

Clause 101. The method of any of Clauses 99 or 100, wherein the three-dimensional virtual environment comprises one or more environments where users encounter various visual scenarios designed to reveal specific distortions caused by astigmatism.

Clause 102. The method of any of Clauses 99-101, wherein the plurality of visual scenarios comprises reading text at different distances or identifying objects in motion.

Clause 103. The method of any of Clauses 99-102, further comprising providing a description of a patient's condition comprising detailed maps of visual distortions, highlighting areas where the patient experiences the most significant difficulties.

Clause 104. The method of any of Clauses 99-103, wherein the three-dimensional virtual environment allows for manipulation of visual stimuli including adjusting text size, distance, and lighting conditions.

Clause 105. The method of any of Clauses 99-104, further comprising using adaptive optics for simulating corrective lenses in real-time, thereby allowing users to experience immediate adjustments to their visual distortions, to provide feedback on the effectiveness of different corrections.

Clause 106. The method of any of Clauses 99-105, further comprising using one or more machine learning algorithms to analyze visual responses, thereby continuously optimizing the plurality of visual scenarios for personalized assessment and correction.

Clause 107. The method of any of Clauses 99-106, further comprising providing personalized corrective measures comprising customizing vision correction strategies based on detailed assessments, ensuring that treatments and corrective lenses are tailored to an individual's specific visual needs.

Clause 108. The method of any of Clauses 99-107, wherein tracking user interactions and responses includes tracking eye movements at high frequencies ranging from 50 Hz to 1000 Hz.

Clause 109. The method of any of Clauses 99-108, wherein tracking user interactions and responses includes monitoring saccades at rates of at least 100-500 Hz.

Clause 110. The method of any of Clauses 99-109, wherein tracking user interactions and responses includes monitoring fixations at rates of 50-100 Hz.

Clause 111. The method of any of Clauses 99-110, wherein tracking user interactions and responses includes monitoring smooth pursuit eye movements at rates of 100-200 Hz.

Clause 112. The method of any of Clauses 99-111, further comprising displaying a split screen for comparison, showing how a scene appears with and without simulated astigmatism.

Clause 113. The method of any of Clauses 99-112, further comprising analyzing focus adjustment times at different distances and comparing performance under different lighting conditions.

Clause 114. The method of any of Clauses 99-113, wherein the plurality of visual scenarios includes scenarios requiring rapid focus shifts between near and far objects.

Clause 115. The method of any of Clauses 99-114, wherein the plurality of visual scenarios includes scenarios with moving objects at various depths requiring focus tracking.

Clause 116. The method of any of Clauses 99-115, wherein the plurality of visual scenarios includes scenarios with 3D shapes and contours for testing depth and curvature perception.

Clause 117. A method of implementing a virtual eye test for assessing night blindness, comprising: at an electronic device including a head-mounted display and a camera: generating a virtual reality (VR) user interface corresponding to a three-dimensional virtual environment; rendering the VR user interface on the HMD; simulating, in the VR user interface, a plurality of visual scenarios, each visual scenario corresponding to a different lighting condition; tracking, using the camera, user interactions and responses to visual stimuli presented in the plurality of visual scenarios; and measuring night blindness based on the user interactions and responses.

Clause 118. The method of Clause 117, wherein the plurality of visual scenarios corresponds to progressively decreasing light levels, simulating conditions including twilight, moonlight, and complete darkness.

Clause 119. The method of any of Clauses 117 or 118, wherein measuring night blindness comprises evaluation of visual performance based on assessing a user's ability to navigate and identify objects in low-light conditions, evaluating their adaptation to different lighting scenarios.

Clause 120. The method of any of Clauses 117-119, wherein the three-dimensional virtual environment allows manipulation of light levels and visual challenges in real-time.

Clause 121. The method of any of Clauses 117-120, wherein the plurality of visual scenarios includes low-light conditions, wherein a drop in visual performance based on the user interactions and responses indicates areas of night blindness.

Clause 122. The method of any of Clauses 117-121, further comprising using one or more biometric feedback mechanisms including sensors to track pupil dilation, eye movement, and retinal response, allowing real-time adjustments to low-light simulations based on physiological feedback.

Clause 123. The method of any of Clauses 117-122, further comprising utilizing artificial intelligence to adapt the plurality of visual scenarios for an individual for tailoring difficulty and nature of visual tasks based on the individual's visual performance, to provide a personalized assessment for the individual.

Clause 124. The method of any of Clauses 117-123, wherein the plurality of visual scenarios comprises: a baseline visual acuity test for testing a patient's visual acuity under normal, well-lit conditions to establish a baseline; a dark adaptation test where the patient is placed in a dark room or environment for an extended period to allow the patient's eyes to adapt to the darkness; a night vision simulation test to immerse the patient in the three-dimensional virtual environment simulating night-time or low-light conditions; a visual acuity testing in low light using standard eye charts, objects, or other visual targets presented at various distances and contrasts under controlled lighting conditions; a dynamic testing where the three-dimensional virtual environment introduces dynamic elements, including moving objects or changes in lighting conditions, to assess the patient's ability to perceive and react to visual stimuli in low light; a night vision tasks testing where the patient is asked to perform simulated tasks that require good night vision, including navigating through a dimly lit environment, identifying objects, or reading signs/labels; a subjective assessment where the patient is asked to report their subjective experience, including any difficulties or discomfort experienced during the low-light simulation; and repeat testing where the entire sequence may be repeated multiple times, with varying levels of illumination or different three-dimensional virtual environments, to fully assess the severity and consistency of the night blindness.

Clause 125. The method of any of Clauses 117-124, wherein tracking user interactions and responses includes monitoring eye movements at high frequencies ranging from 50 Hz to 1000 Hz.

Clause 126. The method of any of Clauses 117-125, wherein tracking user interactions and responses includes monitoring saccades at rates of at least 100-500 Hz and fixations at rates of 50-100 Hz.

Clause 127. The method of any of Clauses 117-126, further comprising displaying a performance graph showing the relationship between decreasing light levels and visual performance metrics.

Clause 128. The method of any of Clauses 117-127, further comprising providing real-time feedback on visual performance under varying lighting conditions.

Clause 129. The method of any of Clauses 117-128, wherein the plurality of visual scenarios includes simulating navigation through a dimly lit maze to assess night vision capabilities.

Clause 130. The method of any of Clauses 117-129, further comprising generating a comprehensive report detailing night blindness assessment results, including a breakdown of performance in different lighting conditions.

Clause 131. The method of any of Clauses 117-130, wherein measuring night blindness includes quantifying the ability to discern details of objects in motion under low-light conditions.

Clause 132. The method of any of Clauses 117-131, further comprising synchronizing eye tracking data with simulated lighting conditions to analyze how different light levels affect eye movements and pupil reactions.

Clause 133. The method of any of Clauses 117-132, wherein the plurality of visual scenarios includes tasks requiring rapid focus shifts between near and far objects under varying degrees of low light.

Clause 134. The method of any of Clauses 117-133, further comprising performing foveated rendering to optimize rendering performance in low-light simulations while maintaining visual fidelity in the user's focus area.

Clause 135. A system for implementing a virtual eye test, comprising: a head-mounted display including a display and one or more cameras; one or more processors; and memory storing one or more programs configured to be executed by the one or more processors, the one or more programs including instructions for: a user interface module configured to generate a virtual reality (VR) user interface corresponding to a three-dimensional virtual environment; a rendering module configured to render the VR user interface on the HMD; a simulation module configured to simulate one or more scenarios in the VR user interface; a tracking module configured to continuously track, using at least one of the one or more cameras, eye movements and response times to visual stimuli presented in the one or more scenarios; and an evaluation module configured to analyze user interactions and system performance to determine and measure at least one of: visual acuity and perception, depth perception, motion detection, spatial awareness, dynamic visual acuity, astigmatism, or night blindness, based on the tracked eye movements and response times.

Clause 136. A system for implementing a virtual eye test, comprising: a head-mounted display including a display and one or more cameras; one or more processors; and memory storing one or more programs configured to be executed by the one or more processors, the one or more programs including instructions for performing the method of any of Clauses 1-134.

In some embodiments, any of the above clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

Further Considerations

As used herein, the word "module" refers to logic embodied in hardware or firmware, or to a collection of software instructions, possibly having entry and exit points, written in a programming language, such as, for example C++. A software module may be compiled and linked into an executable program, installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM or EEPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

It is contemplated that the modules may be integrated into a fewer number of modules. One module may also be separated into multiple modules. The described modules may be implemented as hardware, software, firmware or any combination thereof. Additionally, the described modules may reside at different locations connected through a wired or wireless network, or the Internet.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

As used herein, the term "about" is relative to the actual value stated, as will be appreciated by those of skill in the art, and allows for approximations, inaccuracies and limits of measurement under the relevant circumstances. In one or more aspects, the terms "about," "substantially," and "approximately" may provide an industry-accepted tolerance for their corresponding terms and/or relativity between items.

As used herein, the term "comprising" indicates the presence of the specified integer(s), but allows for the possibility of other integers, unspecified. This term does not imply any particular proportion of the specified integers. Variations of the word "comprising," such as "comprise" and "comprises," have correspondingly similar meanings.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the detailed description contains many specifics, these should not be construed as limiting the scope of the subject technology but merely as illustrating different examples and aspects of the subject technology. It should be appreciated that the scope of the subject technology includes other embodiments not discussed in detail above. Various other modifications, changes and variations may be made in the arrangement, operation and details of the method and apparatus of the subject technology disclosed herein without departing from the scope. In addition, it is not necessary for a device or method to address every problem that is solvable (or possess every advantage that is achievable) by different embodiments of the disclosure in order to be encompassed within the scope of the disclosure. The use herein of "can" and derivatives thereof shall be understood in the sense of "possibly" or "optionally" as opposed to an affirmative capability.

What is claimed is:

1. A method of implementing a virtual eye test for measuring and adjusting for visual distortions caused by astigmatism, comprising:

at an electronic device including a head-mounted display (HMD) and a camera:

generating a virtual reality (VR) user interface corresponding to a three-dimensional virtual environment;

rendering the VR user interface on the HMD;

simulating, in the VR user interface, a plurality of visual scenarios;

tracking, using the camera, user interactions and responses to visual stimuli presented in the plurality of visual scenarios;

measuring and adjusting for visual distortions based on the user interactions and responses; and analyzing focus adjustment times at different distances and comparing performance under different lighting conditions.

2. The method of claim 1, wherein the three-dimensional virtual environment comprises one or more environments where users encounter various visual scenarios designed to reveal specific distortions caused by astigmatism.

3. The method of claim 1, wherein the three-dimensional virtual environment allows for manipulation of visual stimuli including adjusting text size, distance, and lighting conditions.

4. The method of claim 1, wherein the plurality of visual scenarios includes at least one scenario with blurring of lines, ghosting, or irregular focus.

5. The method of claim 1, wherein the plurality of visual scenarios comprises reading text at different distances or identifying objects in motion.

6. The method of claim 1, further comprising providing a description of a patient's condition comprising detailed maps of visual distortions, highlighting areas where the patient experiences the most significant difficulties.

7. The method of claim 1, further comprising using adaptive optics for simulating corrective lenses in real-time, thereby allowing users to experience immediate adjustments to their visual distortions, to provide feedback on the effectiveness of different corrections.

8. The method of claim 1, further comprising using one or more machine learning algorithms to analyze visual responses, thereby continuously optimizing the plurality of visual scenarios for personalized assessment and correction.

9. The method of claim 1, further comprising providing personalized corrective measures comprising customizing vision correction strategies based on detailed assessments, ensuring that treatments and corrective lenses are tailored to an individual's specific visual needs.

10. The method of claim 1, wherein tracking user interactions and responses includes tracking eye movements at high frequencies ranging from 50 Hz to 1000 Hz.

11. The method of claim 1, wherein tracking user interactions and responses includes monitoring saccades at rates of at least 100-500 Hz.

12. The method of claim 1, wherein tracking user interactions and responses includes monitoring fixations at rates of 50-100 Hz.

13. The method of claim 1, wherein tracking user interactions and responses includes monitoring smooth pursuit eye movements at rates of 100-200 Hz.

14. The method of claim 1, further comprising displaying a split screen for comparison, showing how a scene appears with and without simulated astigmatism.

15. The method of claim 1, wherein the plurality of visual scenarios includes scenarios requiring rapid focus shifts between near and far objects.

16. The method of claim 1, wherein the plurality of visual scenarios includes scenarios with moving objects at various depths requiring focus tracking.

17. The method of claim 1, wherein the plurality of visual scenarios includes scenarios with 3D shapes and contours for testing depth and curvature perception.

* * * * *